(12) United States Patent
Kim et al.

(10) Patent No.: US 11,337,050 B2
(45) Date of Patent: *May 17, 2022

(54) METHOD AND DEVICE FOR TRANSRECEIVING DISCOVERY REFERENCE SIGNAL IN WIRELESS ACCESS SYSTEM SUPPORTING UNLICENSED BAND

(71) Applicant: LG ELECTRONICS INC., Seoul (KR)

(72) Inventors: Seonwook Kim, Seoul (KR); Joonkui Ahn, Seoul (KR); Suckchel Yang, Seoul (KR); Hanjun Park, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/860,625

(22) Filed: Apr. 28, 2020

(65) Prior Publication Data

US 2020/0260251 A1 Aug. 13, 2020

Related U.S. Application Data

(63) Continuation of application No. 15/743,195, filed as application No. PCT/KR2016/007497 on Jul. 11, 2016, now Pat. No. 10,681,527.

(Continued)

(51) Int. Cl.
*H04W 8/00* (2009.01)
*H04J 11/00* (2006.01)
(Continued)

(52) U.S. Cl.
CPC ............. *H04W 8/005* (2013.01); *H04J 11/00* (2013.01); *H04J 11/0073* (2013.01);
(Continued)

(58) Field of Classification Search
CPC ....... H04W 8/005; H04W 4/06; H04W 48/16; H04J 11/00; H04J 11/0073; H04J 11/0076;
(Continued)

(56) References Cited

U.S. PATENT DOCUMENTS

2011/0103251 A1 5/2011 Ma et al.
2013/0114498 A1 5/2013 Park et al.
(Continued)

FOREIGN PATENT DOCUMENTS

EP 2453593 A2 5/2012

OTHER PUBLICATIONS

Huawei, "Small Cell Enhancements—Physical Layer Aspects," 3GPP TSG RAN meeting #64, RP-141014, Sophia Antipolis, France, Jun. 10-13, 2014, pp. 1-26.
(Continued)

*Primary Examiner* — Candal Elpenord
(74) *Attorney, Agent, or Firm* — Birch, Stewart, Kolasch & Birch, LLP

(57) ABSTRACT

A method for receiving a discovery reference signal (DRS) by a user equipment (UE) in a wireless communication system for supporting an unlicensed band, includes receiving the DRS in at least one subframe included in a discovery measurement timing configuration (DMTC) period, and receiving a multimedia broadcast multicast service single frequency network (MBSFN) configuration, wherein the MBSFN configuration is not applied to the at least one subframe.

12 Claims, 34 Drawing Sheets

Related U.S. Application Data

(60) Provisional application No. 62/219,104, filed on Sep. 15, 2015, provisional application No. 62/215,147, filed on Sep. 7, 2015, provisional application No. 62/209,315, filed on Aug. 24, 2015, provisional application No. 62/202,170, filed on Aug. 7, 2015, provisional application No. 62/190,740, filed on Jul. 10, 2015.

(51) Int. Cl.
　　*H04L 5/00* 　　(2006.01)
　　*H04L 27/00* 　(2006.01)
　　*H04W 4/06* 　　(2009.01)
　　*H04W 48/16* 　(2009.01)

(52) U.S. Cl.
　　CPC ....... *H04J 11/0076* (2013.01); *H04J 11/0086* (2013.01); *H04L 5/0048* (2013.01); *H04L 5/0094* (2013.01); *H04L 27/0006* (2013.01); *H04W 4/06* (2013.01); *H04W 48/16* (2013.01)

(58) Field of Classification Search
　　CPC .. H04J 11/0086; H04L 5/0048; H04L 5/0094; H04L 27/0006
　　USPC ................................................. 370/329–330
　　See application file for complete search history.

(56) References Cited

U.S. PATENT DOCUMENTS

| | | |
|---|---|---|
| 2014/0064133 A1 | 3/2014 | Kazmi et al. |
| 2015/0215847 A1 | 7/2015 | Yie et al. |
| 2015/0264592 A1* | 9/2015 | Novlan ............. H04W 52/0206 370/252 |
| 2016/0088500 A1 | 3/2016 | Chen et al. |
| 2016/0095114 A1 | 3/2016 | Kim et al. |
| 2016/0262100 A1 | 9/2016 | Larsson et al. |
| 2016/0270100 A1 | 9/2016 | Ng |
| 2016/0302230 A1 | 10/2016 | Novlan et al. |
| 2017/0223558 A1* | 8/2017 | Deng .................... H04W 24/10 |
| 2017/0289818 A1 | 10/2017 | Ng et al. |

OTHER PUBLICATIONS

Huawei, "Small Cell Enhancernents—Physical Layer Aspects,"3GPP TSG RAN meeting #65, RP-141243, Edinburgh, Scotland, Sep. 9-12, 2014 (Sep. 2, 2014), pp. 1-21.

Panasonic, "DRS Design for LAA," 3GPP TSG RAN WG1#81, R1-152692, Fukuoka, Japan, May 25-29, 2015 (May 15, 2015), 7 pages.

\* cited by examiner

PUCCH format 1a and 1b structure (normal CP case)

PUCCH format 1a and 1b structure (extended CP case)

PUCCH format 2, 2a, and 2b structure (normal CP case)

PUCCH format 2, 2a, and 2b structure (extended CP case)

FIG. 10 resource allocation: 18 ACK/NACK channels in normal CP

| cell-specific cyclic shift offset | | RS orthogonal cover | | | ACK/NACK orthogonal cover shift | | |
|---|---|---|---|---|---|---|---|
| $\delta_{offset}^{PUCCH}=1$ | $\delta_{offset}^{PUCCH}=0$ | $\overline{n}_{OC}=0$ | $\overline{n}_{OC}=1$ | $\overline{n}_{OC}=2$ | $n_{OC}=0$ | $n_{OC}=1$ | $n_{OC}=2$ |
| $n_{CS}=1$ | $n_{CS}=0$ | $n'=0$ | | | $n'=0$ | | |
| 2 | 1 | | 6 | 12 | | 6 | 12 |
| 3 | 2 | 1 | | 13 | 1 | | 13 |
| 4 | 3 | | 7 | | | 7 | |
| 5 | 4 | 2 | | 14 | 2 | | 14 |
| 6 | 5 | | 8 | 15 | | 8 | 15 |
| 7 | 6 | 3 | | | 3 | | |
| 8 | 7 | | 9 | 16 | | 9 | 16 |
| 9 | 8 | 4 | | | 4 | | |
| 10 | 9 | | 10 | 17 | | 10 | 17 |
| 11 | 10 | 5 | | | 5 | | |
| 0 | 11 | | 11 | | | 11 | |

$\Delta_{shift}^{PUCCH} \in \begin{Bmatrix} \{1,2,3\} \text{ normal CP case} \\ \{1,2,3\} \text{ extended CP case} \end{Bmatrix}$ cell-specific cyclic shift value of CAZAC sequence $\delta_{offset}^{PUCCH} \in \{0,1,...,\Delta_{shift}^{PUCCH}-1\}$ specific cyclic shift offset

- $n_{OC}$ orthogonal sequence index for ACK/NACK
- $\overline{n}_{OC}$ orthogonal sequence index for RS
- $n_{CS}$ cyclic shift value of CAZAC sequence
- $n'$ ACK/NACK resource index used for channelizing in RB FIG. 19
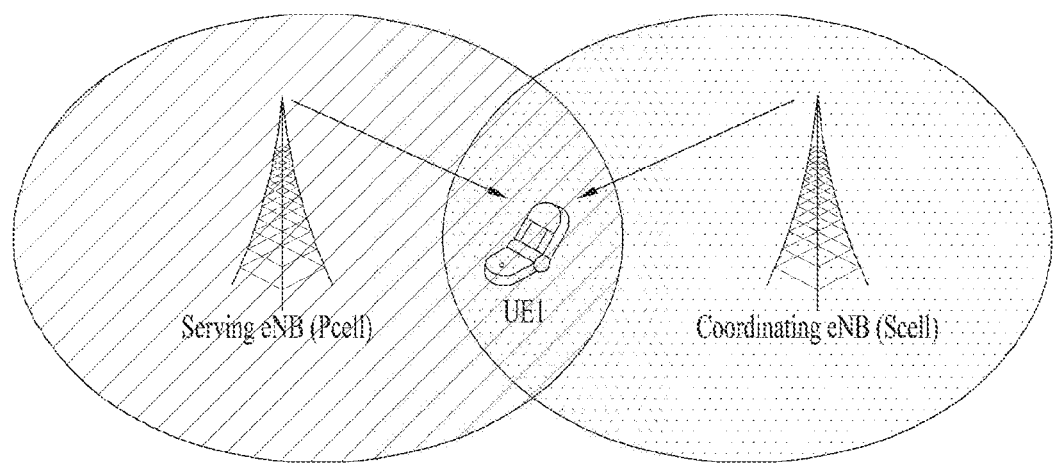
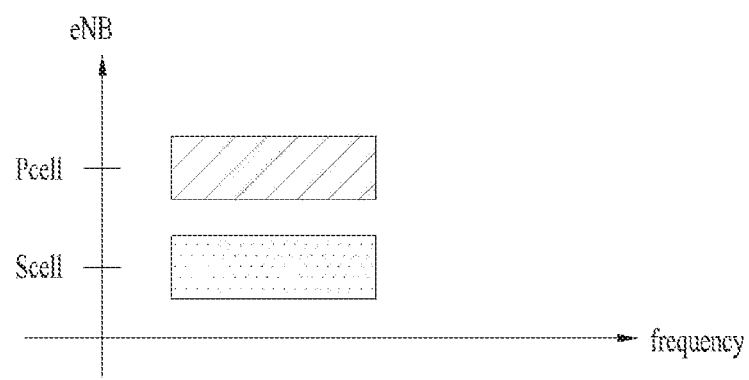

FIG. 25
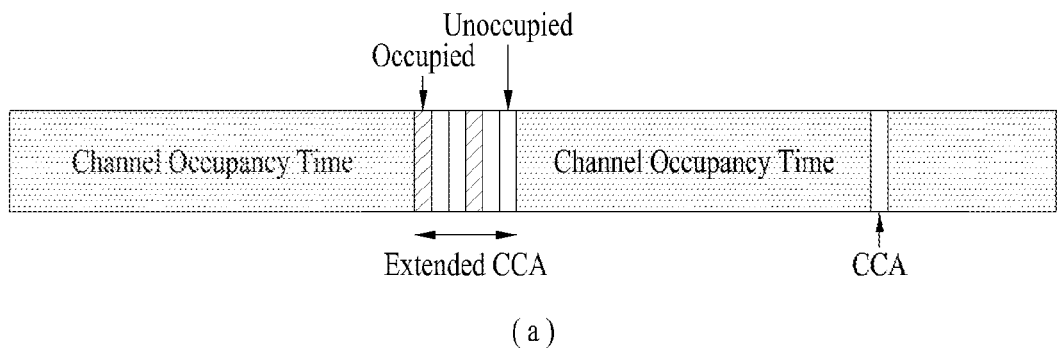
(a)
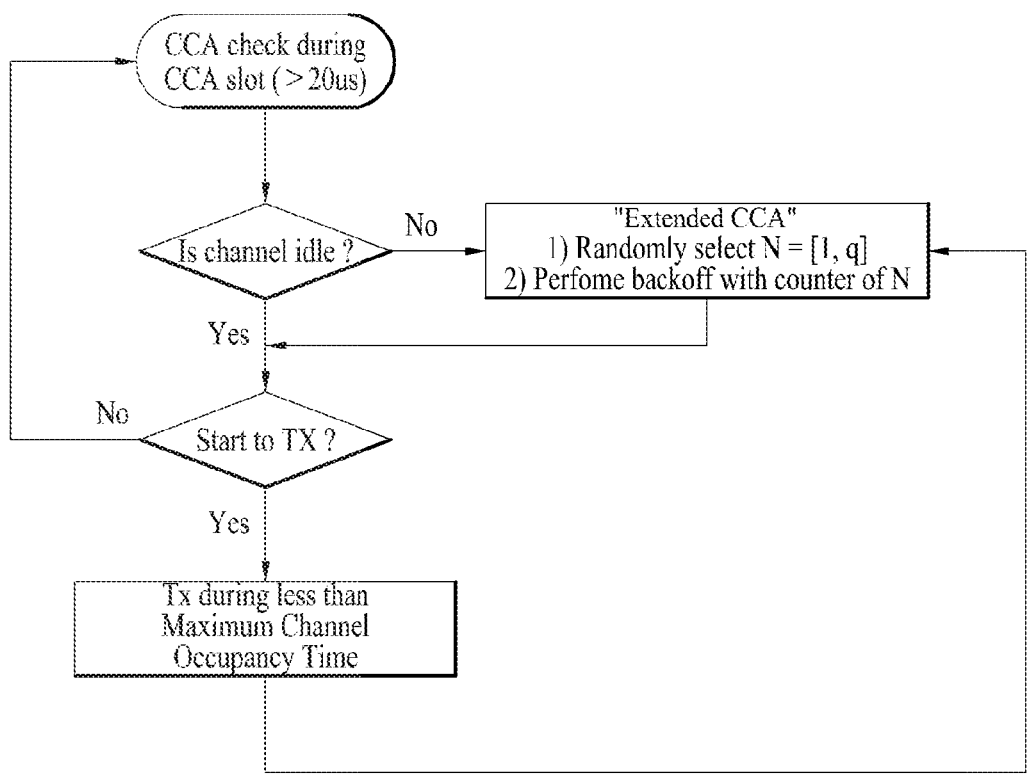
(b)

FIG. 28
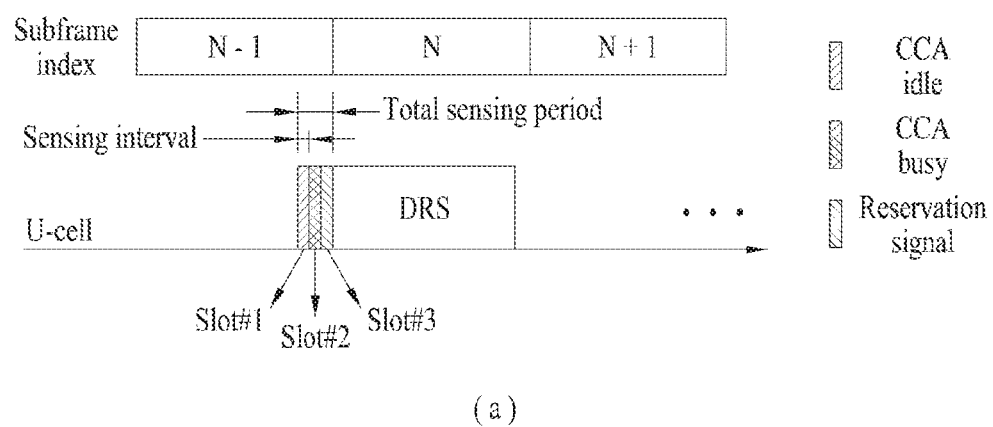
(a)
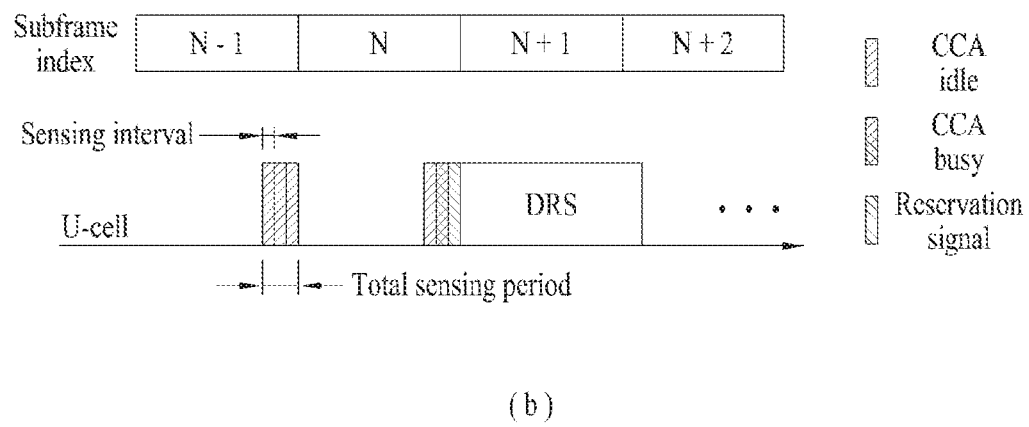
(b)

FIG. 34
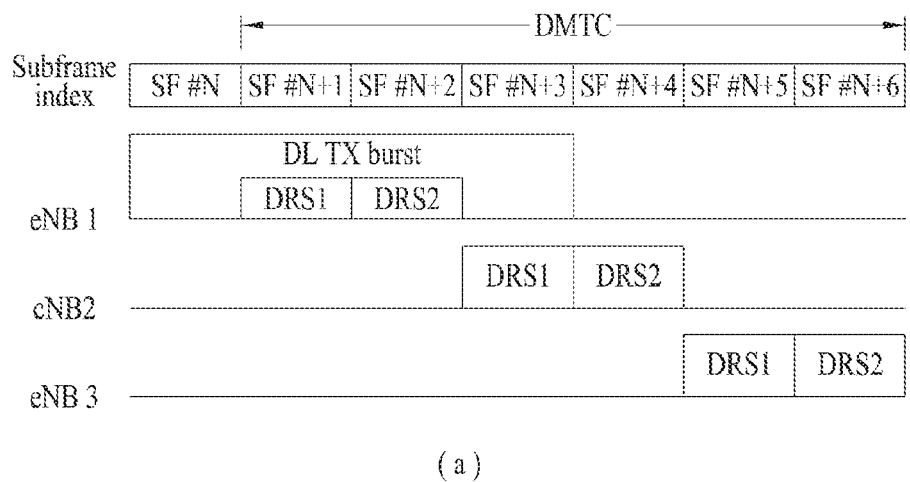
(a)
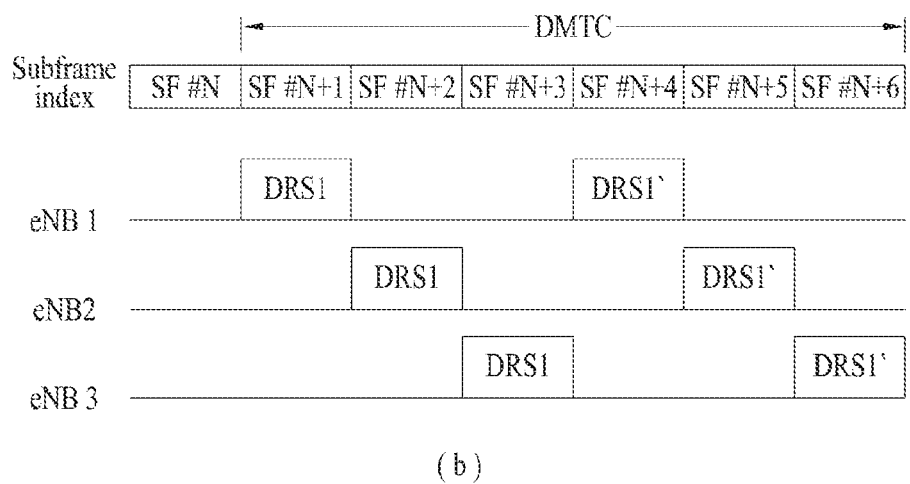
(b)

FIG. 36
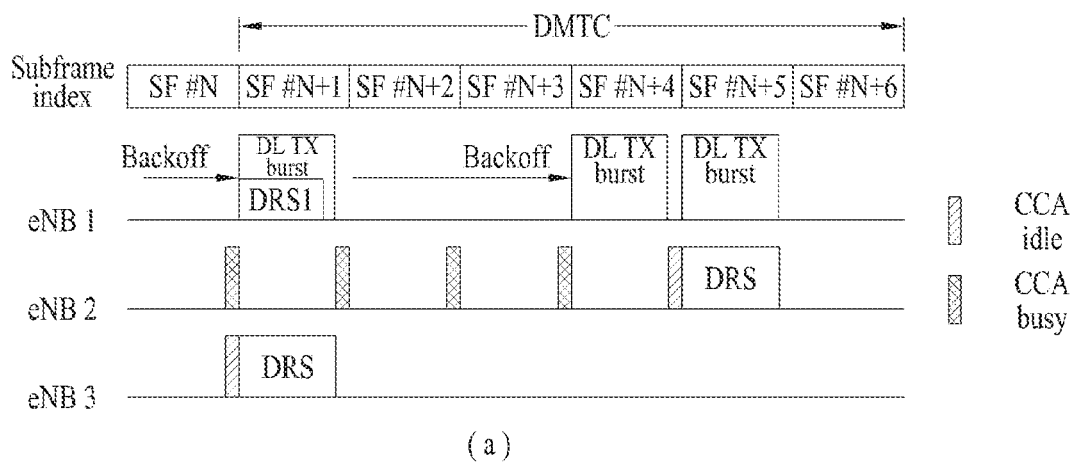
(a)
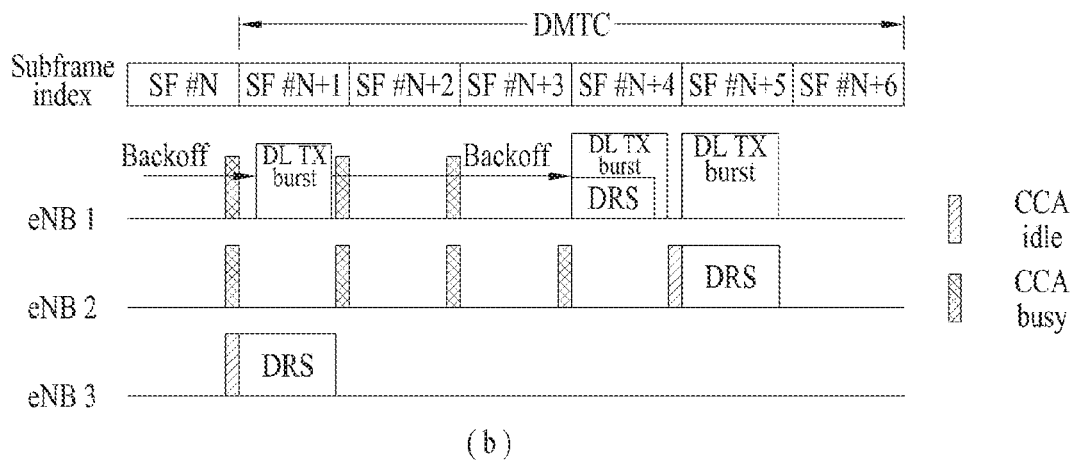
(b)

METHOD AND DEVICE FOR TRANSRECEIVING DISCOVERY REFERENCE SIGNAL IN WIRELESS ACCESS SYSTEM SUPPORTING UNLICENSED BAND

CROSS-REFERENCE TO RELATED APPLICATIONS

This application is a Continuation of U.S. Application Ser. No. 15/743,195, filed on Jan. 9, 2018 (now U.S. Pat. No. 10,681,527 issued on Jun. 9, 2020), which was filed as the National Phase of PCT International Application No. PCT/KR2016/007497, filed on Jul. 11, 2016, which claims priority under 35 U.S.C. 119(e) to U.S. Provisional Application No. 62/190,740, filed on Jul. 10, 2015, U.S. Provisional Application No. 62/202,170, filed on Aug. 7, 2015, U.S. Provisional Application No. 62/209,315, filed on Aug. 24, 2015, No. 62/215,147, filed on Sep. 7, 2015 and U.S. Provisional Application No. 62/219,104, filed on Sep. 15, 2015, all of these applications are hereby expressly incorporated by reference into the present application.

BACKGROUND OF THE INVENTION

Field of the Invention

The present invention relates to a wireless access system for supporting an unlicensed band, and more particularly, to a rate matching method of a downlink (DL) transmission burst, a method of supporting frequency reuse, a discovery reference signal (DRS) transmission method, a method of configuring a DL TX burst for supporting frequency reuse, a DRS transmission method when a multicast service single frequency network (MBSFN) configuration is applied, definition of broadcast information transmitted in a DRS occasion, methods of transmitting and receiving a DRS, and apparatuses for supporting the methods.

Description of the Related Art

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

SUMMARY OF THE INVENTION

The present disclosure relates to a wireless access system for supporting an unlicensed band, and more particularly, to a rate matching method of a downlink (DL) transmission burst, a method of supporting frequency reuse, a discovery reference signal (DRS) transmission method, a method of configuring a DL TX burst for supporting frequency reuse, a DRS transmission method when a multicast service single frequency network (MBSFN) configuration is applied, definition of broadcast information transmitted in a DRS occasion, methods of transmitting and receiving a DRS, and apparatuses for supporting the methods.

The object of the present disclosure can be achieved by providing a method of receiving a discovery reference signal (DRS) by a user equipment (UE) in a wireless access system for supporting an unlicensed band, the method including receiving a high layer signal including a parameter indicating a multimedia broadcast multicast service single frequency network (MBSFN) subframe, receiving setting of a discovery measurement timing configuration (DMTC) period as a time period in which the DRS is capable of being transmitted, and receiving the DRS in the DMTC period. In this case, when a first subframe included in the DMTC period is the MBSFN subframe, if the DRS is transmitted in the first subframe, an MBSFN configuration may not be applied to the MBSFN subframe.

In another aspect of the present disclosure, provided herein is a user equipment (UE) for receiving a discovery reference signal (DRS) in a wireless access system supporting an unlicensed band, including a receiver and a processor. In this case, the processor may be configured to control the receiver to receive a high layer signal including a parameter indicating a multimedia broadcast multicast service single frequency network (MBSFN) subframe, to receive setting of a discovery measurement timing configuration (DMTC) period as a time period in which the DRS is capable of being transmitted, and to control the receiver to receive the DRS in the DMTC period. In this case, when a first subframe included in the DMTC period is the MBSFN subframe, if the DRS is transmitted in the first subframe, an MBSFN configuration is not applied to the MBSFN subframe.

The DRS includes one or more of a cell-specific reference signal (CRS), a primary synchronization signal (PSS), a secondary synchronization signal (SSS), and a channel status information reference signal (CSI-RS).

The UE monitors the DMTC period under an assumption that the DRS is capable of being transmitted in any subframes included in the DMTC period.

When the MBSFN configuration is applied to the MBSFN subframe, a cell-specific reference signal (CRS) is transmitted only in one or more of a first symbol and a second symbol of the MBSFN subframe. In this case, when a second subframe included in the DMTC period is configured as the MBSFN subframe and the DRS is not transmitted in the second subframe, the MBSFN configuration may be applied to the second subframe.

The method may further include one or more operations of radio resource management (RRM) measurement and cell detection based on the DRS.

When the UE detects one or more of a PSS and an SSS in the first subframe, the UE may assume that the DRS is transmitted in the first subframe.

The above-described aspects of the present disclosure are merely some parts of the embodiments of the present disclosure and various embodiments into which the technical features of the present disclosure are incorporated may be derived and understood by persons skilled in the art from the following detailed description of the present disclosure.

The embodiments of the present disclosure have the following effects.

First, data may be transmitted and received efficiently in a wireless access system supporting an unlicensed band.

Secondly, data and a discovery reference signal (DRS) may also be efficiently received via rate matching when a DRS and a Tx burst are simultaneously transmitted.

Thirdly, various methods of receiving a DRS may be provided to perform RRM measurement and cell detection in an LAA system.

Fourthly, when a multicast service single frequency network (MBSFN) subframe (SF) is configured, whether DRS and MBSFN configurations are applied may be clearly defined to normally receive the DRS when the MBSFN SF is configured.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings:

FIG. 10 is a view illustrating Acknowledgment/Negative Acknowledgment (ACK/NACK) channelization for PUCCH formats 1a an 1b;

FIG. 19 is a conceptual view illustrating a Coordinated Multi-Point (CoMP) system operating in a CA environment;

FIG. 25 is a view illustrating an exemplary Load Based Equipment (LBE) operation as one of the LBT operations;

FIG. 28 is a view illustrating a DRS transmission method in the LAA system;

FIG. 34 is a diagram for explanation of methods of transmitting a DRS based on a TDM in an LAA system;

FIG. 36 is a diagram for explanation of methods of configuring a DL TX burst for supporting frequency reuse;

DETAILED DESCRIPTION OF THE INVENTION

Figure 1:
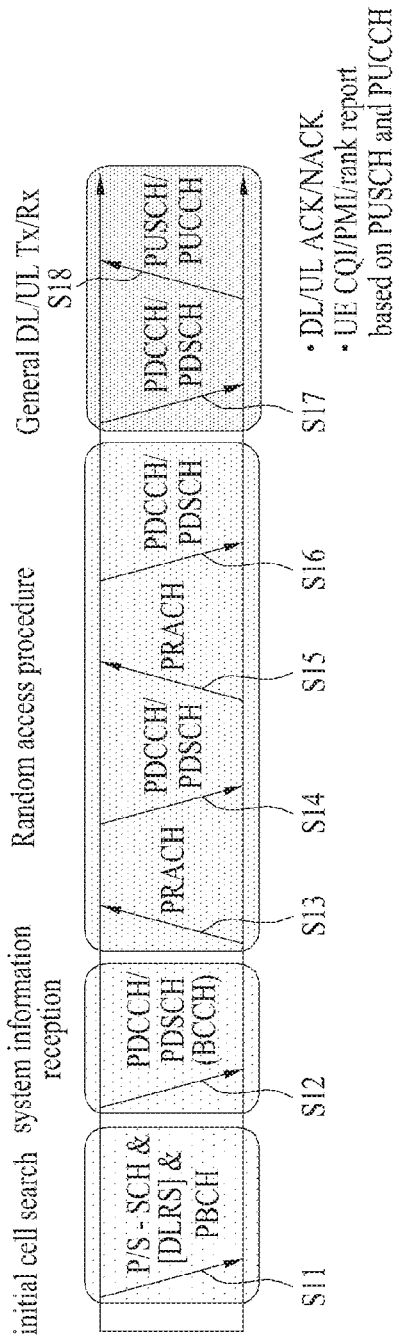
FIG. 1 is a view illustrating physical channels and a signal transmission method using the physical channels.

Embodiments of the present disclosure as described below in detail relate to a wireless access system supporting an unlicensed band, and provide a rate matching method of a downlink (DL) transmission burst, a method of supporting frequency reuse, a discovery reference signal (DRS) transmission method, a method of configuring a DL TX burst for supporting frequency reuse, a DRS transmission method when a multicast service single frequency network (MBSFN) configuration is applied, definition of broadcast information transmitted in a DRS occasion, methods of transmitting and receiving a DRS, and apparatuses for supporting the methods.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term Transmission Opportunity Period (TxOP) is interchangeable with transmission period, Transmission (Tx) burst, or Reserved Resource Period (RRP). Further, a Listen Before Talk (LBT) operation may be performed for the same purpose as that of carrier sensing for determining whether a channel is in an idle state, Clear Channel Assessment (CCA), and a Channel Access Procedure (CAP).

Hereinafter, 3GPP LTE/LTE-A systems are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (WiFi), IEEE 802.16 (WiMAX), IEEE 802.20, Evolved UTRA (E-UTRA), etc.

UTRA is a part of Universal Mobile Telecommunications System (UMTs). 3GPP LTE is a part of Evolved UMTs (E-UMTs) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

1.1 System Overview

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
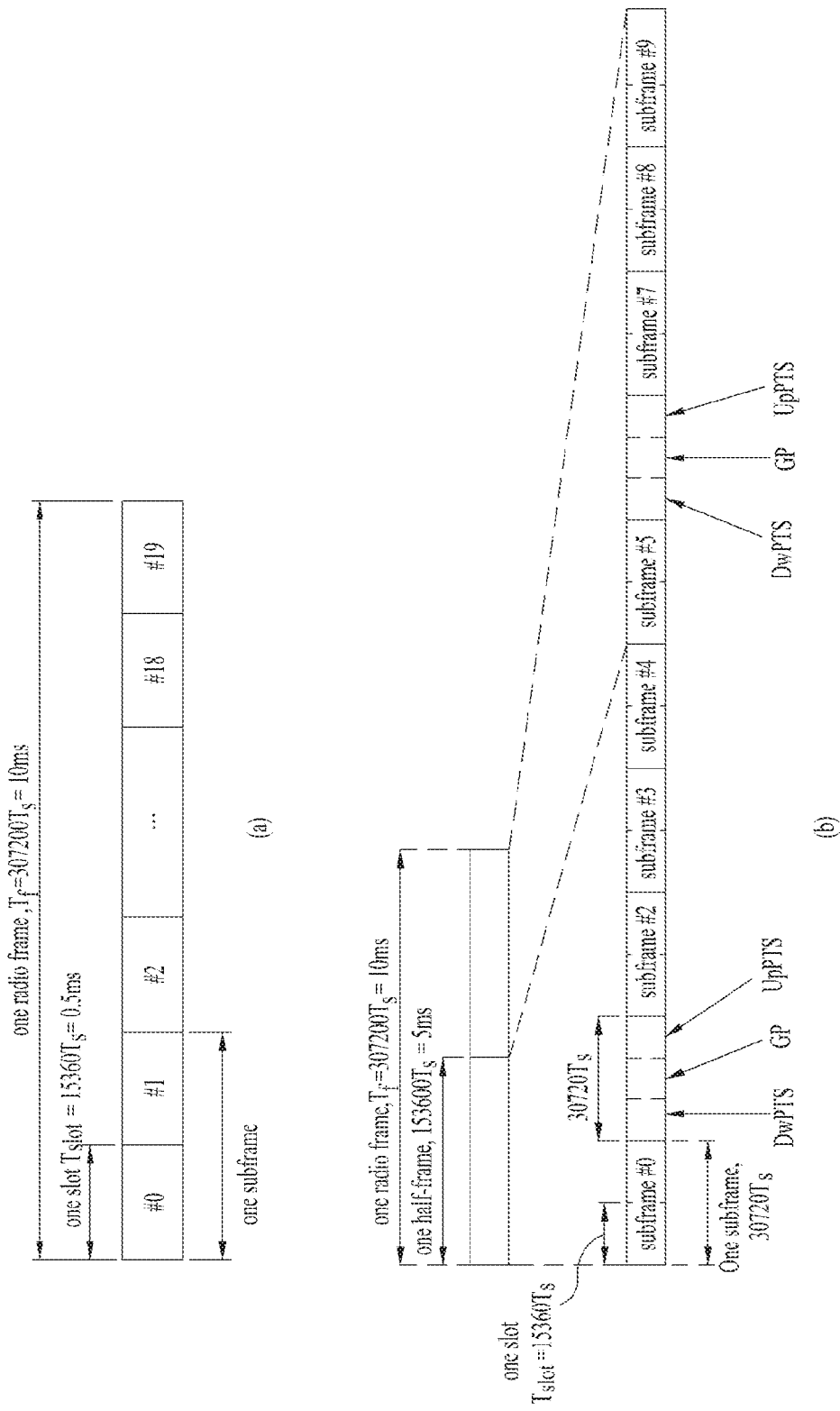
FIG. 2 is a view illustrating exemplary radio frame structures.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms ($T_f=307200 \cdot T_s$) long, including equal-sized 20 slots indexed from 0 to 19. Each slot is 0.5 ms ($T_{slot}=15360 \cdot T_s$) long. One subframe includes two successive slots. An $i^{th}$ subframe includes $2i^{th}$ and $(2i+1)^{th}$ slots. That is, a radio frame includes 10 subframes. A time required for transmitting one subframe is defined as a Transmission Time Interval (TTI). $T_s$ is a sampling time given as $T_s=1/(15 \text{ kHz} \times 2048) = 3.2552 \times 10^{-8}$ (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10 ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms ($T_f=307200 \cdot T_s$) long, including two half-frames each having a length of 5 ms ($=153600 \cdot T_s$) long. Each half-frame includes five subframes each being 1 ms ($=30720 \cdot T_s$) long. An $i^{th}$ subframe includes $2i^{th}$ and $(2_{i+1})^{th}$ slots each having a length of 0.5 ms ($T_{slot}=15360 \cdot T_s$). $T_s$ is a sampling time given as $T_s=1/(15 \text{ kHz} \times 2048) = 3.2552 \times 10^{-8}$ (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTs/GP/UpPTs lengths).

TABLE 1

| | | Normal cyclic prefix in downlink | | | Extended cyclic prefix in downlink | |
|---|---|---|---|---|---|---|
| Special | | UpPTS | | | UpPTS | |
| subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 3:
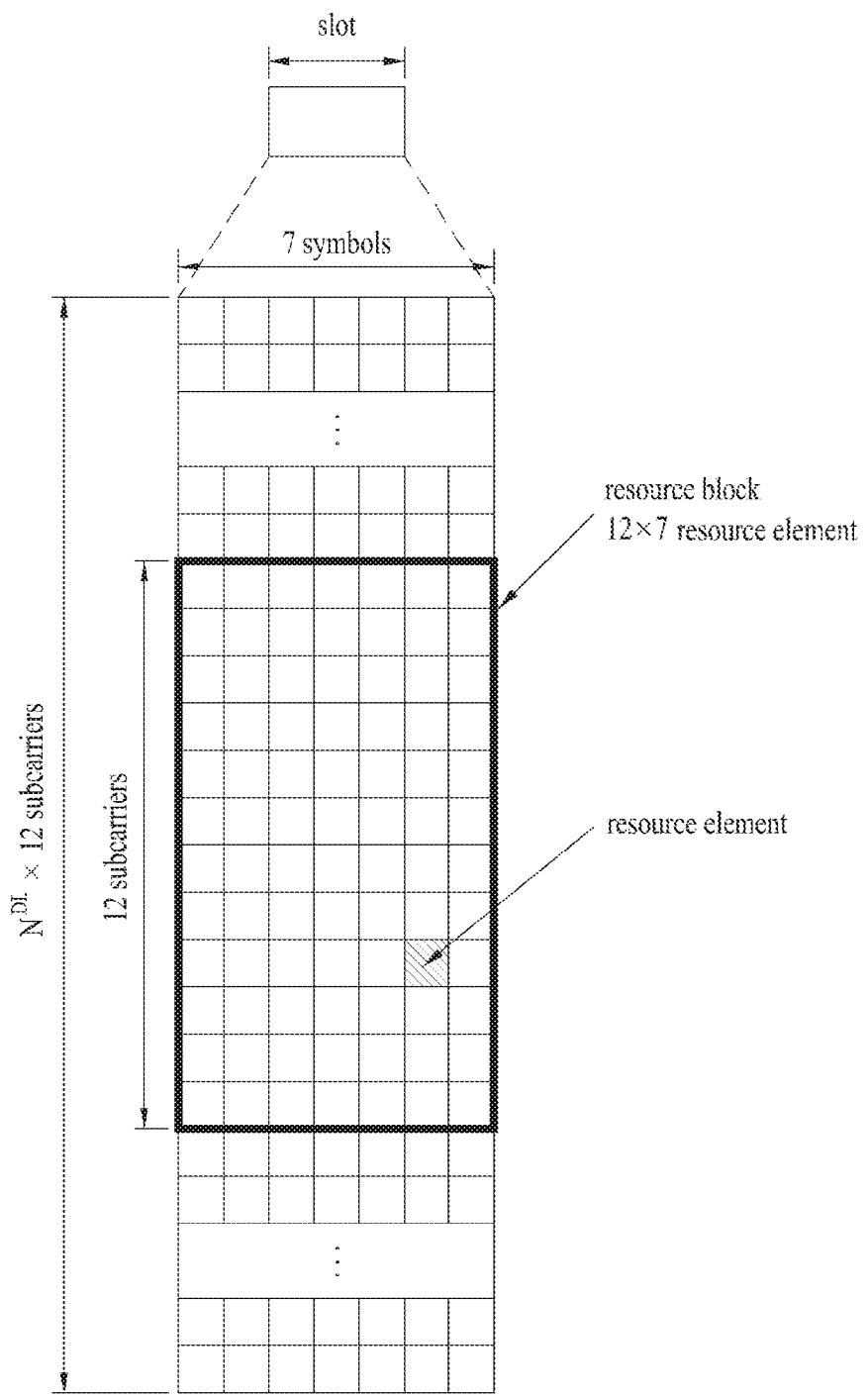
FIG. 3 is a view illustrating an exemplary resource grid for the duration of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7

OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth. A UL slot may have the same structure as a DL slot.

Figure 4:
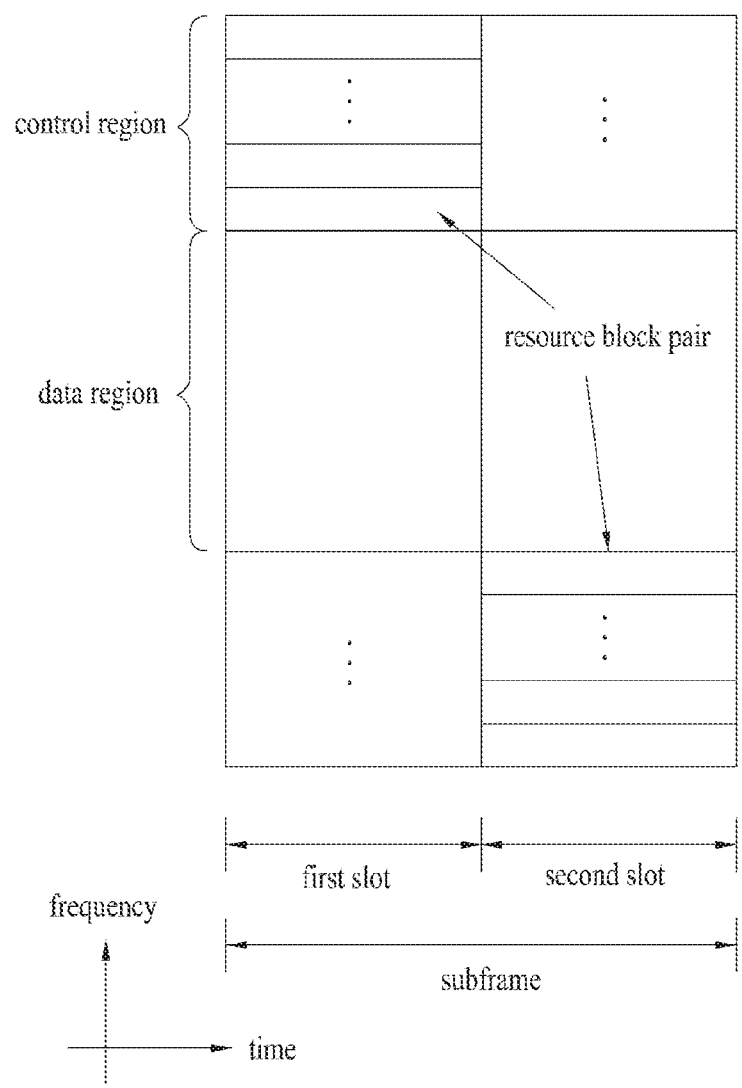
FIG. 4 is a view illustrating an exemplary structure of an uplink subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
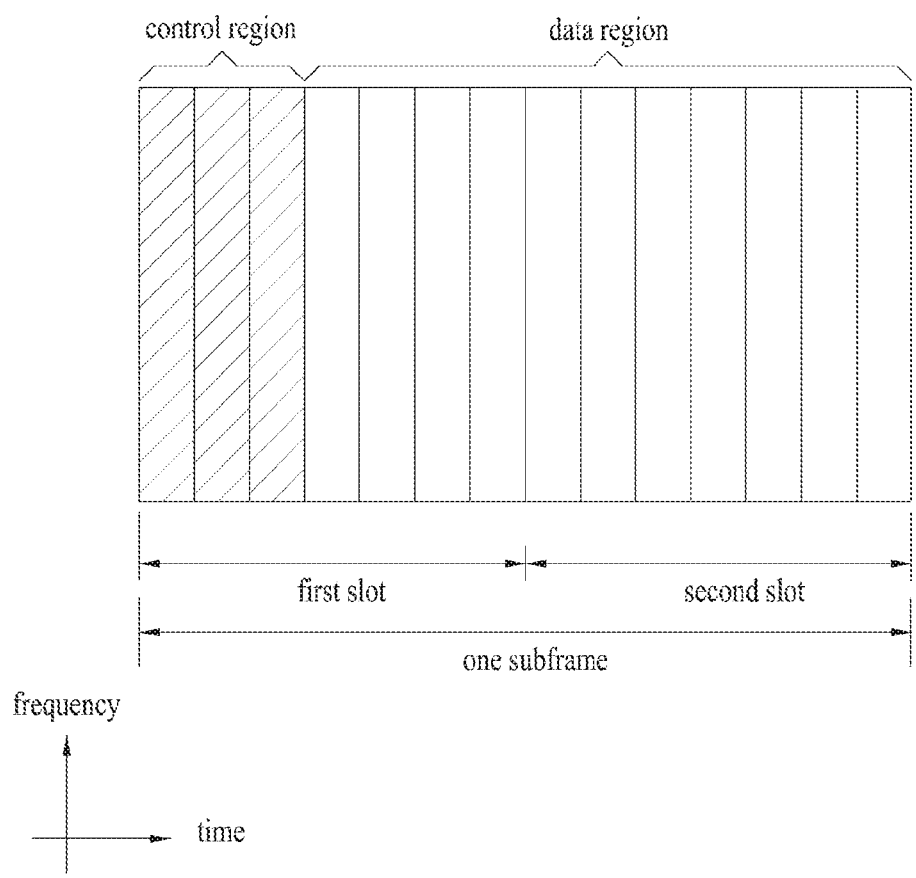
FIG. 5 is a view illustrating an exemplary structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

1.2 Physical Downlink Control Channel (PDCCH)

1.2.1 PDCCH Overview

The PDCCH may deliver information about resource allocation and a transport format for a Downlink Shared Channel (DL-SCH) (i.e. a DL grant), information about resource allocation and a transport format for an Uplink Shared Channel (UL-SCH) (i.e. a UL grant), paging information of a Paging Channel (PCH), system information on the DL-SCH, information about resource allocation for a higher-layer control message such as a random access response transmitted on the PDSCH, a set of Tx power control commands for individual UEs of a UE group, Voice Over Internet Protocol (VoIP) activation indication information, etc.

A plurality of PDCCHs may be transmitted in the control region. A UE may monitor a plurality of PDCCHs. A PDCCH is transmitted in an aggregate of one or more consecutive Control Channel Elements (CCEs). A PDCCH made up of one or more consecutive CCEs may be transmitted in the control region after subblock interleaving. A CCE is a logical allocation unit used to provide a PDCCH at a code rate based on the state of a radio channel. A CCE includes a plurality of RE Groups (REGs). The format of a PDCCH and the number of available bits for the PDCCH are determined according to the relationship between the number of CCEs and a code rate provided by the CCEs.

1.2.2 PDCCH Structure

A plurality of PDCCHs for a plurality of UEs may be multiplexed and transmitted in the control region. A PDCCH is made up of an aggregate of one or more consecutive CCEs. A CCE is a unit of 9 REGs each REG including 4 REs. Four Quadrature Phase Shift Keying (QPSK) symbols are mapped to each REG. REs occupied by RSs are excluded from REGs. That is, the total number of REGs in an OFDM symbol may be changed depending on the presence or absence of a cell-specific RS. The concept of an REG to which four REs are mapped is also applicable to other DL control channels (e.g. the PCFICH or the PHICH). Let the number of REGs that are not allocated to the PCFICH or the PHICH be denoted by $N_{REG}$. Then the number of CCEs available to the system is $N_{CCE}$ $(=\lfloor N_{REG}/9 \rfloor)$ and the CCEs are indexed from 0 to $N_{CCE}-1$.

To simplify the decoding process of a UE, a PDCCH format including n CCEs may start with a CCE having an index equal to a multiple of n. That is, given CCE i, the PDCCH format may start with a CCE satisfying i mod n=0.

The eNB may configure a PDCCH with 1, 2, 4, or 8 CCEs. {1, 2, 4, 8} are called CCE aggregation levels. The number of CCEs used for transmission of a PDCCH is determined according to a channel state by the eNB. For example, one CCE is sufficient for a PDCCH directed to a UE in a good DL channel state (a UE near to the eNB). On the other hand, 8 CCEs may be required for a PDCCH directed to a UE in a poor DL channel state (a UE at a cell edge) in order to ensure sufficient robustness.

[Table 2] below illustrates PDCCH formats. 4 PDCCH formats are supported according to CCE aggregation levels as illustrated in [Table 2].

TABLE 2

| PDCCH format | Number of CCE (n) | Number of REG | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

A different CCE aggregation level is allocated to each UE because the format or Modulation and Coding Scheme (MCS) level of control information delivered in a PDCCH for the UE is different. An MCS level defines a code rate used for data coding and a modulation order. An adaptive MCS level is used for link adaptation. In general, three or four MCS levels may be considered for control channels carrying control information.

Regarding the formats of control information, control information transmitted on a PDCCH is called DCI. The configuration of information in PDCCH payload may be changed depending on the DCI format. The PDCCH payload is information bits. [Table 3] lists DCI according to DCI formats.

TABLE 3

| DCI Format | Description |
|---|---|
| Format 0 | Resource grants for PUSCH transmissions (uplink) |
| Format 1 | Resource assignments for single codeword PDSCH transmission (transmission modes 1, 2 and 7) |
| Format 1A | Compact signaling of resource assignments for single codeword PDSCH (all modes) |
| Format 1B | Compact resource assignments for PDSCH using rank-1 closed loop precoding (mode 6) |

TABLE 3-continued

| DCI Format | Description |
| --- | --- |
| Format 1C | Very compact resource assignments for PDSCH (e.g., paging/broadcast system information) |
| Format 1D | Compact resource assignments for PDSCH using multi-user MIMO(mode 5) |
| Format 2 | Resource assignments for PDSCH for closed loop MIMO operation (mode 4) |
| Format 2A | resource assignments for PDSCH for open loop MIMO operation (mode 3) |
| Format 3/3A | Power control commands for PUCCH and PUSCH with 2-bit/1-bit power adjustment |
| Format 4 | Scheduling of PUSCH in one UL cell with multi-antenna port transmission mode |

Referring to [Table 3], the DCI formats include Format 0 for PUSCH scheduling, Format 1 for single-codeword PDSCH scheduling, Format 1A for compact single-codeword PDSCH scheduling, Format 1C for very compact DL-SCH scheduling, Format 2 for PDSCH scheduling in a closed-loop spatial multiplexing mode, Format 2A for PDSCH scheduling in an open-loop spatial multiplexing mode, and Format 3/3A for transmission of Transmission Power Control (TPC) commands for uplink channels. DCI Format 1A is available for PDSCH scheduling irrespective of the transmission mode of a UE.

The length of PDCCH payload may vary with DCI formats. In addition, the type and length of PDCCH payload may be changed depending on compact or non-compact scheduling or the transmission mode of a UE.

The transmission mode of a UE may be configured for DL data reception on a PDSCH at the UE. For example, DL data carried on a PDSCH includes scheduled data, a paging message, a random access response, broadcast information on a BCCH, etc. for a UE. The DL data of the PDSCH is related to a DCI format signaled through a PDCCH. The transmission mode may be configured semi-statically for the UE by higher-layer signaling (e.g. Radio Resource Control (RRC) signaling). The transmission mode may be classified as single antenna transmission or multi-antenna transmission.

A transmission mode is configured for a UE semi-statically by higher-layer signaling. For example, multi-antenna transmission scheme may include transmit diversity, open-loop or closed-loop spatial multiplexing, Multi-User Multiple Input Multiple Output (MU-MIMO), or beamforming. Transmit diversity increases transmission reliability by transmitting the same data through multiple Tx antennas. Spatial multiplexing enables high-speed data transmission without increasing a system bandwidth by simultaneously transmitting different data through multiple Tx antennas. Beamforming is a technique of increasing the Signal to Interference plus Noise Ratio (SINR) of a signal by weighting multiple antennas according to channel states.

A DCI format for a UE depends on the transmission mode of the UE. The UE has a reference DCI format monitored according to the transmission mode configure for the UE. The following 10 transmission modes are available to UEs:

(1) Transmission mode 1: Single antenna port (port 0);
(2) Transmission mode 2: Transmit diversity;
(3) Transmission mode 3: Open-loop spatial multiplexing when the number of layer is larger than 1 or Transmit diversity when the rank is 1;
(4) Transmission mode 4: Closed-loop spatial multiplexing;
(5) Transmission mode 5: MU-MIMO;
(6) Transmission mode 6: Closed-loop rank-1 precoding;
(7) Transmission mode 7: Precoding supporting a single layer transmission, which is not based on a codebook (Rel-8);
(8) Transmission mode 8: Precoding supporting up to two layers, which are not based on a codebook (Rel-9);
(9) Transmission mode 9: Precoding supporting up to eight layers, which are not based on a codebook (Rel-10); and
(10) Transmission mode 10: Precoding supporting up to eight layers, which are not based on a codebook, used for CoMP (Rel-11).

1.2.3 PDCCH Transmission

The eNB determines a PDCCH format according to DCI that will be transmitted to the UE and adds a Cyclic Redundancy Check (CRC) to the control information. The CRC is masked by a unique Identifier (ID) (e.g. a Radio Network Temporary Identifier (RNTI)) according to the owner or usage of the PDCCH. If the PDCCH is destined for a specific UE, the CRC may be masked by a unique ID (e.g. a cell-RNTI (C-RNTI)) of the UE. If the PDCCH carries a paging message, the CRC of the PDCCH may be masked by a paging indicator ID (e.g. a Paging-RNTI (P-RNTI)). If the PDCCH carries system information, particularly, a System Information Block (SIB), its CRC may be masked by a system information ID (e.g. a System Information RNTI (SI-RNTI)). To indicate that the PDCCH carries a random access response to a random access preamble transmitted by a UE, its CRC may be masked by a Random Access-RNTI (RA-RNTI).

Then, the eNB generates coded data by channel-encoding the CRC-added control information. The channel coding may be performed at a code rate corresponding to an MCS level. The eNB rate-matches the coded data according to a CCE aggregation level allocated to a PDCCH format and generates modulation symbols by modulating the coded data. Herein, a modulation order corresponding to the MCS level may be used for the modulation. The CCE aggregation level for the modulation symbols of a PDCCH may be one of 1, 2, 4, and 8. Subsequently, the eNB maps the modulation symbols to physical REs (i.e. CCE to RE mapping).

1.2.4 Blind Decoding (BD)

A plurality of PDCCHs may be transmitted in a subframe. That is, the control region of a subframe includes a plurality of CCEs, CCE 0 to CCE $N_{CCE,k}-1$. $N_{CCE,k}$ is the total number of CCEs in the control region of a $k^{th}$ subframe. A UE monitors a plurality of PDCCHs in every subframe. This means that the UE attempts to decode each PDCCH according to a monitored PDCCH format.

The eNB does not provide the UE with information about the position of a PDCCH directed to the UE in an allocated control region of a subframe. Without knowledge of the position, CCE aggregation level, or DCI format of its PDCCH, the UE searches for its PDCCH by monitoring a set of PDCCH candidates in the subframe in order to receive a control channel from the eNB. This is called blind decoding. Blind decoding is the process of demasking a CRC part with a UE ID, checking a CRC error, and determining whether a corresponding PDCCH is a control channel directed to a UE by the UE.

The UE monitors a PDCCH in every subframe to receive data transmitted to the UE in an active mode. In a Discontinuous Reception (DRX) mode, the UE wakes up in a monitoring interval of every DRX cycle and monitors a PDCCH in a subframe corresponding to the monitoring interval. The PDCCH-monitored subframe is called a non-DRX subframe.

To receive its PDCCH, the UE should blind-decode all CCEs of the control region of the non-DRX subframe. Without knowledge of a transmitted PDCCH format, the UE should decode all PDCCHs with all possible CCE aggregation levels until the UE succeeds in blind-decoding a PDCCH in every non-DRX subframe. Since the UE does not know the number of CCEs used for its PDCCH, the UE should attempt detection with all possible CCE aggregation levels until the UE succeeds in blind decoding of a PDCCH.

In the LTE system, the concept of Search Space (SS) is defined for blind decoding of a UE. An SS is a set of PDCCH candidates that a UE will monitor. The SS may have a different size for each PDCCH format. There are two types of SSs, Common Search Space (CSS) and UE-specific/Dedicated Search Space (USS).

While all UEs may know the size of a CSS, a USS may be configured for each individual UE. Accordingly, a UE should monitor both a CSS and a USS to decode a PDCCH. As a consequence, the UE performs up to 44 blind decodings in one subframe, except for blind decodings based on different CRC values (e.g., C-RNTI, P-RNTI, SI-RNTI, and RA-RNTI).

In view of the constraints of an SS, the eNB may not secure CCE resources to transmit PDCCHs to all intended UEs in a given subframe. This situation occurs because the remaining resources except for allocated CCEs may not be included in an SS for a specific UE. To minimize this obstacle that may continue in the next subframe, a UE-specific hopping sequence may apply to the starting position of a USS.

[Table 4] illustrates the sizes of CSSs and USSs.

TABLE 4

| PDCCH Format | Number of CCE (n) | Number of candidates in CSS | Number of candidates in USS |
| --- | --- | --- | --- |
| 0 | 1 | — | 6 |
| 1 | 2 | — | 6 |
| 2 | 4 | 4 | 2 |
| 3 | 8 | 2 | 2 |

To mitigate the load of the UE caused by the number of blind decoding attempts, the UE does not search for all defined DCI formats simultaneously. Specifically, the UE always searches for DCI Format 0 and DCI Format 1A in a USS. Although DCI Format 0 and DCI Format 1A are of the same size, the UE may distinguish the DCI formats by a flag for format0/format 1a differentiation included in a PDCCH. Other DCI formats than DCI Format 0 and DCI Format 1A, such as DCI Format 1, DCI Format 1B, and DCI Format 2 may be required for the UE.

The UE may search for DCI Format 1A and DCI Format 1C in a CSS. The UE may also be configured to search for DCI Format 3 or 3A in the CSS. Although DCI Format 3 and DCI Format 3A have the same size as DCI Format 0 and DCI Format 1A, the UE may distinguish the DCI formats by a CRC scrambled with an ID other than a UE-specific ID.

An SS $S_k^{(L)}$ is a PDCCH candidate set with a CCE aggregation level $L \in \{1,2,4,8\}$. The CCEs of PDCCH candidate set m in the SS may be determined by the following equation.

$$L \cdot \{(Y_k+m) \bmod \lfloor N_{CCE,k}/L \rfloor\}+i \qquad \text{[Equation 1]}$$

Herein, $M^{(L)}$ is the number of PDCCH candidates with CCE aggregation level L to be monitored in the SS, $m=0, \ldots, M^{(L)}-1$, i is the index of a CCE in each PDCCH candidate, and $i=0, \ldots, L-1$. $k=\lfloor n_s/2 \rfloor$ where $n_s$ is the index of a slot in a radio frame.

As described before, the UE monitors both the USS and the CSS to decode a PDCCH. The CSS supports PDCCHs with CCE aggregation levels {4, 8} and the USS supports PDCCHs with CCE aggregation levels {1, 2, 4, 8}. [Table 5] illustrates PDCCH candidates monitored by a UE.

TABLE 5

| | Search space $S_k^{(L)}$ | | |
| --- | --- | --- | --- |
| Type | Aggregation level L | Size [in CCEs] | Number of PDCCH candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Referring to [Equation 1], for two aggregation levels, L=4 and L=8, $Y_k$ is set to 0 in the CSS, whereas $Y_k$ is defined by [Equation 2] for aggregation level L in the USS.

$$Y_k=(A \cdot Y_{k-1}) \bmod D \qquad \text{[Equation 2]}$$

Herein, $Y_{-1}=n_{RNTI} \neq 0$, $n_{RNTI}$ indicating an RNTI value. A=39827 and D=65537.

1.3. PUCCH (Physical Uplink Control Channel)

PUCCH may include the following formats to transmit control information.

(1) Format 1: On-Off keying (OOK) modulation, used for SR (Scheduling Request)

(2) Format 1a & 1b: Used for ACK/NACK transmission

1) Format 1a: BPSK ACK/NACK for 1 codeword

2) Format 1b: QPSK ACK/NACK for 2 codewords (3) Format 2: QPSK modulation, used for CQI transmission (4) Format 2a & Format 2b: Used for simultaneous transmission of CQI and ACK/NACK (5) Format 3: Used for multiple ACK/NACK transmission in a carrier aggregation environment

[Table 6] shows a modulation scheme according to PUCCH format and the number of bits per subframe. Table 7 shows the number of reference signals (RS) per slot according to PUCCH format. Table 8 shows SC-FDMA symbol location of RS (reference signal) according to PUCCH format. In Table 6, PUCCH format 2a and PUCCH format 2b correspond to a case of normal cyclic prefix (CP).

TABLE 6

| PUCCH format | Modulation scheme | No. of bits per subframe, Mbit |
| --- | --- | --- |
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + BPSK | 22 |
| 3 | QPSK | 48 |

TABLE 7

| PUCCH format | Normal CP | Extended CP |
| --- | --- | --- |
| 1, 1a, 1b | 3 | 2 |
| 2, 3 | 2 | 1 |
| 2a, 2b | 2 | N/A |

TABLE 8

| | SC-FDMA symbol location of RS | |
| --- | --- | --- |
| PUCCH format | Normal CP | Extended CP |
| 1, 1a, 1b | 2, 3, 4 | 2, 3 |
| 2, 3 | 1, 5 | 3 |
| 2a, 2b | 1, 5 | N/A |

Figure 6:
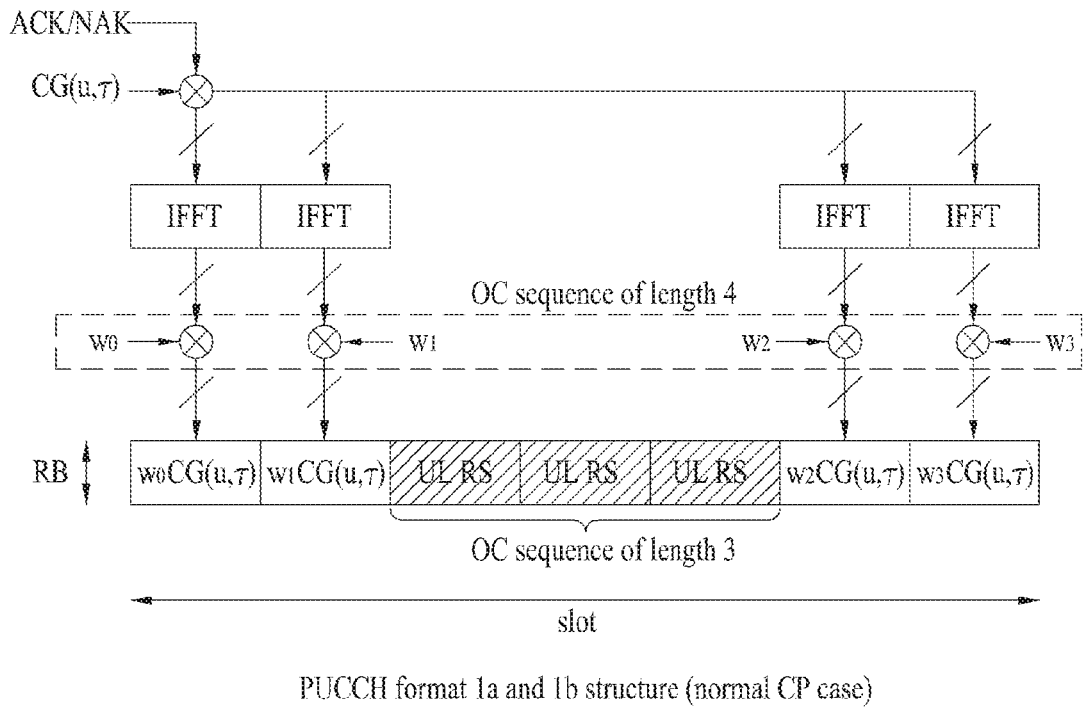
FIG. 6 is a view illustrating Physical Uplink Control Channel (PUCCH) formats 1a and 1b in a normal Cyclic Prefix (CP) case.
Figure 7:
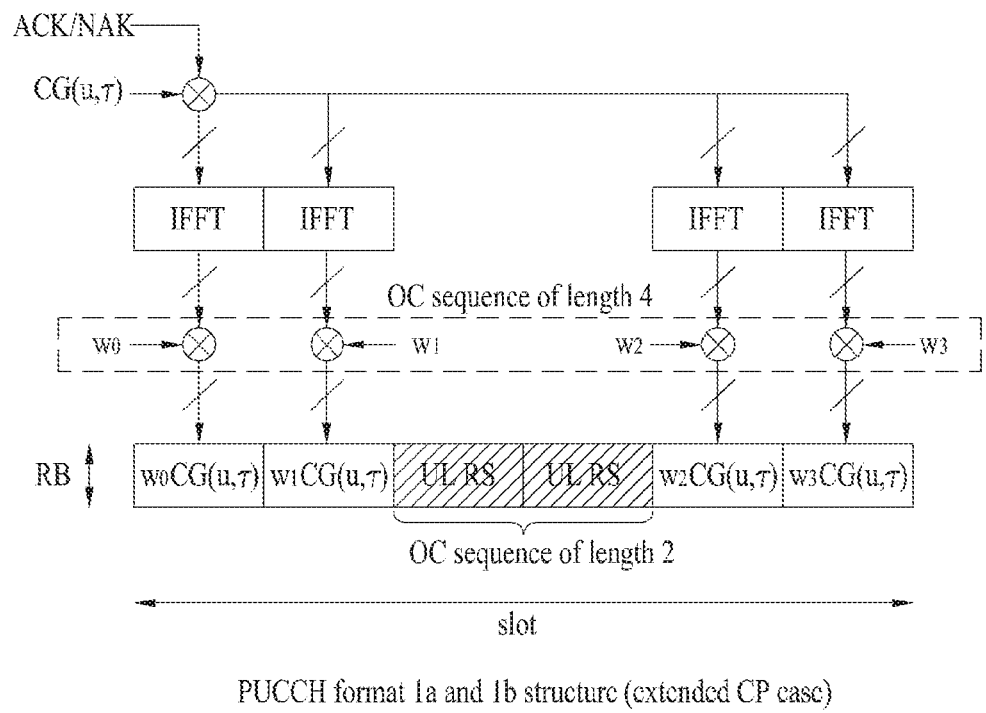
FIG. 7 is a view illustrating PUCCH formats 1a and 1b in an extended CP case.

FIG. 6 shows PUCCH formats 1a and 1b in case of a normal cyclic prefix. And, FIG. 7 shows PUCCH formats 1a and 1b in case of an extended cyclic prefix.

According to the PUCCH formats 1a and 1b, control information of the same content is repeated in a subframe by slot unit. In each UE, ACK/NACK signal is transmitted on a different resource constructed with a different cyclic shift (CS) (frequency domain code) and an orthogonal cover (OC) or orthogonal cover code (OCC) (time domain spreading code) of CG-CAZAC (computer-generated constant amplitude zero auto correlation) sequence. For instance, the OC includes Walsh/DFT orthogonal code. If the number of CS and the number of OC are 6 and 3, respectively, total 18 UEs may be multiplexed within the same PRB (physical resource block) with reference to a single antenna. Orthogonal sequences w0, w1, w2 and w3 may be applicable to a random time domain (after FFT modulation) or a random frequency domain (before FFT modulation).

For persistent scheduling with SR, ACK/NACK resource constructed with CS, OC and PRB (physical resource block) may be allocated to a UE through RRC (radio resource control. For non-persistent scheduling with dynamic ACK/NACK, the ACK/NACK resource may be implicitly allocated to a UE using a smallest CCE index of PDCCH corresponding to PDSCH.

Length-4 orthogonal sequence (OC) and length-3 orthogonal sequence for PUCCH format 1/1a/1b are shown in Table 9 and Table 10, respectively.

TABLE 9

| Sequence index $n_{oc}$ ($n_s$) | Orthogonal sequences [w(0) ... w($N_{SF}^{PUCCH}$ − 1)] |
| --- | --- |
| 0 | [+1 +1 +1 +1] |
| 1 | [+1 −1 +1 −1] |
| 2 | [+1 −1 −1 +1] |

TABLE 10

| Sequence index $n_{oc}$ ($n_s$) | Orthogonal sequences [w(0) ... w($N_{SF}^{PUCCH}$ − 1)] |
| --- | --- |
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

Orthogonal sequence (OC) [$\overline{w}(0) ... \overline{w}(N_{RS}^{PUCCH}-1)$] for a reference signal in PUCCH format 1/1a/1b is shown in Table 11.

TABLE 11

| Sequence index $\overline{n}_{oc}$ ($n_s$) | Normal cyclic prefix | Extended cyclic prefix |
| --- | --- | --- |
| 0 | [1 1 1] | [1 1] |
| 1 | [1 $e^{j2\pi/3}$ $e^{j4\pi/3}$] | [1 −1] |
| 2 | [1 $e^{j4\pi/3}$ $e^{j2\pi/3}$] | N/A |

Figure 8:
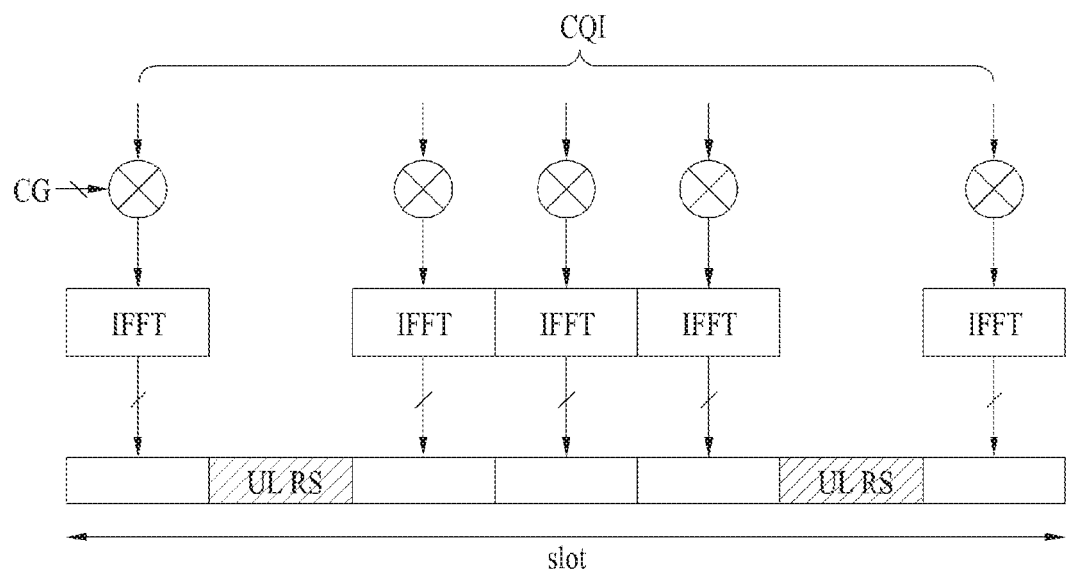
FIG. 8 is a view illustrating PUCCH format 2/2a/2b in the normal CP case.

FIG. 8 shows PUCCH format 2/2a/2b in case of a normal cyclic prefix. And, FIG. 9 shows PUCCH format 2/2a/2b in case of an extended cyclic prefix.

Figure 9:
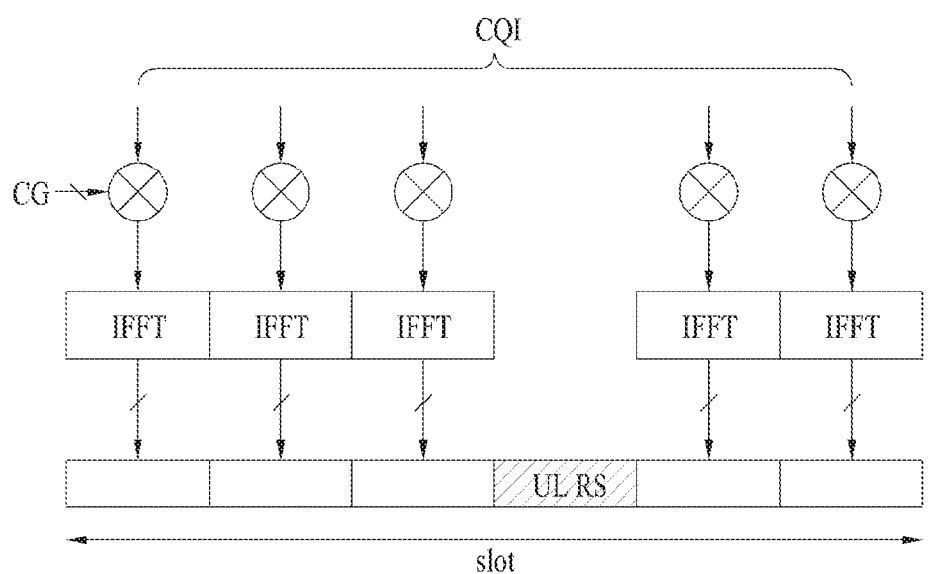
FIG. 9 is a view illustrating PUCCH format 2/2a/2b in the extended CP case.

Referring to FIG. 8 and FIG. 9, in case of a normal CP, a subframe is constructed with 10 QPSK data symbols as well as RS symbol. Each QPSK symbol is spread in a frequency domain by CS and is then mapped to a corresponding SC-FDMA symbol. SC-FDMA symbol level CS hopping may be applied to randomize inter-cell interference. The RS may be multiplexed by CDM using a cyclic shift. For instance, assuming that the number of available CSs is 12, 12 UEs may be multiplexed in the same PRB. For instance, assuming that the number of available CSs is 6, 6 UEs may be multiplexed in the same PRB. In brief, a plurality of UEs in PUCCH format 1/1a/1b and PUCCH format 2/2a/2b may be multiplexed by 'CS+OC+PRB' and 'CS+PRB', respectively.

FIG. 10 is a diagram of ACK/NACK channelization for PUCCH formats 1a and 1b. In particular, FIG. 10 corresponds to a case of 'Δshift PUCCH=2'

Figure 11:
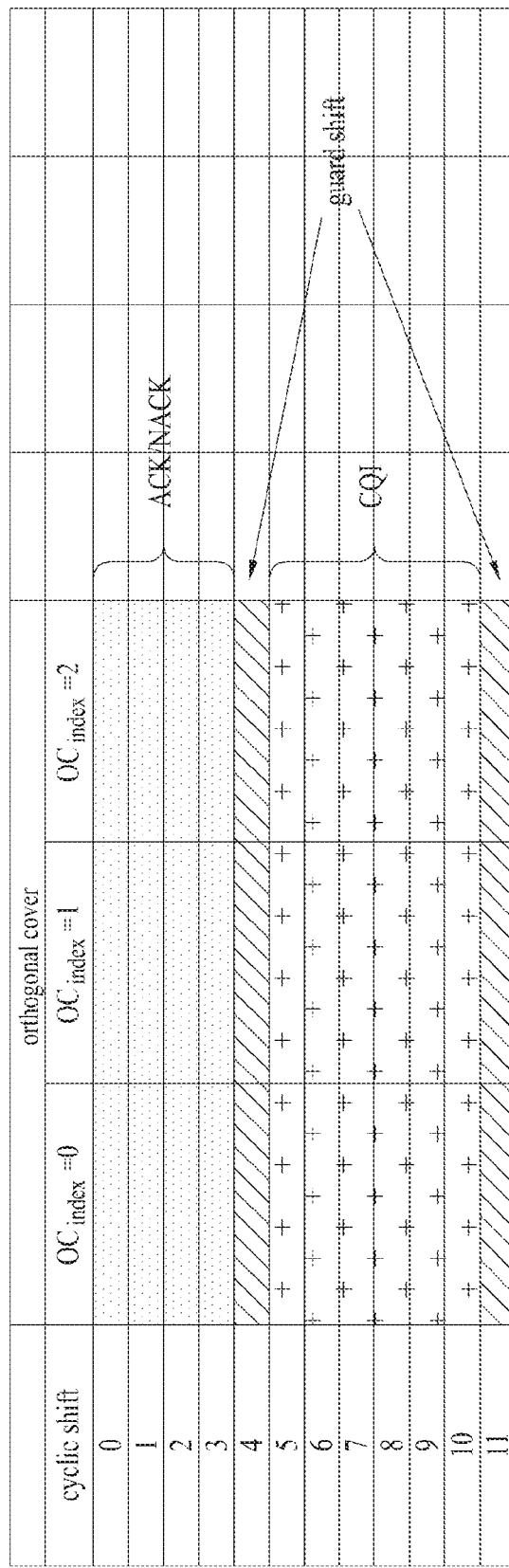
FIG. 11 is a view illustrating channelization for a hybrid structure of PUCCH format 1a/1b and PUCCH format 2/2a/2b in the same Physical Resource Block (PRB)

FIG. 11 is a diagram of channelization for a hybrid structure of PUCCH format 1/1a/1b and PUCCH format 2/2a/2b.

Cyclic shift (CS) hopping and orthogonal cover (OC) remapping may be applicable in a following manner.

(1) Symbol-based cell-specific CS hopping for randomization of inter-cell interference (2) Slot level CS/OC remapping 1) For inter-cell interference randomization 2) Slot based access for mapping between ACK/NACK channel and resource (k)

Meanwhile, resource nr for PUCCH format 1/1a/1b may include the following combinations.

(1) CS(=equal to DFT orthogonal code at symbol level) (ncs)

(2) OC (orthogonal cover at slot level) ($n_{oc}$)

(3) Frequency RB (Resource Block) ($n_{rb}$)

If indexes indicating CS, OC and RB are set to $n_{cs}$, $n_{oc}$, $n_{rb}$, respectively, a representative index nr may include $n_{cs}$, $n_{oc}$ and $n_{rb}$. In this case, the nr may meet the condition of '$n_r=(n_{cs}, n_{oc}, n_{rb})$'.

The combination of CQI, PMI, RI, CQI and ACK/NACK may be delivered through the PUCCH format 2/2a/2b. And, Reed Muller (RM) channel coding may be applicable.

For instance, channel coding for UL (uplink) CQI in LTE system may be described as follows. First of all, bitstreams $a_0, a_1, a_2, a_3, \ldots, a_{A-1}$ may be coded using (20, A) RM code. In this case, $a_0$ and $a_{A-1}$ indicates MSB (Most Significant Bit) and LSB (Least Significant Bit), respectively. In case of an extended cyclic prefix, maximum information bits include 11 bits except a case that QI and ACK/NACK are simultaneously transmitted. After coding has been performed with 20 bits using the RM code, QPSK modulation may be applied. Before the BPSK modulation, coded bits may be scrambled.

Table 12 shows a basic sequence for (20, A) code.

TABLE 12

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 0  | 1 | 1 | 0 | 0 | 0 | 0 | 0 | 0 | 0 | 0 | 1 | 1 | 0 |
| 1  | 1 | 1 | 1 | 0 | 0 | 0 | 0 | 0 | 0 | 1 | 1 | 1 | 0 |
| 2  | 1 | 0 | 0 | 1 | 0 | 0 | 1 | 0 | 1 | 1 | 1 | 1 | 1 |
| 3  | 1 | 0 | 1 | 1 | 0 | 0 | 0 | 1 | 0 | 1 | 1 | 1 | 1 |
| 4  | 1 | 1 | 1 | 1 | 0 | 0 | 0 | 1 | 0 | 0 | 1 | 1 | 1 |
| 5  | 1 | 1 | 0 | 0 | 1 | 0 | 1 | 1 | 1 | 0 | 1 | 1 | 1 |
| 6  | 1 | 0 | 1 | 0 | 1 | 0 | 1 | 0 | 1 | 1 | 1 | 1 | 1 |
| 7  | 1 | 0 | 0 | 1 | 1 | 0 | 0 | 1 | 1 | 0 | 1 | 1 | 1 |
| 8  | 1 | 1 | 0 | 1 | 1 | 0 | 0 | 1 | 0 | 1 | 1 | 1 | 1 |
| 9  | 1 | 0 | 1 | 1 | 1 | 0 | 1 | 0 | 0 | 1 | 1 | 1 | 1 |
| 10 | 1 | 0 | 1 | 0 | 0 | 1 | 1 | 1 | 0 | 1 | 1 | 1 | 1 |
| 11 | 1 | 1 | 1 | 0 | 0 | 1 | 1 | 0 | 1 | 0 | 1 | 1 | 1 |
| 12 | 1 | 0 | 0 | 1 | 0 | 1 | 0 | 1 | 1 | 1 | 1 | 1 | 1 |
| 13 | 1 | 1 | 0 | 1 | 0 | 1 | 0 | 1 | 0 | 1 | 1 | 1 | 1 |
| 14 | 1 | 0 | 0 | 0 | 1 | 1 | 0 | 1 | 0 | 0 | 1 | 0 | 1 |
| 15 | 1 | 1 | 0 | 0 | 1 | 1 | 1 | 1 | 0 | 1 | 1 | 0 | 1 |
| 16 | 1 | 1 | 1 | 0 | 1 | 1 | 1 | 0 | 0 | 1 | 0 | 1 | 1 |
| 17 | 1 | 0 | 0 | 1 | 1 | 1 | 0 | 0 | 1 | 0 | 0 | 1 | 1 |
| 18 | 1 | 1 | 0 | 1 | 1 | 1 | 1 | 1 | 0 | 0 | 0 | 0 | 0 |
| 19 | 1 | 0 | 0 | 0 | 0 | 1 | 1 | 0 | 0 | 0 | 0 | 0 | 0 |

Channel coding bits $b_0, b_1, b_2, b_3, \ldots b_{B-1}$ may be generated by [Equation 31].

$$b_i = \sum_{n=0}^{A-1}(a_n \cdot M_{i,n}) \bmod 2 \quad \text{[Equation 3]}$$

In [Equation 3], 'i=0, 1, 2, . . . , B−1' is met.

In case of wideband repots, a bandwidth of UCI (uplink control information) field for CQI/PMI can be represented as Tables 8 to 10 in the following.

[Table 13] shows UCI (Uplink Control Information) field for broadband report (single antenna port, transmit diversity) or open loop spatial multiplexing PDSCH CQI feedback.

TABLE 13

| Field | Bandwidth |
|---|---|
| Wideband CQI | 4 |

[Table 14] shows UL control information (UCI) field for CQI and PMI feedback in case of wideband reports (closed loop spatial multiplexing PDSCH transmission).

TABLE 14

| | Bandwidth | | | |
|---|---|---|---|---|
| | 2 antenna ports | | 4 antenna ports | |
| Field | rank = 1 | rank = 2 | rank = 1 | Rank > 1 |
| Wideband CQI | 4 | 4 | 4 | 4 |
| Spatial differential CQI | 0 | 3 | 0 | 3 |
| Precoding Matrix Indication | 2 | 1 | 4 | 4 |

[Table 15] shows UL control information (UCI) field for RI feedback in case of wideband reports.

TABLE 15

| | Bit widths | | |
|---|---|---|---|
| | | 4 antenna ports | |
| Field | 2 antenna ports | Max. 2 layers | Max. 4 layers |
| Rank Indication | 1 | 1 | 2 |

Figure 12:
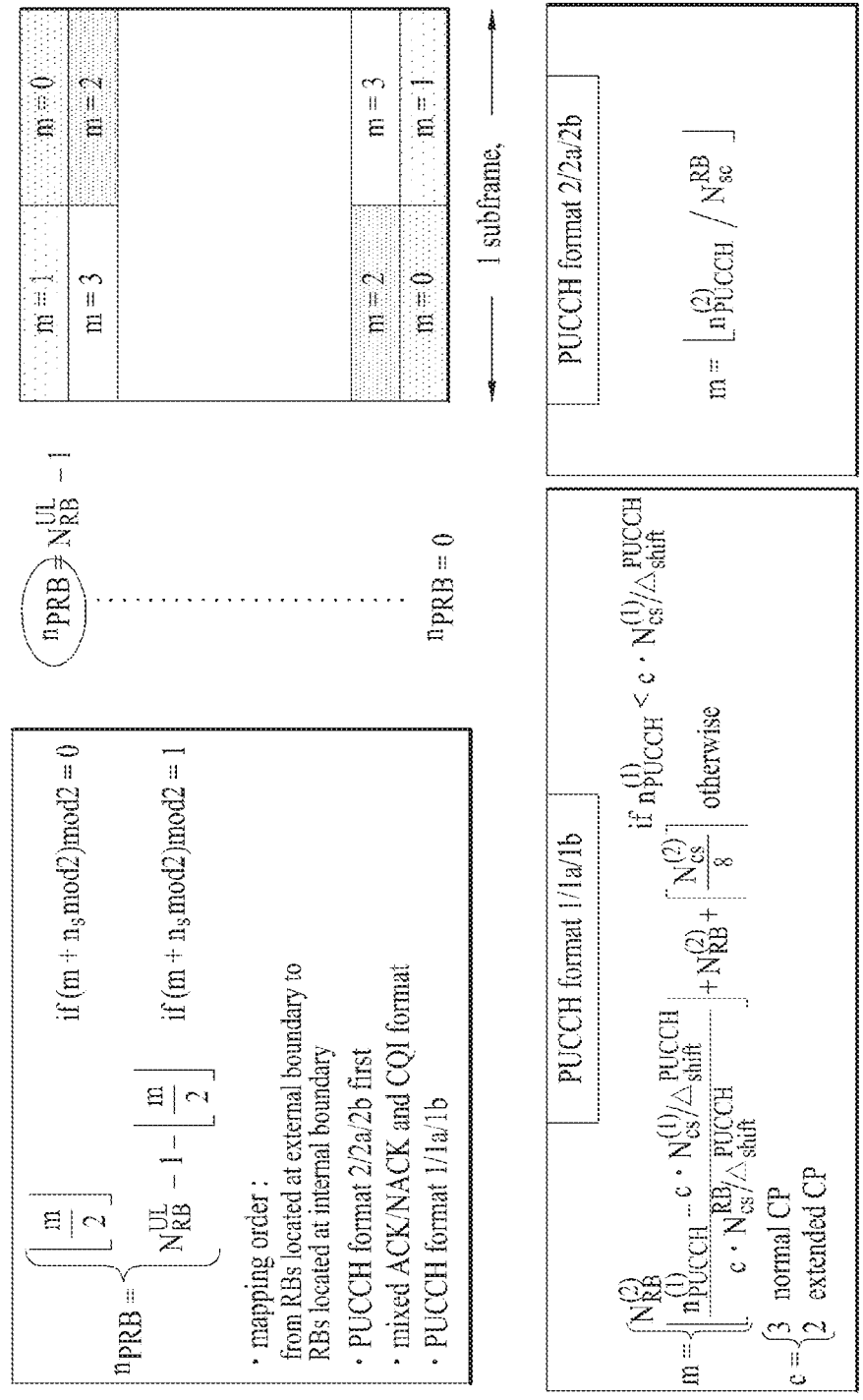
FIG. 12 is a view illustrating a PRB allocation method.
Figure 20:
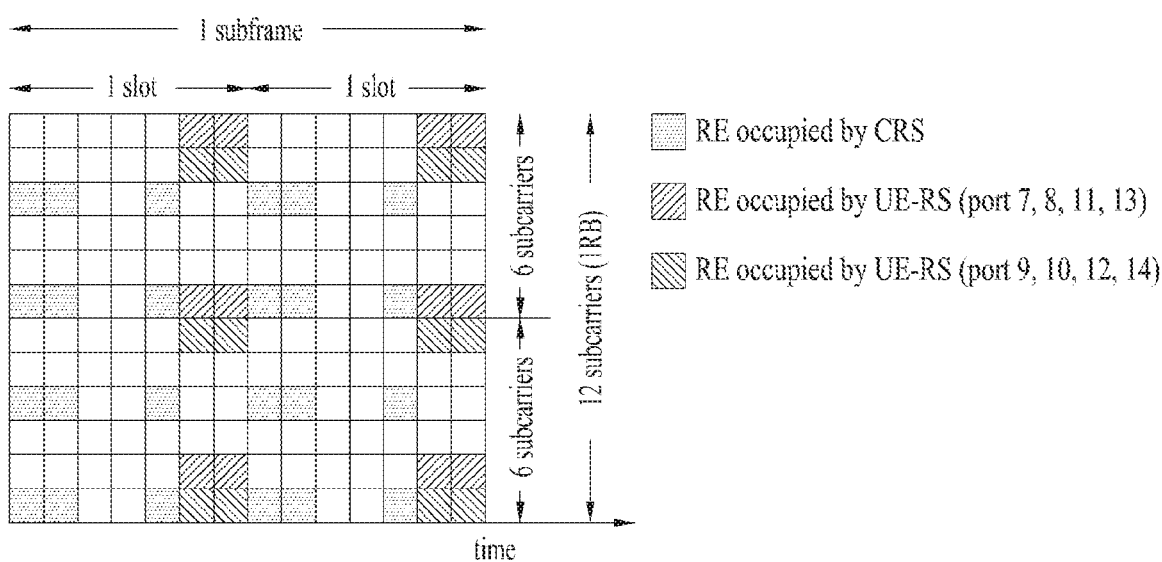
FIG. 20 is a view illustrating an exemplary subframe to which User Equipment (UE)-specific Reference Signals (RSs) (UE-RSs) are allocated, which may be used in embodiments of the present disclosure.

FIG. 12 is a diagram for PRB allocation. Referring to FIG. 20, PRB may be usable for PUCCH transmission in a slot $n_s$.

2. Carrier Aggregation (CA) Environment 2.1 CA Overview

A 3GPP LTE system (conforming to Rel-8 or Rel-9) (hereinafter, referred to as an LTE system) uses Multi-Carrier Modulation (MCM) in which a single Component Carrier (CC) is divided into a plurality of bands. In contrast, a 3GPP LTE-A system (hereinafter, referred to an LTE-A system) may use CA by aggregating one or more CCs to support a broader system bandwidth than the LTE system. The term CA is interchangeably used with carrier combining, multi-CC environment, or multi-carrier environment.

In the present disclosure, multi-carrier means CA (or carrier combining). Herein, CA covers aggregation of contiguous carriers and aggregation of non-contiguous carriers. The number of aggregated CCs may be different for a DL and a UL. If the number of DL CCs is equal to the number of UL CCs, this is called symmetric aggregation. If the number of DL CCs is different from the number of UL CCs, this is called asymmetric aggregation. The term CA is interchangeable with carrier combining, bandwidth aggregation, spectrum aggregation, etc.

The LTE-A system aims to support a bandwidth of up to 100 MHz by aggregating two or more CCs, that is, by CA. To guarantee backward compatibility with a legacy IMT system, each of one or more carriers, which has a smaller bandwidth than a target bandwidth, may be limited to a bandwidth used in the legacy system.

For example, the legacy 3GPP LTE system supports bandwidths {1.4, 3, 5, 10, 15, and 20 MHz} and the 3GPP LTE-A system may support a broader bandwidth than 20 MHz using these LTE bandwidths. A CA system of the present disclosure may support CA by defining a new bandwidth irrespective of the bandwidths used in the legacy system.

There are two types of CA, intra-band CA and inter-band CA. Intra-band CA means that a plurality of DL CCs and/or UL CCs are successive or adjacent in frequency. In other words, the carrier frequencies of the DL CCs and/or UL CCs are positioned in the same band. On the other hand, an environment where CCs are far away from each other in frequency may be called inter-band CA. In other words, the carrier frequencies of a plurality of DL CCs and/or UL CCs are positioned in different bands. In this case, a UE may use a plurality of Radio Frequency (RF) ends to conduct communication in a CA environment.

The LTE-A system adopts the concept of cell to manage radio resources. The above-described CA environment may be referred to as a multi-cell environment. A cell is defined as a pair of DL and UL CCs, although the UL resources are not mandatory. Accordingly, a cell may be configured with DL resources alone or DL and UL resources.

For example, if one serving cell is configured for a specific UE, the UE may have one DL CC and one UL CC. If two or more serving cells are configured for the UE, the UE may have as many DL CCs as the number of the serving cells and as many UL CCs as or fewer UL CCs than the number of the serving cells, or vice versa. That is, if a plurality of serving cells are configured for the UE, a CA environment using more UL CCs than DL CCs may also be supported.

CA may be regarded as aggregation of two or more cells having different carrier frequencies (center frequencies). Herein, the term 'cell' should be distinguished from 'cell' as a geographical area covered by an eNB. Hereinafter, intra-band CA is referred to as intra-band multi-cell and inter-band CA is referred to as inter-band multi-cell.

In the LTE-A system, a Primacy Cell (PCell) and a Secondary Cell (SCell) are defined. A PCell and an SCell may be used as serving cells. For a UE in RRC_CONNECTED state, if CA is not configured for the UE or the UE does not support CA, a single serving cell including only a PCell exists for the UE. On the contrary, if the UE is in RRC_CONNECTED state and CA is configured for the UE, one or more serving cells may exist for the UE, including a PCell and one or more SCells.

Serving cells (PCell and SCell) may be configured by an RRC parameter. A physical-layer ID of a cell, PhysCellId is an integer value ranging from 0 to 503. A short ID of an SCell, SCellIndex is an integer value ranging from 1 to 7. A short ID of a serving cell (PCell or SCell), ServeCellIndex is an integer value ranging from 1 to 7. If ServeCellIndex is 0, this indicates a PCell and the values of ServeCellIndex for SCells are pre-assigned. That is, the smallest cell ID (or cell index) of ServeCellIndex indicates a PCell.

A PCell refers to a cell operating in a primary frequency (or a primary CC). A UE may use a PCell for initial connection establishment or connection reestablishment. The PCell may be a cell indicated during handover. In addition, the PCell is a cell responsible for control-related communication among serving cells configured in a CA environment. That is, PUCCH allocation and transmission for the UE may take place only in the PCell. In addition, the UE may use only the PCell in acquiring system information or changing a monitoring procedure. An Evolved Universal Terrestrial Radio Access Network (E-UTRAN) may change only a PCell for a handover procedure by a higher layer RRCConnectionReconfiguraiton message including mobilityControlInfo to a UE supporting CA.

An SCell may refer to a cell operating in a secondary frequency (or a secondary CC). Although only one PCell is allocated to a specific UE, one or more SCells may be allocated to the UE. An SCell may be configured after RRC connection establishment and may be used to provide additional radio resources. There is no PUCCH in cells other than a PCell, that is, in SCells among serving cells configured in the CA environment.

When the E-UTRAN adds an SCell to a UE supporting CA, the E-UTRAN may transmit all system information related to operations of related cells in RRC_CONNECTED state to the UE by dedicated signaling. Changing system information may be controlled by releasing and adding a related SCell. Herein, a higher layer RRCConnectionReconfiguration message may be used. The E-UTRAN may transmit a dedicated signal having a different parameter for each cell rather than it broadcasts in a related SCell.

After an initial security activation procedure starts, the E-UTRAN may configure a network including one or more SCells by adding the SCells to a PCell initially configured during a connection establishment procedure. In the CA environment, each of a PCell and an SCell may operate as a CC. Hereinbelow, a Primary CC (PCC) and a PCell may be used in the same meaning and a Secondary CC (SCC) and an SCell may be used in the same meaning in embodiments of the present disclosure.

Figure 13:
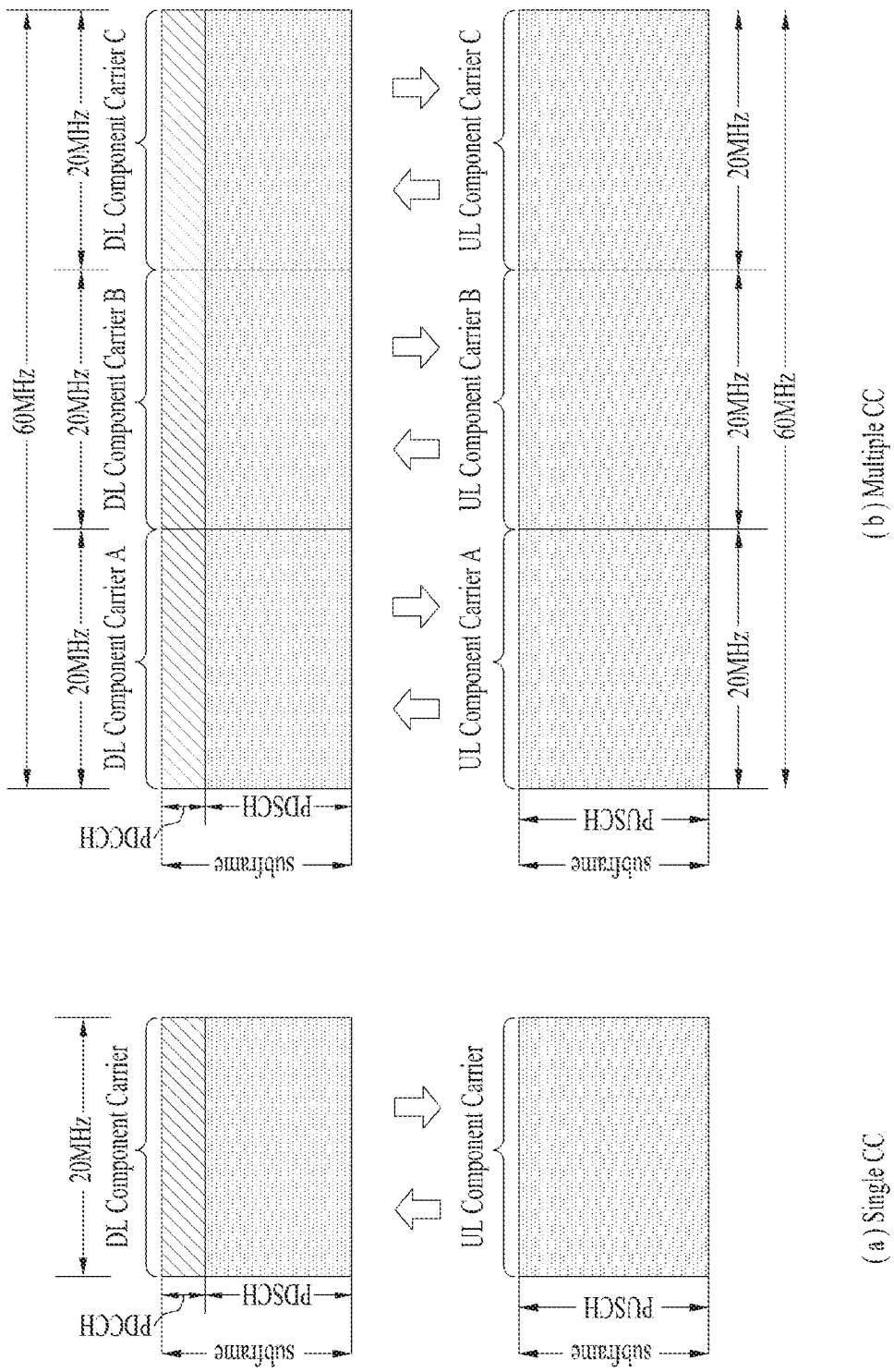
FIG. 13 is a view illustrating exemplary Component Carriers (CCs) and exemplary Carrier Aggregation (CA) in a Long Term Evolution-Advanced (LTE-A) system, which are used in embodiments of the present disclosure.

FIG. 13 illustrates an example of CCs and CA in the LTE-A system, which are used in embodiments of the present disclosure.

FIG. 13(a) illustrates a single carrier structure in the LTE system. There are a DL CC and a UL CC and one CC may have a frequency range of 20 MHz.

FIG. 13(b) illustrates a CA structure in the LTE-A system. In the illustrated case of FIG. 13(b), three CCs each having 20 MHz are aggregated. While three DL CCs and three UL CCs are configured, the numbers of DL CCs and UL CCs are not limited. In CA, a UE may monitor three CCs simultaneously, receive a DL signal/DL data in the three CCs, and transmit a UL signal/UL data in the three CCs.

If a specific cell manages N DL CCs, the network may allocate M (M≤N) DL CCs to a UE. The UE may monitor only the M DL CCs and receive a DL signal in the M DL CCs. The network may prioritize L (L≤M≤N) DL CCs and allocate a main DL CC to the UE. In this case, the UE should monitor the L DL CCs. The same thing may apply to UL transmission.

The linkage between the carrier frequencies of DL resources (or DL CCs) and the carrier frequencies of UL resources (or UL CCs) may be indicated by a higher layer message such as an RRC message or by system information. For example, a set of DL resources and UL resources may be configured based on linkage indicated by System Information Block Type 2 (SIB2). Specifically, DL-UL linkage may refer to a mapping relationship between a DL CC carrying a PDCCH with a UL grant and a UL CC using the UL grant, or a mapping relationship between a DL CC (or a UL CC) carrying HARQ data and a UL CC (or a DL CC) carrying an HARQ ACK/NACK signal.

2.2 Cross Carrier Scheduling

Two scheduling schemes, self-scheduling and cross carrier scheduling are defined for a CA system, from the perspective of carriers or serving cells. Cross carrier scheduling may be called cross CC scheduling or cross cell scheduling.

In self-scheduling, a PDCCH (carrying a DL grant) and a PDSCH are transmitted in the same DL CC or a PUSCH is transmitted in a UL CC linked to a DL CC in which a PDCCH (carrying a UL grant) is received.

In cross carrier scheduling, a PDCCH (carrying a DL grant) and a PDSCH are transmitted in different DL CCs or a PUSCH is transmitted in a UL CC other than a UL CC linked to a DL CC in which a PDCCH (carrying a UL grant) is received.

Cross carrier scheduling may be activated or deactivated UE-specifically and indicated to each UE semi-statically by higher layer signaling (e.g. RRC signaling).

If cross carrier scheduling is activated, a Carrier Indicator Field (CIF) is required in a PDCCH to indicate a DL/UL CC in which a PDSCH/PUSCH indicated by the PDCCH is to be transmitted. For example, the PDCCH may allocate PDSCH resources or PUSCH resources to one of a plurality of CCs by the CIF. That is, when a PDCCH of a DL CC allocates PDSCH or PUSCH resources to one of aggregated DL/UL CCs, a CIF is set in the PDCCH. In this case, the DCI formats of LTE Release-8 may be extended according to the CIF. The CIF may be fixed to three bits and the position of the CIF may be fixed irrespective of a DCI format size. In addition, the LTE Release-8 PDCCH structure (the same coding and resource mapping based on the same CCEs) may be reused.

On the other hand, if a PDCCH transmitted in a DL CC allocates PDSCH resources of the same DL CC or allocates PUSCH resources in a single UL CC linked to the DL CC, a CIF is not set in the PDCCH. In this case, the LTE Release-8 PDCCH structure (the same coding and resource mapping based on the same CCEs) may be used.

If cross carrier scheduling is available, a UE needs to monitor a plurality of PDCCHs for DCI in the control region of a monitoring CC according to the transmission mode and/or bandwidth of each CC. Accordingly, an appropriate SS configuration and PDCCH monitoring are needed for the purpose.

In the CA system, a UE DL CC set is a set of DL CCs scheduled for a UE to receive a PDSCH, and a UE UL CC set is a set of UL CCs scheduled for a UE to transmit a PUSCH. A PDCCH monitoring set is a set of one or more DL CCs in which a PDCCH is monitored. The PDCCH monitoring set may be identical to the UE DL CC set or may be a subset of the UE DL CC set. The PDCCH monitoring set may include at least one of the DL CCs of the UE DL CC set. Or the PDCCH monitoring set may be defined irrespective of the UE DL CC set. DL CCs included in the PDCCH monitoring set may be configured to always enable self-scheduling for UL CCs linked to the DL CCs. The UE DL CC set, the UE UL CC set, and the PDCCH monitoring set may be configured UE-specifically, UE group-specifically, or cell-specifically.

If cross carrier scheduling is deactivated, this implies that the PDCCH monitoring set is always identical to the UE DL CC set. In this case, there is no need for signaling the PDCCH monitoring set. However, if cross carrier scheduling is activated, the PDCCH monitoring set may be defined within the UE DL CC set. That is, the eNB transmits a PDCCH only in the PDCCH monitoring set to schedule a PDSCH or PUSCH for the UE.

Figure 14:
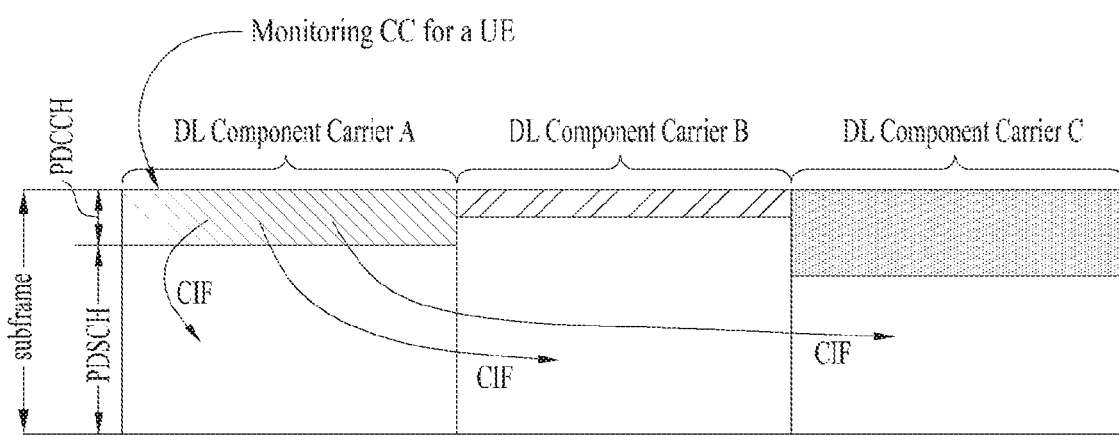
FIG. 14 is a view illustrating a subframe structure based on cross-carrier scheduling in the LTE-A system, which is used in embodiments of the present disclosure.

FIG. 14 illustrates a cross carrier-scheduled subframe structure in the LTE-A system, which is used in embodiments of the present disclosure.

Referring to FIG. 14, three DL CCs are aggregated for a DL subframe for LTE-A UEs. DL CC 'A' is configured as a PDCCH monitoring DL CC. If a CIF is not used, each DL CC may deliver a PDCCH that schedules a PDSCH in the same DL CC without a CIF. On the other hand, if the CIF is used by higher layer signaling, only DL CC 'A' may carry a PDCCH that schedules a PDSCH in the same DL CC 'A' or another CC. Herein, no PDCCH is transmitted in DL CC 'B' and DL CC 'C' that are not configured as PDCCH monitoring DL CCs.

Figure 15:
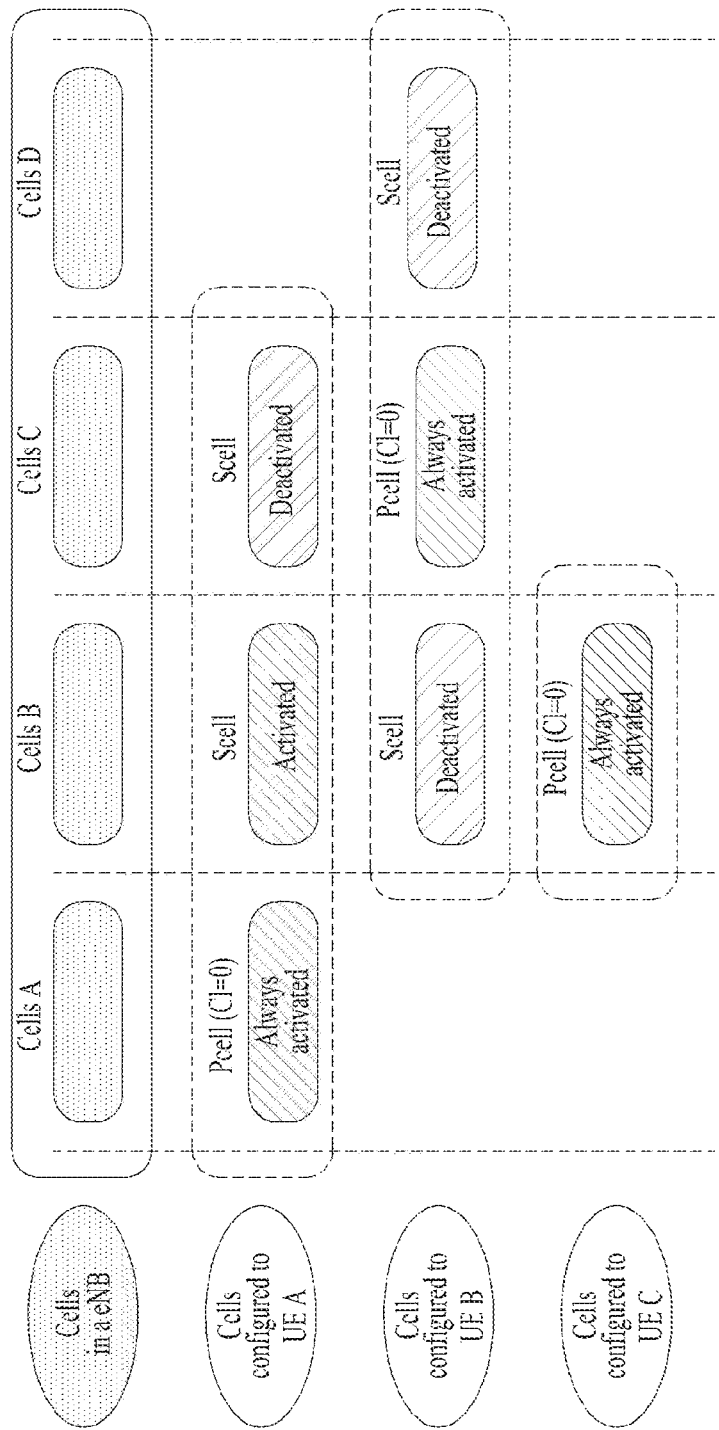
FIG. 15 is a view illustrating an exemplary configuration of serving cells according to cross-carrier scheduling used in embodiments of the present disclosure.

FIG. 15 is conceptual diagram illustrating a construction of serving cells according to cross-carrier scheduling.

Referring to FIG. 15, an eNB (or BS) and/or UEs for use in a radio access system supporting carrier aggregation (CA) may include one or more serving cells. In FIG. 8, the eNB can support a total of four serving cells (cells A, B, C and D). It is assumed that UE A may include Cells (A, B, C), UE B may include Cells (B, C, D), and UE C may include Cell B. In this case, at least one of cells of each UE may be composed of P Cell. In this case, P Cell is always activated, and SCell may be activated or deactivated by the eNB and/or UE.

The cells shown in FIG. 15 may be configured per UE. The above-mentioned cells selected from among cells of the eNB, cell addition may be applied to carrier aggregation (CA) on the basis of a measurement report message received from the UE. The configured cell may reserve resources for ACK/NACK message transmission in association with PDSCH signal transmission. The activated cell is configured to actually transmit a PDSCH signal and/or a PUSCH signal from among the configured cells, and is configured to transmit CSI reporting and Sounding Reference Signal (SRS) transmission. The deactivated cell is configured not to transmit/receive PDSCH/PUSCH signals by an eNB command or a timer operation, and CRS reporting and SRS transmission are interrupted.

2.4 Channel State Information (CSI) Feedback on PUCCH

First of all, in the 3GPP LTE system, when a DL reception entity (e.g., UE) is connected to a DL transmission entity (e.g., BS), the DL reception entity performs measurement on a Reference Signal Received Power (RSRP) of a reference signal transmitted in DL, a quality of a reference signal (RSRQ: Reference Signal Received Quality) and the like at a random time and is then able to make a periodic or even-triggered report of a corresponding measurement result to the BS.

Each UE reports a DL channel information in accordance with a DL channel status via uplink. A base station is then able to determine time/frequency resources, MCS (modulation and coding scheme) and the like appropriate for a data transmission to each UE using the DL channel information received from the each UE.

Such Channel State Information (CSI) may include Channel Quality Indicator (CQI), Precoding Matrix Indicator (PMI), Precoder Type Indication (PTI) and/or Rank Indication (RI). In particular, the CSI may be transmitted entirely or partially depending on a transmission mode of each UE. CQI is determined based on a received signal quality of a UE, which may be generally determined on the basis of a measurement of a DL reference signal. In doing so, a CQI value actually delivered to a base station may correspond to an MCS capable of providing maximum performance by maintaining a Block Error Rate (BLER) under 10% in the received signal quality measured by a UE.

This channel information reporting may be classified into a periodic report transmitted periodically and an aperiodic report transmitted in response to a request made by a BS.

In case of the aperiodic report, it is set for each UE by a 1-bit request bit (CQI request bit) contained in UL scheduling information downloaded to a UE by a BS. Having received this information, each UE is then able to deliver channel information to the BS via a Physical Uplink Shared Channel (PUSCH) in consideration of its transmission mode. And, it may set RI and CQI/PMI not to be transmitted on the same PUSCH.

In case of the periodic report, a period for transmitting channel information via an upper layer signal, an offset in the corresponding period and the like are signaled to each UE by subframe unit and channel information in consideration of a transmission mode of each UE may be delivered to a BS via a Physical Uplink Control Channel (PUCCH) in accordance with a determined period. In case that data transmitted in uplink simultaneously exists in a subframe in which channel information is transmitted by a determined period, the corresponding channel information may be transmitted together with the data not on the PUCCH but on a Physical Uplink Shared Channel (PUSCH). In case of the periodic report via PUCCH, bits (e.g., 11 bits) limited further than those of the PUSCH may be used. RI and CQI/PMI may be transmitted on the same PUSCH.

In case that contention occurs between the periodic report and the aperiodic report in the same subframe, only the aperiodic report can be performed.

In calculating Wideband CQI/PMI, a most recently transmitted RI may be usable. RI in a PUCCH CSI report mode is independent from RI in a PUSCH CSI report mode. The RI in the PUSCH CSI report mode is valid for CQI/PMI in the corresponding PUSCH CSI report mode only.

Table 16 is provided to describe CSI feedback type transmitted on PUCCH and PUCCH CSI report mode.

Mode 1-1 corresponds to a case that a single PMI and WB CQI are transmitted. In this case, 4-bit WB CQI and 4-bit WB PMI can be transmitted together with RI transmission. Additionally, if RI is greater than 1, 3-bit WB (wideband) spatial differential CQI can be transmitted. In 2-codeword transmission, the WB spatial differential CQI may indicate a difference value between a WB CQI index for codeword 1 and a WB CQI index for codeword 2. The difference value in-between may have a value selected from a set {−4, −3, −2, −1, 0, 1, 2, 3} and can be represented as 3 bits.

The mode 2-0 corresponds to a case that CQI on a UE-selected band is transmitted in the absence of PMI transmission. In this case, RI is transmitted only in case of open-loop spatial multiplexing (SM) and a WB CQI represented as 4 bits may be transmitted. A best CQI (best-1) is transmitted on each bandwidth part (BP) and the best-1 CQI may be represented as 4 bits. And, an L-bit indicator indicating the best-1 may be transmitted together. If the RI is greater than 1, a CQI for a 1st codeword can be transmitted.

And, Mode 2-1 corresponds to a case that a single PMI and a CQI on a UE-selected band are transmitted. In this case, together with RI transmission, 4-bit WB CQI, 3-bit WB spiral differential CQI and 4-bit WB PMI can be transmitted. Additionally, 4-bit best-1 CQI is transmitted on each Bandwidth Part (BP) and L-bit best-1 indicator can be transmitted together. Additionally, if RI is greater than 1, 3-bit best-1 spatial differential CQI can be transmitted. In 2-codeword transmission, it may indicate a difference value between a best-1 CQI index of codeword 1 and a best-1 CQI index of codeword 2.

TABLE 16

| | | PMI Feedback Type | |
|---|---|---|---|
| | | No PMI (OL, TD, single-antenna) | Single PMI (CL) |
| CQI Feedback Type | Wideband | Mode 1-0<br>RI (only for Open-Loop SM)<br>One Wideband CQI (4 bit)<br>when RI > 1, CQI of first codeword | Mode 1-1<br>RI<br>Wideband CQI (4 bit)<br>Wideband spatial CQI (3 bit) for RI > 1<br>Wideband PMI (4 bit) |
| | UE Selected | Mode 2-0<br>RI (only for Open-Loop SM)<br>Wideband CQI (4 bit)<br>Best-1 CQI (4 bit) in each BP<br>Best-1 indicator(L-bit label)<br>when RI > 1, CQI of first codeword | Mode 2-1<br>RI<br>Wideband CQI (4 bit)<br>Wideband spatial CQI (3 bit) for RI > 1<br>Wideband PMI (4 bit)<br>Best-1 CQI (4 bit) 1 in each BP<br>Best-1 spatial CQI (3 bit) for RI > 1<br>Best-1 indicator (L-bit label) |

Referring to [Table 16], in the periodic report of channel information, there are 4 kinds of reporting modes (mode 1-0, mode 1-2, mode 2-0 and mode 2-1) in accordance with CQI and PMI feedback types.

CQI can be classified into WideBand (WB) CQI and SubBand (SB) CQI in accordance with CQI feedback type and PMI can be classified into No PMI or Single PMI in accordance with a presence or non-presence of PMI transmission. In Table 11, No PMI corresponds to a case of Open-Loop (OL), Transmit Diversity (TD) and single-antenna, while Single PMI corresponds to a case of Closed-Loop (CL).

The mode 1-0 corresponds to a case that WB CQI is transmitted in the absence of PMI transmission. In this case, RI is transmitted only in case of OL Spatial Multiplexing (SM) and one WB CQI represented as 4 bits can be transmitted. If RI is greater than 1, CQI for a 1st codeword can be transmitted.

For the transmission modes, periodic PUCCH CSI report modes are supported as follows.
 1) Transmission mode 1: Modes 1-0 and 2-0
 2) Transmission mode 2: Modes 1-0 and 2-0
 3) Transmission mode 3: Modes 1-0 and 2-0
 4) Transmission mode 4: Modes 1-1 and 2-1
 5) Transmission mode 5: Modes 1-1 and 2-1
 6) Transmission mode 6: Modes 1-1 and 2-1
 7) Transmission mode 7: Modes 1-0 and 2-0
 8) Transmission mode 8: Modes 1-1 and 2-1 if a UE is set to make a PMI/RI reporting, or Modes 1-0 and 2-0 if a UE is set not to make a PMI/RI reporting
 9) Transmission mode 9: Modes 1-1 and 2-1 if a UE is set to make a PMI/RI reporting and the number of CSI-RS ports is greater than 1, or Modes 1-0 and 2-0 if a UE is set not to make a PMI/RI reporting and the number of CSI-RS port(s) is equal to 1.

The periodic PUCCH CSIU reporting mode in each serving cell is set by upper layer signaling. And, Mode 1-1 is set to either submode 1 or submode 2 by an upper layer signaling using a parameter 'PUCCH_format 1-1_CSI_reporting_mode'.

A CQI reporting in a specific subframe of a specific serving cell in a UE-selected SB CQI means a measurement of at least one channel state of a bandwidth part (BP) corresponding to a portion of a bandwidth of a serving cell. An index is given to the bandwidth part in a frequency increasing order starting with a lowest frequency without an increment of a bandwidth.

2.4 Method for Transmitting ACK/NACK on PUCCH
2.4.1 ACK/NACK Transmission in LTE System Under the situation that a UE simultaneously transmits a plurality of ACKs/NACKs corresponding to multiple data units received from an eNB, in order to maintain the single-carrier property of ACK/NACK signals and reduce the total ACK/NACK transmission power, ACK/NACK multiplexing method based on PUCCH resource selection can be considered. With ACK/NACK multiplexing, contents of the ACK/NACK signals for multiple data units are identified by the combination of the PUCCH resource used in actual ACK/NACK transmission and the one of QPSK modulation symbols. For example, if it is assumed that one PUCCH resource carries 4 bits and 4 data units can be transmitted in maximum (at this time, assume that HARQ operation for each data unit can be managed by single ACK/NACK bit), the Transmission (Tx) node can identify the ACK/NACK result based on the transmission position of the PUCCH signal and the bits of the ACK/NACK signal as shown in [Table 17] below.

TABLE 17

| HARQ-ACK(0), HARQ-ACK(1), HARQ-ACK(2), HARQ-ACK(3) | $n_{PUCCH}^{(1)}$ | b(0), b(1) |
|---|---|---|
| ACK, ACK, ACK, ACK | $n_{PUCCH,1}^{(1)}$ | 1, 1 |
| ACK, ACK, ACK, NACK/DTX | $n_{PUCCH,1}^{(1)}$ | 1, 0 |
| NACK/DTX, NACK/DTX, NACK, DTX | $n_{PUCCH,2}^{(1)}$ | 1, 1 |
| ACK, ACK, NACK/DTX, ACK | $n_{PUCCH,1}^{(1)}$ | 1, 0 |
| NACK, DTX, DTX, DTX | $n_{PUCCH,0}^{(1)}$ | 1, 0 |
| ACK, ACK, NACK/DTX, NACK/DTX | $n_{PUCCH,1}^{(1)}$ | 1, 0 |
| ACK, NACK/DTX, ACK, ACK | $n_{PUCCH,3}^{(1)}$ | 0, 1 |
| NACK/DTX, NACK/DTX, NACK/DTX, NACK | $n_{PUCCH,3}^{(1)}$ | 1, 1 |
| ACK, NACK/DTX, ACK, NACK/DTX | $n_{PUCCH,2}^{(1)}$ | 0, 1 |
| ACK, NACK/DTX, NACK/DTX, ACK | $n_{PUCCH,0}^{(1)}$ | 0, 1 |
| ACK, NACK/DTX, NACK/DTX, NACK/DTX | $n_{PUCCH,0}^{(1)}$ | 1, 1 |
| NACK/DTX, ACK, ACK, ACK | $n_{PUCCH,3}^{(1)}$ | 0, 1 |
| NACK/DTX, NACK, DTX, DTX | $n_{PUCCH,1}^{(1)}$ | 0, 0 |
| NACK/DTX, ACK, ACK, NACK/DTX | $n_{PUCCH,2}^{(1)}$ | 1, 0 |
| NACK/DTX, ACK, NACK/DTX, ACK | $n_{PUCCH,3}^{(1)}$ | 1, 0 |
| NACK/DTX, ACK, NACK/DTX, NACK/DTX | $n_{PUCCH,1}^{(1)}$ | 0, 1 |
| NACK/DTX, NACK/DTX, ACK, ACK | $n_{PUCCH,3}^{(1)}$ | 0, 1 |
| NACK/DTX, NACK/DTX, ACK, NACK/DTX | $n_{PUCCH,2}^{(1)}$ | 0, 0 |
| NACK/DTX, NACK/DTX, NACK/DTX, ACK | $n_{PUCCH,3}^{(1)}$ | 0, 0 |
| DTX, DTX, DTX, DTX | N/A | N/A |

In [Table 17], HARQ-ACK(i) indicates the ACK/NACK result for the data unit i. For example, if a maximum of 4 data units is transmitted, i=0, 1, 2, 3. In Table 17, DTX means that there is no data unit transmitted for corresponding HARQ-ACK(i) or the Reception (Rx) node doesn't detect the existence of the data unit corresponding to HARQ-ACK(i).

In addition, $n_{PUCCH,X}^{(1)}$ indicates the PUCCH resource which should be used in actual ACK/NACK transmission, if there are 4 PUCCH resources, a maximum of four PUCCH (1) (1) (1) (1) resources $n_{PUCCH,0}^{(1)}$, $n_{PUCCH,1}^{(1)}$, $n_{PUCCH,2}^{(1)}$ and $n_{PUCCH,3}^{(1)}$ may be allocated to the UE.

In addition, b(0), b(1) indicates two bits carried by the selected PUCCH resource. Modulation symbols which are transmitted through PUCCH resource are decided according to the bits. For example, if the RX node receives and decodes 4 data units successfully, the RX node should transmit two bits, (1, 1), using PUCCH resource $n_{PUCCH,1}^{(1)}$. For another example, if the RX node receives 4 data units and fails in decoding the first and the third data units (corresponding to HARQ-ACK(O) and HARQ-ACK(2)), the RX node should transmit (1, 0) using $n_{PUCCH,3}^{(1)}$.

By linking the actual ACK/NACK contents with the combination of PUCCH resource selection and the actual bit contents in the transmitted PUCCH resource in this way, ACK/NACK transmission using a single PUCCH resource for multiple data units is possible.

In ACK/NACK multiplexing method (see Table 17), basically, NACK and DTX are coupled as NACK/DTX if at least one ACK exists for all data units. This is because combinations of PUCCH resources and QPSK symbols are insufficient to cover all ACK, NACK and DTX hypotheses. On the other hand, for the case that no ACK exists for all data units (in other words, NACK or DTX only exists for all data units), single NACK decoupled with DTX is defined one as HARQ-ACK(i). In this case, PUCCH resource linked to the data unit corresponding to single NACK can be also reserved to transmit the signal of multiple ACKs/NACKs.

2.4.2 ACK/NACK Transmission in LTE-A System

In an LTE-A system (e.g., Rel-10, 11, 12, etc.), transmission of a plurality of ACK/NACK signals for a plurality of PDSCH signals, which is transmitted via a plurality of DL CCs, via a specific UL CC is considered. Unlike ACK/NACK transmission using PUCCH format 1a/1b of an LTE system, a plurality of ACK/NACK signals may be subjected to channel coding (e.g., Reed-Muller coding, Tail-biting convolutional coding, etc.) and then a plurality of ACK/NACK information/signals may be transmitted using PUCCH format 2 or a new PUCCH format (e.g., an E-PUCCH format) modified based on block spreading.

Figure 16:
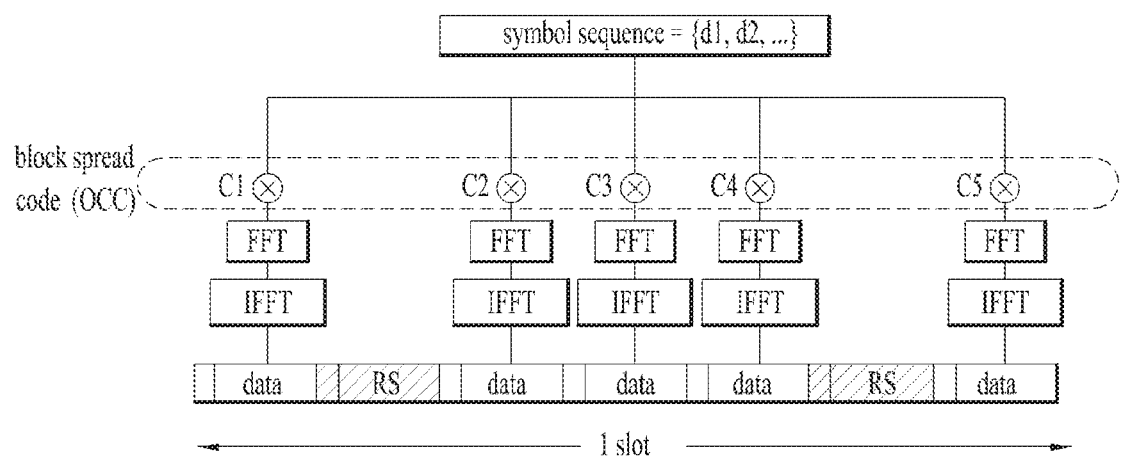
FIG. 16 is a view illustrating an exemplary new PUCCH format based on block spreading.

FIG. 16 shows an example of a new PUCCH format based on block spreading.

A block spreading scheme refers to a method for performing modulation using an SC-FDMA scheme unlike PUCCH format series 1 or 2 in an LTE system. The block spreading scheme refers to a scheme for time-domain spreading and transmitting a symbol sequence using an Orthogonal Cover Code (OCC) as shown in FIG. 16. That is, the symbol sequence is spread using the OCC to multiplex control signals of several UEs in the same RB.

In the above-described PUCCH format 2, one symbol sequence is transmitted over the time domain and UE multiplexing is performed using Cyclic Shift (CCS) of a CAZAC sequence. However, in the new PUCCH format based on block spreading, one symbol sequence is transmitted over the frequency domain and UE multiplexing is performed using time-domain spreading based on an OCC.

For example, as shown in FIG. 16, one symbol sequence may be generated as five SC-FDMA symbols by an OCC of length-5 (that is, SF=5). Although a total of 2 RS symbols is used during one slot in FIG. 16, various methods using three RS symbols and using an OCC of SF=4 may be used. At this time, the RS symbols may be generated from a CAZAC sequence having specific cyclic shift and may be transmitted in the form in which a specific OCC is applied (multiplied by) to a plurality of RS symbols of the time domain.

In the embodiments of the present disclosure, for convenience of description, a multi-ACK/NACK transmission scheme based on channel coding using PUCCH format 2 or a new PUCCH format (e.g., an E-PUCCH format) is defined as a "multi-bit ACK/NACK coding transmission method".

The multi-bit ACK/NACK coding method refers to a method for transmitting ACK/NACK code blocks generated by channel-coding ACK/NACK or DTX information (meaning that the PDCCH is not received/detected) for PDSCH signals transmitted on a plurality of DL CCs.

For example, when the UE operates on a certain DL CC in an SU-MIMO mode and receives two CodeWords (CW), the UE may have a maximum of five feedback states including a total of four feedback states of each CW, such as ACK/ACK, ACK/NACK, NACK/ACK and NACK/NACK, and DTX. When the UE receives a single CW, the UE may have a maximum of three states including ACK, NACK and/or DTX. When NACK and DTX are equally processed, the UE may have a total of two states such as ACK and NACK/DTX.

Accordingly, when the UE aggregates a maximum of five DL CCs and the UE operates on all DL CCs in an SU-MIMO mode, the UE may have a maximum of 55 transmittable feedback states. At this time, the size of ACK/NACK payload representing the 55 feedback states may be a total of 12 bits. If DTX and NACK are equally processed, the number of feedback states becomes 45 and the size of the ACK/NACK payload representing the feedback states is a total of 10 bits.

In an ACK/NACK multiplexing (that is, ACK/NACK selection) method applied to an LTE TDD system, fundamentally, an implicit ACK/NACK selection method in which an implicit PUCCH resource corresponding to a PDCCH scheduling each PDSCH (that is, linked to a smallest CCE index) is used for ACK/NACK transmission in order to secure a PUCCH resource of each UE.

In an LTE-A FDD system, transmission of a plurality of ACK/NACK signals for a plurality of PDSCH signals transmitted via a plurality of DL CCs via one UE-specific UL CC is considered. "ACK/NACK selection" methods using an implicit PUCCH resource linked to a PDCCH scheduling some or all DL CCs (that is, linked to a smallest CCE index nCCE or linked to nCCE and nCCE+1) or a combination of an implicit PUCCH and an explicit PUCCH resource pre-allocated to each UE via RRC signaling are considered.

Even in an LTE-A TDD system, aggregation of a plurality of CCs is considered. For example, when a plurality of CCs is aggregated, UE transmitting a plurality of ACK/NACK information/signals for a plurality of PDSCH signals transmitted via a plurality of DL subframes and a plurality of CCs via a specific CC (that is, A/N CC) in UL subframes corresponding to the plurality of DL subframes in which the PDSCH signals are transmitted is considered.

At this time, unlike LTE-A FDD, a method (that is, full ACK/NACK) for transmitting a plurality of ACK/NACK signals corresponding to a maximum number of CWs, which may be transmitted via all CCs allocated to the UE, for a plurality of DL subframes may be considered or a method (that is, bundled ACK/NACK) for applying ACK/NACK bundling to a CW, CC and/or a subframe region, reducing the number of transmitted ACKs/NACKs and performing transmission may be considered.

At this time, CW bundling means that ACK/NACK bundling for CW per CC is applied to each DL subframe and CC bundling means that ACK/NACK bundling for all or some CCs is applied to each DL subframe. In addition, subframe bundling means that ACK/NACK bundling for all or some DL subframes is applied to each CC.

As the subframe bundling method, an ACK counter method indicating a total number of ACKs (or the number of some ACKs) per CC for all PDSCH signals or DL grant PDCCHs received on each DL CC may be considered. At this time, the multi-bit ACK/NACK coding scheme or the ACK/NACK transmission scheme based on the ACK/NACK selection method may be configurably applied according to the size of the ACK/NACK payload per UE, that is, the size of the ACK/NACK payload for transmission of full or bundled ACK/NACK configured per UE.

2.5 Procedure for Transmitting and Receiving PUCCH

In a mobile communication system, one eNB transmits and receives data to and from a plurality of UEs via a wireless channel environment in one cell/sector. In a system operating using multiple carriers or the like, the eNB receives packet traffic from a wired Internet network and transmits the received packet traffic to each UE using a predetermined communication scheme. At this time, downlink scheduling is how the eNB determines when data is transmitted to which UE using which frequency domain. In addition, the eNB receives and demodulates data from the UE using a predetermined communication scheme and transmits packet traffic over a wired Internet network. Uplink scheduling is how the eNB determines when to enable which UE to transmit uplink data using which frequency domain. In general, a UE having a good channel state may transmit and receive data using more time and frequency resources.

Figure 17:
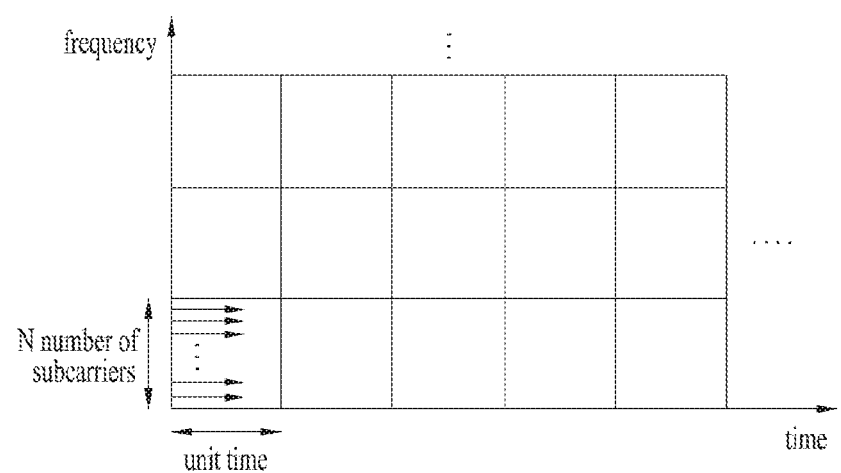
FIG. 17 is a view illustrating an exemplary configuration of a Resource Unit (RB) with time-frequency units.

In a system operating using multiple carriers or the like, resources may be roughly divided into a time domain and a frequency domain. The resources may be defined as resource blocks, which includes N subcarriers and M subframes or predetermined time units. At this time, N and M may be 1. FIG. 17 is a diagram showing an example of configuring a resource block in time-frequency units.

In FIG. 17, one rectangle means one resource block and one resource block has several subcarriers on one axis and has a predetermined time unit (e.g., slots or subframes) on the other axis.

In downlink, an eNB schedules one or more resource blocks to a UE selected according to a determined scheduling rule and transmits data using resource bocks allocated to the UE. In uplink, the eNB schedules one or more resource blocks to a UE selected according to a predetermined scheduling rule and a UE transmits data in uplink using the allocated resources.

An error control method performed when a (sub)frame, in which data is transmitted and received, is lost or damaged after transmitting and receiving data after scheduling includes an Automatic Repeat reQuest (ARQ) method and a Hybrid ARQ (HARQ) method.

In the ARQ method, fundamentally, a transmitter waits for an acknowledgement (ACK) message after transmitting one (sub)frame and a receiver sends the ACK only upon receiving the sub(frame). When an error occurs in the (sub)frame, a negative ACK (NAK) message is sent and information on a reception frame, in which an error occurs, is removed from a receiver buffer. The transmitter transmits a subsequent (sub)frame upon receiving the ACK message but retransmits the (sub)frame upon receiving the NAK message. Unlike the ARQ method, in the HARQ method, when the received frame cannot be demodulated, the receiver transmits the NAK message to the transmitter, but the received frame is stored in a buffer during a predetermined time and is combined with a retransmitted frame, thereby increasing a reception success rate.

Recently, a HARQ method more efficient than the ARQ method is widely used. The HARQ method may be divided into various methods. For example, the HARQ method may be divided into a synchronous HARQ method and an asynchronous HARQ method according to retransmission timing and into a channel-adaptive HARQ method and a channel-non-adaptive HARQ method depending on whether the amount of resources used for retransmission is influenced by a channel state.

The synchronous HARQ method refers to a method of performing subsequent retransmission at timing determined by a system when initial transmission fails. For example, if it is assumed that retransmission is performed every four time units after initial transmission fails, retransmission timing is predetermined between the eNB and the UE and is not signaled. However, when the data transmission side receives a NAK message, the frame is retransmitted every four time units until an ACK message is received.

Meanwhile, the asynchronous HARQ method may be performed by newly scheduling retransmission timing or via additional signaling. The retransmission timing of the previously failed frame may be changed by several factors such as channel state.

The channel-non-adaptive HARQ method refers to a method of using scheduling information (e.g., the modulation method of the frame, the number of used resource blocks, Adaptive Modulation and Coding (AMC), etc.), which is set upon initial transmission, upon retransmission. In contrast, the channel-adaptive HARQ method refers to a method of changing such scheduling information according to the channel state.

For example, in the channel-non-adaptive HARQ method, a transmission side transmits data using six resource blocks upon initial transmission and retransmits data using six resource blocks upon retransmission. In contrast, in the channel-adaptive HARQ method, initial transmission is performed using six resource blocks and retransmission is performed using greater or less than six resource blocks according to the channel state.

Although there are four HARQ methods, the asynchronous and channel-adaptive HARQ method and the synchronous and channel-non-adaptive HARQ method are mainly used. The asynchronous and channel-adaptive HARQ method may maximize retransmission efficiency by adaptively changing the retransmission timing and the amount of used resources according to the channel state but may increase overhead. Accordingly, the asynchronous and channel-adaptive HARQ method is not generally considered for uplink. In contrast, the synchronous and channel-non-adaptive HARQ method may not cause overhead because retransmission timing and resource allocation are predetermined in the system, but has very low retransmission efficiency in a considerably changed channel state.

To this end, in the current 3GPP LTE/LTE-A system, the asynchronous HARQ method is used in downlink and the synchronous HARQ method is used in uplink.

Figure 18:
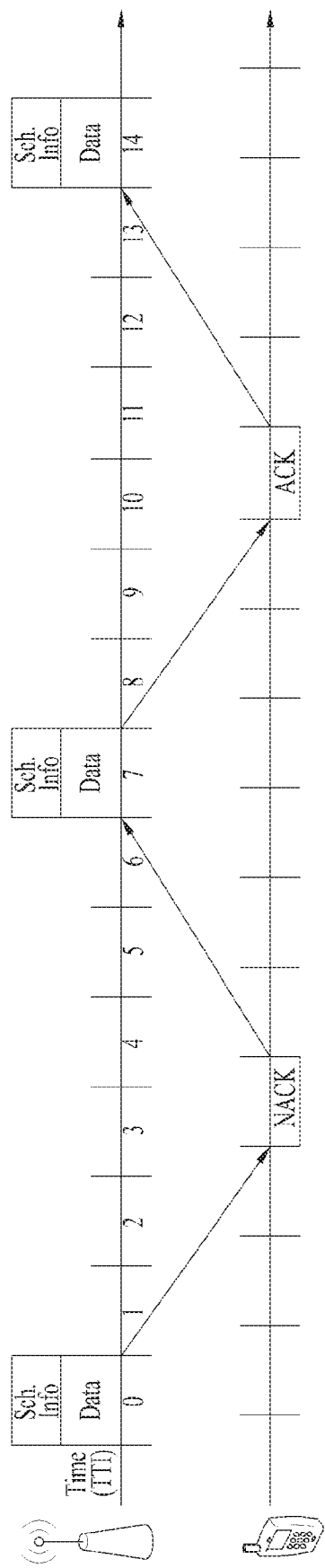
FIG. 18 is a view illustrating an exemplary method for resource allocation and retransmission in asynchronous Hybrid Automatic Repeat reQuest (HARM)

FIG. 18 is a diagram showing an example of a resource allocation and retransmission method of an asynchronous HARQ method.

When an eNB transmits scheduling information in downlink, receives ACK/NAK information from a UE, and transmits next data, time delay occurs as shown in FIG. 19. This is channel propagation delay and delay occurring due to a time required for data decoding and data encoding.

A method of performing transmission using an independent HARQ process for data transmission without a gap during a delay period is being used. For example, if a shortest period from first data transmission to next data transmission is 7 subframes, data may be transmitted without a gap by setting 7 independent HARQ processes. In an LTE/LTE-A system, a maximum of eight HARQ processes may be allocated to one UE in non-MIMO.

2.6 CA Environment-Based CoMP Operation

Hereinafter, a cooperation multi-point (CoMP) transmission operation applicable to the embodiments of the present disclosure will be described.

In the LTE-A system, CoMP transmission may be implemented using a carrier aggregation (CA) function in the LTE. FIG. 19 is a conceptual view illustrating a CoMP system operating based on a CA environment.

In FIG. 19, it is assumed that a carrier operated as a PCell and a carrier operated as an SCell may use the same frequency band on a frequency axis and are allocated to two eNBs geographically spaced apart from each other. At this time, a serving eNB of UE1 may be allocated to the PCell, and a neighboring cell causing much interference may be allocated to the SCell. That is, the eNB of the PCell and the eNB of the SCell may perform various DL/UL CoMP operations such as joint transmission (JT), CS/CB and dynamic cell selection for one UE.

FIG. 19 illustrates an example that cells managed by two eNBs are aggregated as PCell and SCell with respect to one UE (e.g., UE1). However, as another example, three or more cells may be aggregated. For example, some cells of three or more cells may be configured to perform CoMP operation for one UE in the same frequency band, and the other cells may be configured to perform simple CA operation in different frequency bands. At this time, the PCell does not always need to participate in CoMP operation.

2.7 Reference Signal (RS)

Now, a description will be given of RSs which may be used in embodiments of the present disclosure.

FIG. 20 illustrates an example of a subframe to which UE-RSs are allocated, which may be used in embodiments of the present disclosure.

Referring to FIG. 20, the subframe illustrates REs occupied by UE-RSs among REs in one RB of a normal DL subframe having a normal CP.

UE-RSs are transmitted on antenna port(s) p=5, p=7, p=8 or p=7, 8, . . . , v+6 for PDSCH transmission, where v is the number of layers used for the PDSCH transmission. UE-RSs are present and are a valid reference for PDSCH demodulation only if the PDSCH transmission is associated with the corresponding antenna port. UE-RSs are transmitted only on RBs to which the corresponding PDSCH is mapped.

The UE-RSs are configured to be transmitted only on RB(s) to which a PDSCH is mapped in a subframe in which the PDSCH is scheduled unlike CRSs configured to be transmitted in every subframe irrespective of whether the PDSCH is present. Accordingly, overhead of the RS may decrease relative to overhead of the CRS.

In the 3GPP LTE-A system, the UE-RSs are defined in a PRB pair. Referring to FIG. 19, in a PRB having frequency-domain index nPRB assigned for PDSCH transmission with respect to p=7, p=8, or p=7, 8, . . . , v+6, a part of UE-RS sequence r(m) is mapped to complex-valued modulation symbols.

UE-RSs are transmitted through antenna port(s) corresponding respectively to layer(s) of a PDSCH. That is, the number of UE-RS ports is proportional to a transmission rank of the PDSCH. Meanwhile, if the number of layers is 1 or 2, 12 REs per RB pair are used for UE-RS transmission and, if the number of layers is greater than 2, 24 REs per RB pair are used for UE-RS transmission. In addition, locations of REs occupied by UE-RSs (i.e. locations of UE-RS REs) in a RB pair are the same with respect to a UE-RS port regardless of a UE or a cell.

As a result, the number of DM-RS REs in an RB to which a PDSCH for a specific UE in a specific subframe is mapped is the same per UE-RS ports. Notably, in RBs to which the PDSCH for different UEs in the same subframe is allocated, the number of DM-RS REs included in the RBs may differ according to the number of transmitted layers.

The UE-RS can be used as the DM-RS in the embodiments of the present disclosure.

2.8 Enhanced PDCCH (EPDCCH)

In the 3GPP LTE/LTE-A system, Cross-Carrier Scheduling (CCS) in an aggregation status for a plurality of component carriers (CC: component carrier=(serving) cell) will be defined. One scheduled CC may previously be configured to be DL/UL scheduled from another one scheduling CC (that is, to receive DL/UL grant PDCCH for a corresponding scheduled CC). At this time, the scheduling CC may basically perform DL/UL scheduling for itself. In other words, a Search Space (SS) for a PDCCH for scheduling scheduling/scheduled CCs which are in the CCS relation may exist in a control channel region of all the scheduling CCs.

Meanwhile, in the LTE system, FDD DL carrier or TDD DL subframes are configured to use first n (n<=4) OFDM symbols of each subframe for transmission of physical channels for transmission of various kinds of control information, wherein examples of the physical channels include a PDCCH, a PHICH, and a PCFICH. At this time, the number of OFDM symbols used for control channel transmission at each subframe may be delivered to the UE dynamically through a physical channel such as PCFICH or semi-statically through RRC signaling.

Figure 21:
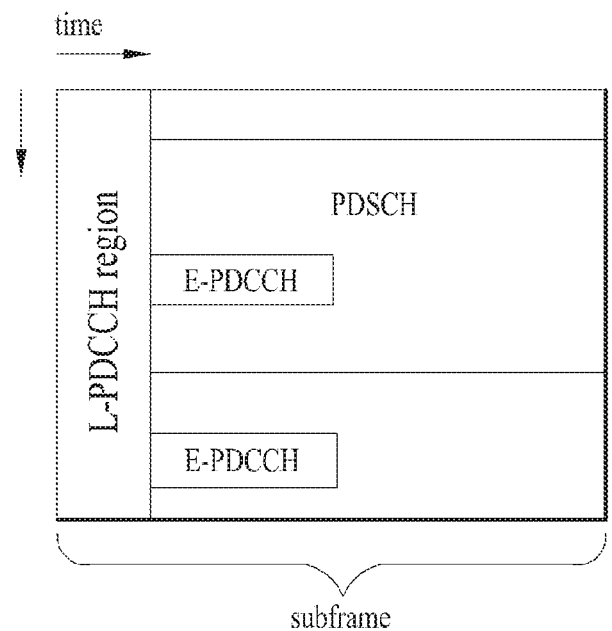
FIG. 21 is a view illustrating an exemplary multiplexing of a legacy Physical Downlink Channel (PDCCH), a Physical Downlink Shared Channel (PDSCH), and an Enhanced PDCCH (E-PDCCH) in the LTE/LTE-A system.

Meanwhile, in the LTE/LTE-A system, since a PDCCH which is a physical channel for DL/UL scheduling and transmitting various kinds of control information has a limitation that it is transmitted through limited OFDM symbols, enhanced PDCCH (i.e., E-PDCCH) multiplexed with a PDSCH more freely in a way of FDM/TDM may be introduced instead of a control channel such as PDCCH, which is transmitted through OFDM symbol and separated from PDSCH. FIG. 21 illustrates an example that legacy PDCCH, PDSCH and E-PDCCH, which are used in an LTE/LTE-A system, are multiplexed.

3. LTE-U System 3.1 LTE-U System Configuration

Hereinafter, methods for transmitting and receiving data in a CA environment of an LTE-A band corresponding to a licensed band and an unlicensed band will be described. In the embodiments of the present disclosure, an LTE-U system means an LTE system that supports such a CA status of a licensed band and an unlicensed band. A WiFi band or Bluetooth (BT) band may be used as the unlicensed band.

Figure 22:
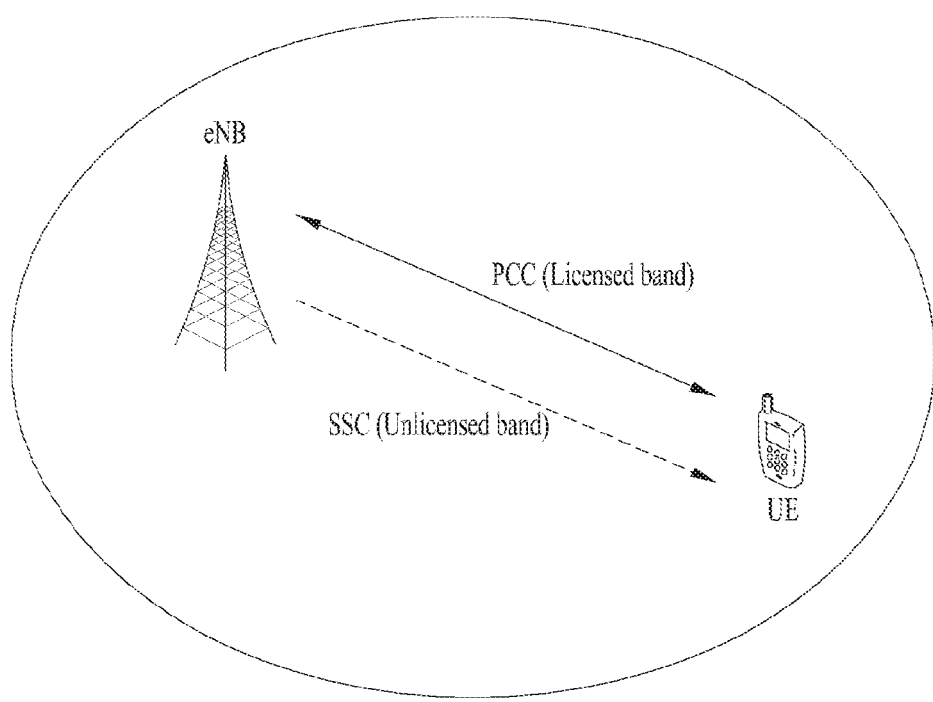
FIG. 22 is a view illustrating an exemplary CA environment supported in an LTE-Unlicensed (LTE-U) system.

FIG. 22 illustrates an example of a CA environment supported in an LTE-U system.

Hereinafter, for convenience of description, it is assumed that a UE is configured to perform wireless communication in each of a licensed band and an unlicensed band by using two CCs. The methods which will be described hereinafter may be applied to even a case where three or more CCs are configured for a UE.

In the embodiments of the present disclosure, it is assumed that a carrier of the licensed band may be a primary CC (PCC or PCell), and a carrier of the unlicensed band may be a secondary CC (SCC or SCell). However, the embodiments of the present disclosure may be applied to even a case where a plurality of licensed bands and a plurality of unlicensed bands are used in a carrier aggregation method. Also, the methods suggested in the present disclosure may be applied to even a 3GPP LTE system and another system.

In FIG. 22, one eNB supports both a licensed band and an unlicensed band. That is, the UE may transmit and receive control information and data through the PCC which is a licensed band, and may also transmit and receive control information and data through the SCC which is an unlicensed band. However, the status shown in FIG. 22 is only example, and the embodiments of the present disclosure may be applied to even a CA environment that one UE accesses a plurality of eNBs.

For example, the UE may configure a macro eNB (M-eNB) and a PCell, and may configure a small eNB (S-eNB) and an SCell. At this time, the macro eNB and the small eNB may be connected with each other through a backhaul network.

In the embodiments of the present disclosure, the unlicensed band may be operated in a contention-based random access method. At this time, the eNB that supports the unlicensed band may perform a Carrier Sensing (CS) procedure prior to data transmission and reception. The CS procedure determines whether a corresponding band is reserved by another entity.

For example, the eNB of the SCell checks whether a current channel is busy or idle. If it is determined that the corresponding band is idle state, the eNB may transmit a scheduling grant to the UE to allocate a resource through (E)PDCCH of the PCell in case of a cross carrier scheduling mode and through PDCCH of the SCell in case of a self-scheduling mode, and may try data transmission and reception.

At this time, the eNB may configure a TxOP including N consecutive subframes. In this case, a value of N and a use of the N subframes may previously be notified from the eNB to the UE through higher layer signaling through the PCell or through a physical control channel or physical data channel.

3.2 Carrier Sensing (CS) Procedure

In embodiments of the present disclosure, a CS procedure may be called a Clear Channel Assessment (CCA) procedure. In the CCA procedure, it may be determined whether a channel is busy or idle based on a predetermined CCA threshold or a CCA threshold configured by higher-layer signaling. For example, if energy higher than the CCA threshold is detected in an unlicensed band, SCell, it may be determined that the channel is busy or idle. If the channel is determined to be idle, an eNB may start signal transmission in the SCell. This procedure may be referred to as LBT.

Figure 23:
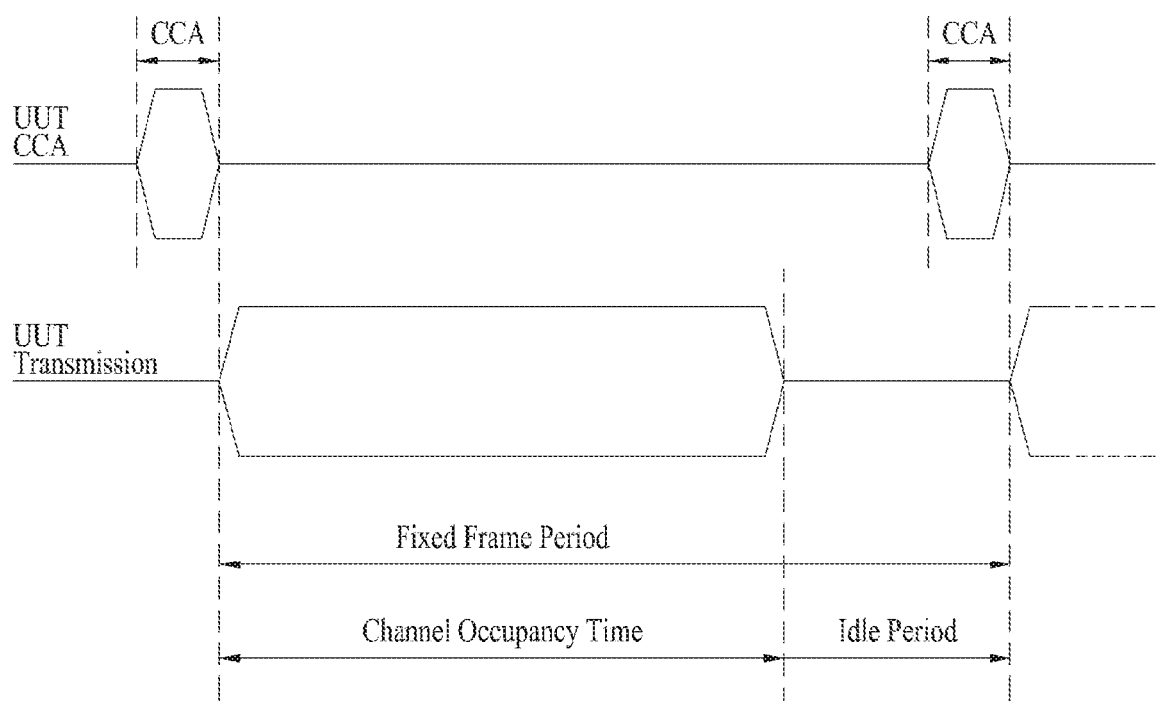
FIG. 23 is a view illustrating an exemplary Frame Based Equipment (FBE) operation as one of Listen-Before-Talk (LBT) operations.

FIG. 23 is a view illustrating an exemplary Frame Based Equipment (FBE) operation as one of LBT operations.

The European Telecommunication Standards Institute (ETSI) regulation (EN 301 893 V1.7.1) defines two LBT operations, Frame Based Equipment (FBE) and Load Based Equipment (LBE). In FBE, one fixed frame is comprised of a channel occupancy time (e.g., 1 to 10 ms) being a time period during which a communication node succeeding in channel access may continue transmission, and an idle period being at least 5% of the channel occupancy time, and CCA is defined as an operation for monitoring a channel during a CCA slot (at least 20 s) at the end of the idle period.

A communication node periodically performs CCA on a per-fixed frame basis. If the channel is unoccupied, the communication node transmits data during the channel occupancy time. On the contrary, if the channel is occupied, the communication node defers the transmission and waits until the CCA slot of the next period.

Figure 24:
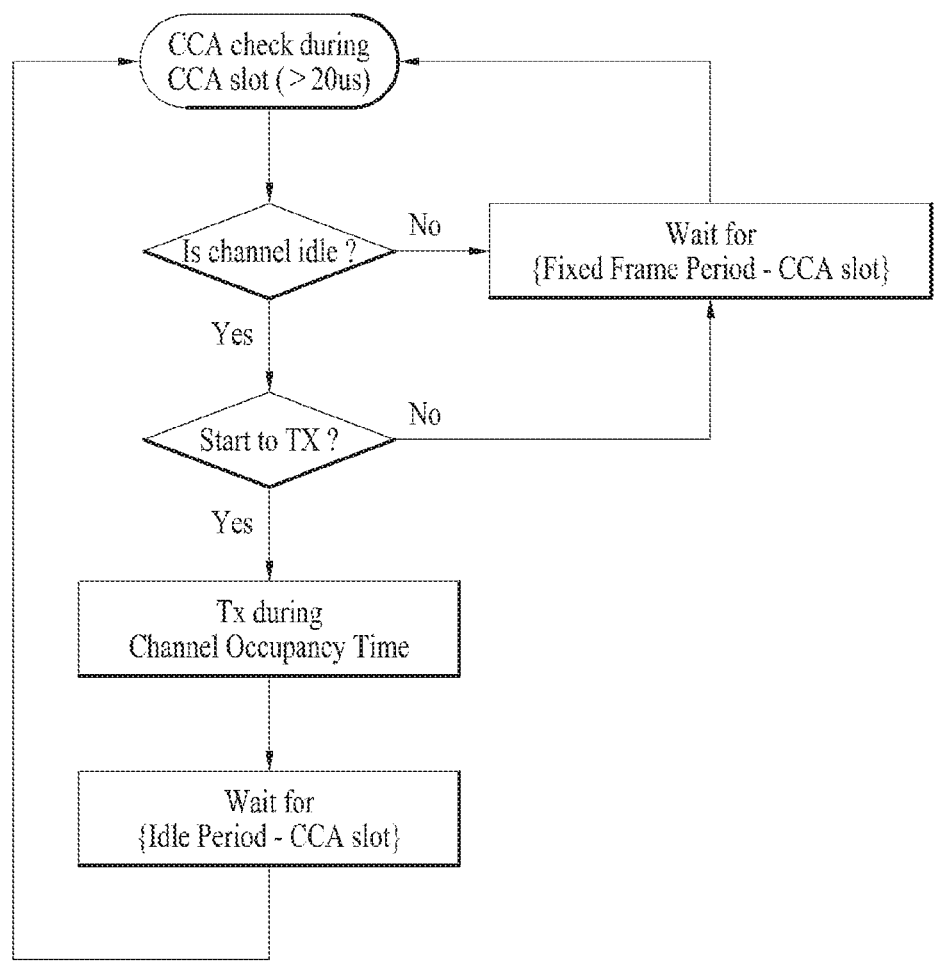
FIG. 24 is a block diagram illustrating the FBE operation.

FIG. 24 is a block diagram illustrating the FBE operation.

Referring to FIG. 24, a communication node (i.e., eNB) managing an SCell performs CCA during a CCA slot. If the channel is idle, the communication node performs data Transmission (Tx). If the channel is busy, the communication node waits for a time period calculated by subtracting the CCA slot from a fixed frame period, and then resumes CCA.

The communication node transmits data during the channel occupancy time. Upon completion of the data transmission, the communication node waits for a time period calculated by subtracting the CCA slot from the idle period, and then resumes CCA. If the channel is idle but the communication node has no transmission data, the communication node waits for the time period calculated by subtracting the CCA slot from the fixed frame period, and then resumes CCA.

FIG. 25 is a view illustrating an exemplary LBE operation as one of the LBT operations.

Referring to FIG. 25($a$), in LBE, the communication node first sets q (q$\in$\{4, 5, . . . , 32\}) and then performs CCA during one CCA slot.

FIG. 25($b$) is a block diagram illustrating the LBE operation. The LBE operation will be described with reference to FIG. 15($b$).

The communication node may perform CCA during a CCA slot. If the channel is unoccupied in a first CCA slot, the communication node may transmit data by securing a time period of up to (13/32)q ms.

On the contrary, if the channel is occupied in the first CCA slot, the communication node selects N (N$\in$\{1, 2, . . . , q\}) arbitrarily (i.e., randomly) and stores the selected N value as an initial count. Then, the communication node senses a channel state on a CCA slot basis. Each time the channel is unoccupied in one specific CCA slot, the communication node decrements the count by 1. If the count is 0, the communication node may transmit data by securing a time period of up to (13/32)q ms.

3.3 Discontinuous Transmission (DTX) on DL

DTX in an unlicensed carrier having a limited maximum transmission period may affect some functions required for operations of the LTE system. These functions may be supported by one or more signals transmitted at the start of discontinuous LAA DL transmission. The functions supported by these signals include Automatic Gain Control (AGC) setting, channel reservation, and so on.

In signal transmission of an LAA node, channel reservation refers to transmission of signals on channels acquired for signal transmission to other nodes after channel access through a successful LBT operation.

Functions supported by one or more signals for LAA operations including DL DTX include detection of LAA DL transmission at a UE, and time and frequency synchronization of UEs. Requirements for these functions do not mean exclusion of other available functions, and these functions may be supported by other methods.

3.3.1 Time and Frequency Synchronization

A design purpose recommended for the LAA system is to support acquisition of time and frequency synchronization at a UE by a discovery signal for Radio Resource Management (RRM) measurement, each of RSs included in a DL transmission burst, or a combination of them. A discovery signal for RRM measurement, transmitted by a serving cell is used at least for coarse time or frequency synchronization.

3.3.2 DL Transmission Timing

In a DL LAA design, a SubFrame (SF) boundary may be adjusted based on a CA timing relationship between serving cells aggregated by CA defined in an LTE system (Rel-12 or below). However, this does not mean that an eNB starts DL transmission only at an SF boundary. The LAA system may support PDSCH transmission even though none of the OFDM symbols of one SF are available according to a result of an LBT operation. Herein, transmission of control information required for the PDSCH transmission needs to be supported.

3.4 RRM Measurement and Reporting

The LTE-A system may transmit a discovery signal at the start of supporting RRM functions including cell detection. The discovery signal may be referred to as a Discovery Reference Signal (DRS). To support the RRM functions for LAA, the discovery signal, and the transmission and reception functions of the LTE-A system may be modified and then applied.

3.4.1 DRS

The DRS of the LTE-A system was designed to support a small cell on-off operation. Off-small cells refer to small cells in a state where most functions except for periodic DRS transmission are deactivated. DRSs are transmitted with a periodicity of 40, 80, or 160 ms in a DRS transmission occasion. A Discovery Measurement Timing Configuration (DMTC) is a time period during which a UE may expect to receive a DRS. A DRS transmission occasion may occur anywhere within a DMTC, and the UE may expect that the DRS will be continuously transmitted with a corresponding periodicity in an allocated cell.

The use of the DRS of the LTE-A system in the LAA system may bring about new constraints. For example, although DRS transmission may be allowed in some regions, like very short control transmission without LBT, short control transmission without LBT may not be allowed in other regions. Accordingly, DRS transmission may be subjected to LBT in the LAA system.

If LBT is applied to DRS transmission, the DRS may not be transmitted periodically, as is done in the LTE-A system. Therefore, the following two methods may be considered for DRS transmissions in the LAA system.

First, the DRS is transmitted only at fixed time positions within a configured DMTC under the condition of LBT.

Secondly, DRS transmission is allowed at at least one different time position within a configured DMTC under the condition of LBT.

In another aspect of the second method, the number of time positions may be restricted to 1 within one SF. Aside from DRS transmission within a configured DMTC, DRS transmission outside the configured DMTC may be allowed, if it is more useful.

Figure 26:
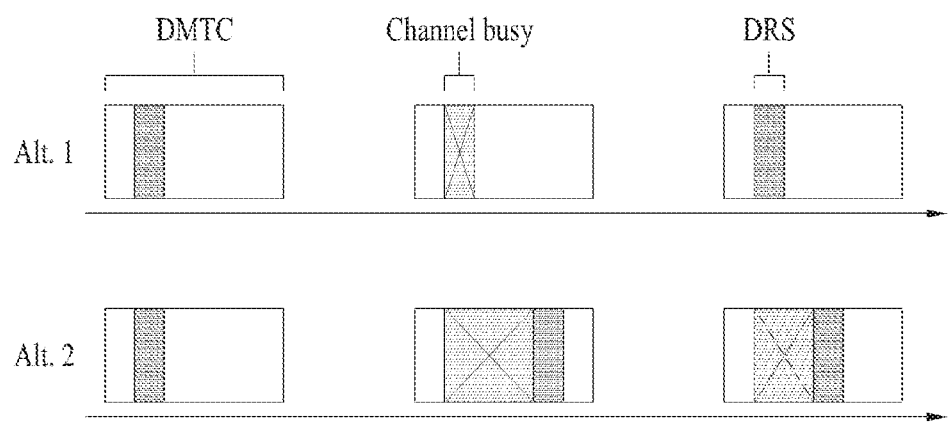
FIG. 26 is a view illustrating DRS transmission methods supported in the LAA system.

FIG. 26 is a view illustrating DRS transmission methods supported in the LAA system.

Referring to FIG. 26, the upper part represents the above-described first DRS transmission method, and the lower part represents the second DRS transmission method. That is, a UE may receive the DRS only at a predetermined position within a DMTC period in the first DRS transmission method, whereas the UE may receive the DRS at an arbitrary position within a DMTC period in the second DRS transmission method.

If a UE performs RRM measurement based on DRS transmission in the LTE-A system, the UE may perform one RRM measurement based on a plurality of DRS occasions. If the DRS is used in the LAA system, transmission of the DRS at a specific position may not be ensured due to LBT-caused constraints. If the UE assumes the existence of the DRS in spite of non-transmission of the DRS from an eNB, the quality of an RRM measurement result reported by the UE may be degraded. Therefore, the LAA DRS needs to be designed such that the existence of the DRS in one DRS occasion may be detected, which may ensure combining of successfully detected DRS occasions in an RRM measurement for the UE.

Signals including DRSs do not ensure adjacent DRS transmissions in time. That is, if no data is transmitted in SFs carrying DRSs, there may be OFDM symbols carrying no physical signal. During an operation in an unlicensed band, other nodes may sense a corresponding channel as idle during this silent interval between DRS transmissions. To avert this problem, it is preferable to ensure configuration of transmission bursts including DRSs with adjacent OFDM symbols carrying a few signals.

3.5 Channel Access Procedure and Contention Window Adjustment Procedure

Hereinbelow, the afore-described Channel Access Procedure (CAP) and Contention Window Adjustment (CWA) will be described from the viewpoint of a transmission node.

Figure 27:
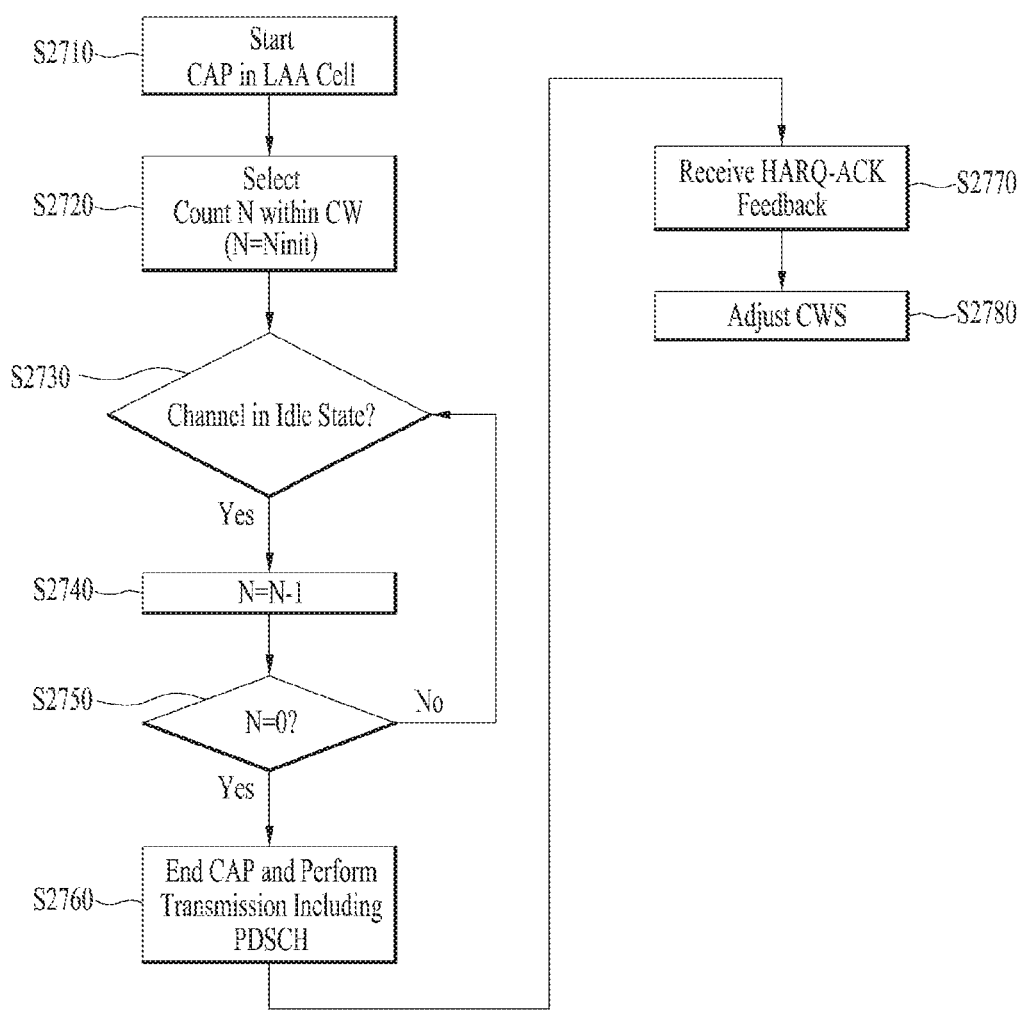
FIG. 27 is a view illustrating a Channel Access Procedure (CAP) and Contention Window Adjustment (CWA)

FIG. 27 is a view illustrating the CAP and CWA.

For DL transmission, an LTE transmission node (e.g., an eNB) may initiate the CAP to operate in unlicensed cell(s), LAA SCell(s) (S2710).

The eNB may select a random backoff count N from a CW. Herein, N is set to an initial value Ninit (S2720).

The eNB determines whether a channel of LAA SCell(s) is idle, and if the channel is idle, decreases the backoff count by 1 (S2730 and S2740).

In FIG. 27, the order of steps S2730 and S2740 may be changed. For example, the eNB may first decrease the backoff count N and then determine whether the channel is idle.

If the channel is not idle, that is, the channel is busy in step S2730, the eNB may determine whether the channel is idle during a defer period (equal to or longer than 25 μsec) longer than a slot duration (e.g., 9 μsec). If the channel is idle during the defer period, the eNB may perform the CAP again. For example, if the backoff count Ninit is 10 and after the backoff count is decreased to 5, the eNB determines that the channel is busy, the eNB determines whether the channel is idle by sensing the channel during the defer period. If the channel is idle during the defer period, the eNB may perform the CAP again, starting the backoff count from 5 (or from 4 after the backoff count is decreased by 1), instead of setting the backoff count Ninit.

Referring to FIG. 27 again, the eNB may determine whether the backoff count N is 0 (S2750). If the backoff count N is 0, the eNB may end the CAP process and transmit a Tx burst including a PDSCH (S2760).

The eNB may receive HARQ-ACK information for the Tx burst from a UE (S2770).

The eNB may adjust a CWS based on the received HARQ-ACK information (S2780).

In step S2780, the CWS may be adjusted in any of the methods described in Section 4.1.1 to Section 4.1.3 For example, the eNB may adjust the CWS based on HARQ-ACK information for the first SF (i.e., the starting SF) of the latest transmitted Tx burst.

Herein, before performing CWP, the eNB may set an initial CW for each priority class. Subsequently, if the probability of determining HARQ-ACK values for a PDSCH transmitted in a reference SF to be NACK is at least 80%, the eNB increases the CW value set for each priority class to an allowed next level.

In step S2760, the PDSCH may be allocated by SCS or CCS. If the PDSCH is allocated by SCS, the eNB counts the DTX, NACK/DTX, or ANY state indicated by feedback HARQ-ACK information as NACK. If the PDSCH is allocated by CCS, the eNB counts the NACK/DTX and ANY states indicated by feedback HARQ-ACK information as NACK meanwhile the eNB does not count the DTX state indicated by feedback HARQ-ACK information as NACK.

If M (M>=2) SFs are bundled and bundled HARQ-ACK information is received, the eNB may regard the bundled HARQ-ACK information as M HARQ-ACK responses. Preferably, the bundled M SFs include a reference SF.

4. Method for Configuring and Transmitting/Receiving DRS in LAA System

Now, a detailed description will be given of methods for configuring a DRS including a Synchronization Signal (SS) and a Reference Signal (RS) in an unlicensed band, and methods for transmitting and receiving a DRS. In embodiments of the present disclosure, the DRS may be referred to as a discovery signal.

In the LTE-A system, the DRS was designed for RRM measurement for a small cell which has been deactivated due to the absence of traffic. The DRS may be configured to be transmitted periodically, once in a unit time of tens of ms (e.g., 40, 80, or 160 ms). The eNB may configure a DMTC of 6 ms periodically. A UE may receive the DRS within a corresponding DMTC, and use the received DRS in coarse synchronization acquisition, cell identification, RRM measurement, and so on.

In an LTE system operating in an unlicensed band (i.e., an LAA system), the DRS may include a Primary Synchronization Signal (PSS)/Secondary Synchronization Signal (SSS), and a Cell-specific Reference Signal (CRS). Selectively, the DRS may include a PSS/SSS, a CRS, and a Channel Status Information Reference Signal (CSI-RS). As in the LTE-A system, the DRS may be used for acquisition of coarse synchronization, cell identification, and RRM measurement in the LAA system.

However, the DRS of the LAA system may differ from the DRS of the LTE-A system in that an LBT operation may be required for DRS transmission in view of the nature of an unlicensed band. For example, if an eNB discovers that a channel is occupied by other transmission during an LBT operation for DRS transmission, the eNB may drop the DRS transmission or attempt the DRS transmission again at another time point within a DMTC period.

FIG. 28 is a view illustrating a DRS transmission method in the LAA system.

In the LAA system, the DRS may be transmitted in the following two methods.

(1) First DRS Transmission Method

Referring to FIG. 28(a), only one time point available for DRS transmission may be configured within a DMTC period. Therefore, if the eNB fails to transmit the DRS at a DRS transmission time due to LBT failure or the like, the eNB drops the DRS transmission.

(2) Second DRS Transmission Method

Referring to FIG. 28(b), a plurality of time points (e.g., every SF boundary) available for DRS transmission may be configured within a DMTC period. Therefore, even though the eNB fails in LBT, the eNB may transmit the DRS by performing LBT at another one of the plurality of time points.

On the other hand, if the DRS is not transmitted during one DMTC period due to LBT failure, a UE needs to wait tens of ms until the next DMTC period. In consideration of this characteristic of DRS transmission, it is preferred that LBT for a DRS without DL data (e.g., a PDSCH) has a larger channel occupancy probability than LBT for DL data.

For example, once the eNB determines that a channel is idle only during a specific sensing interval, that is, without random backoff, transmission of a DL TX burst including the DRS may be allowed. Herein, a DL TX burst refers to a continuous signal transmission unit. Further, if the eNB determines that the channel is idle only during one of a plurality of sensing intervals divided from a total sensing period, the eNB may allow transmission of a DL TX burst including the DRS.

Referring to FIG. 28(a), it is assumed that the eNB is to transmit the DRS in SF # N and a total sensing period includes three sensing intervals. Even though the channel is busy in the first sensing interval, the eNB may transmit the DRS because the channel is idle in the second sensing interval. However, since LBT is completed before the starting boundary of SF # N, the eNB may transmit a reservation signal during the remaining interval.

Referring to FIG. 28(b), if the eNB determines that the channel is busy during the total sensing period shortly before the start of SF # N, the eNB may perform LBT (or CCA) again shortly before the start of the next SF, SF # N+1. Because the channel is idle in the second sensing interval as illustrated in FIG. 28(b), the eNB may transmit a reservation signal in the third sensing interval and then transmit the DRS in SF # N+1.

4.1 Tx Burst Rate Matching Method

The LBT operation described with reference to FIGS. 28(a) and 28(b) may be an LBT operation for DRS transmission without DL data. Separately therefrom, an eNB may perform an LBT operation for DL data transmission. When the eNB starts DL TX burst transmission due to the LBT operation for DL data transmission and a transmission period of the corresponding Tx burst overlaps with a time point of DRS transmission, the eNB may multiplex a DRS and DL data and may transmit the DRS and the DL data.

In this case, to transmit the DRS as well as the DL data in a DL TX burst period, the eNB needs to perform rate matching on DL data of a corresponding SF. This is because a density and/or allocation pattern of PSS/SSS/CRS in an SF for DRS transmission may become different from other SFs and CSI-RS/CSI-IM is separately configured in an SF for DRS transmission to enhance RRM measurement performance or DRS detection performance of a UE.

Figure 29:
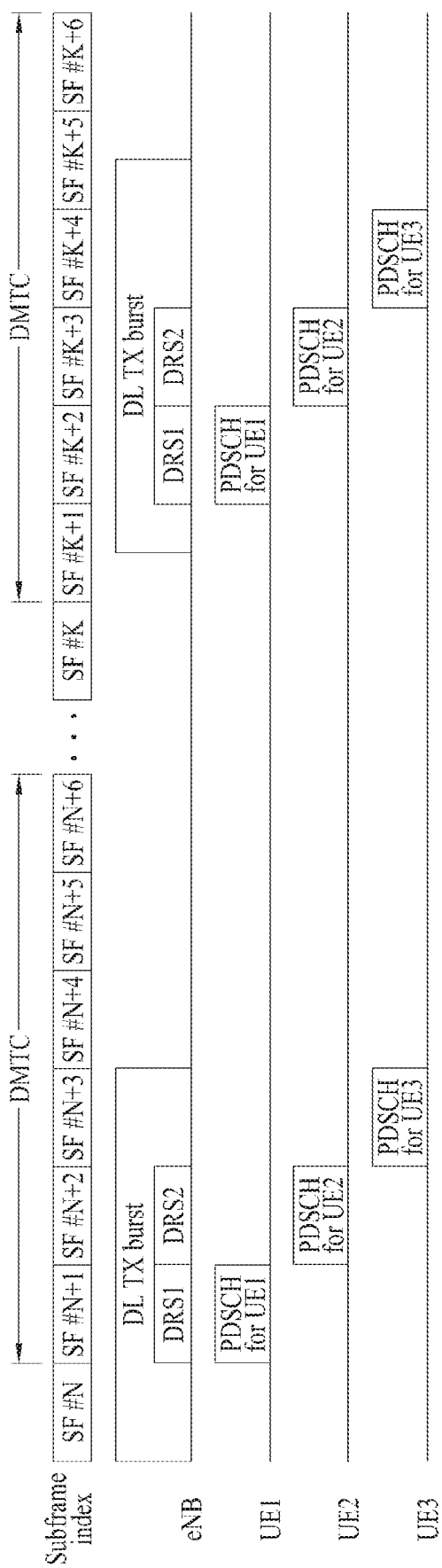
FIG. 29 is a diagram for explanation of a Tx burst rate matching method in an LAA system.

FIG. 29 is a diagram for explanation of a Tx burst rate matching method in an LAA system.

As shown in FIG. 29, a DMTC period may be set to SF # N+6 from SF # N+1 and to SF # K+6 from SF # K+1 and scheduled UEs may be assumed not to know a DL TX burst period. In addition, it may be assumed that the eNB is capable of transmitting a DRS in two SFs and is capable of transmitting a DRS in any SF in a DMTC period according to whether LBT is successful (i.e., a second DRS transmission method). In the embodiments of the present disclosure, for convenience, although DRS transmission is assumed to be started at an SF boundary, DRS transmission may be assumed to also be started at a time point (e.g., a slot boundary or OFDM symbols transmitted in CRS port 0) but not an SF boundary.

Referring to FIG. 29, the eNB may start DL TX burst transmission from SF # N and may simultaneously transmit a DRS and DL data in SF # N+1 and SF # N+2. In addition, the eNB may not be capable of transmitting a DRS in SF # K due to LBT failure just before SF # K, may start DL TX burst transmission from SF # K+1, and may simultaneously transmit a DRS and DL data in SF # K+2 and SF # K+3.

Even if the eNB transmits a DRS using the second DRS transmission method, there may be the following alternatives of the second DRS transmission method in which a DRS is configured according to a time point in which the eNB actually starts DRS transmission.

(1) Alt. 1

An eNB may configure a DRS by fixing a relative position of a PSS, an SSS, a CRS, and/or a CSI-RS included in the DRS and floating a DRS transmission occasion depending on a DRS start time point.

Referring to FIG. 29, the eNB may configure a PSS, an SSS, a CRS, and/or a CSI-RS which are included in a DRS of SF # N+1 and those of a DRS included in SF # K+2 to have the same position. Similarly, the eNB may configure a PSS, an SSS, a CRS, and/or a CSI-RS which are included in a DRS of SF # N+2 and those of a DRS included in SF # K+3 to have the same position.

(2) Alt. 2

An eNB may change a method of configuring a PSS, an SSS, a CRS, and/or a CSI-RS depending on a time point of starting DRS transmission.

For example, referring to FIG. 29, methods of configuring a DRS transmitted in SF # N+1 and a DRS transmitted in SF # K+2 may be differently set. In more detail, an SSS on SF # N+1 and an SSS on SF # K+2 may be positioned in different OFDM symbols and/or different frequency resources and may be configured using different sequences.

(3) Alt. 3

An eNB may predetermine DRS configuring methods of all SFs in a DMTC period and may determine DRS transmission depending on an actual starting time point and the number of DRS SFs.

For example, referring to FIG. 29, the eNB may previously determine DRS configurations of 6 SFs in a DMTC period, may drop an SF that is not transmitted like SF # K+1 and, then, may follow a predetermined DRS configuration method of a second SF in a DMTC period in SF # K+2 and may follow a predetermined DRS configuration method of a third SF in a DMTC period in SF # K+3.

(4) Alt. 4

An eNB may previously fix an end point for configuring a DRS SF and may drop a front DRS based on a start time point.

For example, referring to FIG. 29, a DRS may be predetermined to be transmitted up to a second SF in a DMTC period. In this case, the eNB may configure DRSs transmitted in SF # N+2 and SF # K+2 to be the same and may transmit the DRSs and may drop DRS transmission in SF # K+3.

Alt. 1 to Alt. 4 may be combined. For example, the eNB may apply Alt. 1 at a time point when some DRSs are transmitted and may apply Alt. 2 at other time points. As another example, Alt. 1 may be applied to some signals of a PSS, an SSS, a CRS, and/or a CSI-RS and Alt. 2 may be applied to other signals.

Referring back to FIG. 29, an exemplary operation of an eNB with respect to rate matching of a DRS and DL data will be described below.

The eNB may perform data rate matching in consideration of a DRS only on SF # N+1, SF # N+2, SF # K+2, and SF # K+3 and only UEs that are supposed to receive DL data in corresponding SF(s) may assume rate matching and may receive DL data.

However, UEs do not know a DL TX burst period and, thus, according to Alt. 2, a reception UE may not know a time point of actual DRS transmission among a plurality of DRS transmission time point candidates. That is, UE3 does not know whether a DRS is already transmitted at a time of SF # N+1 and SF # N+2 and, thus, when UE3 may not know whether data rate matching is performed in consideration of the DRS is performed upon transmitting DL data at a time of SF # N+3.

To avert this problem, an eNB may be assumed to always perform data rate matching in consideration of DRS transmission in a DMTC period and a UE may also be assumed to perform rate matching on allocated DL data in a DMTC period and may receive a Tx burst.

For example, referring to FIG. 29, all UE1 to UE3 do not know an SF in which an eNB actually transmits a DRS and, thus, all UE1 to UE3 may assume that data rate matching is performed on all corresponding SFs and may receive a Tx burst. To this end, a simple solution may be to perform rate matching, e.g., the eNB always transmits a DRS for a PDSCH in a DMTC period.

However, although an eNB does not actually transmit a DRS, data rate matching is performed on all SFs in a DMTC period and, thus, a radio resource may be inefficiently used. In particular, in the case of Alt. 1 and Alt. 2, in consideration of all time points of starting DRS transmission, the eNB needs to perform data rate matching on significantly many REs. To avert this problem, the following methods may be considered.

4.1.1 Rate Matching Method 1

When there is DCI information indicating an SF in which a DRS is actually transmitted, a UE may be assumed to perform rate matching only on an SF in which a DRS is recognized to be transmitted, and may not be assumed to perform rate matching on an SF in which a DRS is not recognized to be transmitted and may decode a corresponding SF.

The DCI may be transmitted on a common search space (CSS) of a P cell, transmitted on a UE-specific search space (USS), or transmitted on both the CSS and the USS.

When corresponding DCI is transmitted on a CSS, DRS information on SF # X may be transmitted on a CSS of a time of SF # X or transmitted in a CSS of a time of SF # X+1.

When corresponding DCI is transmitted on a USS, the DCI may be transmitted through a P cell in the case of cross carrier scheduling and may be transmitted through an S cell in the case of self carrier scheduling. For example, an eNB may differentiate a scrambling sequence, a CRS mask, and/or a search space of DCI to differentiate each DCI. As another example, the eNB may add a new field to DCI to differentiate each DCI. For example, when a value of the new field is '0', this may mean that a DRS is not transmitted and, when the value of the new field is '1', a DRS is transmitted.

In the case of common DCI, corresponding DCI may be configured to be transmitted at a time point in which a DRS is actually transmitted. Referring to FIG. 29, UE1 to UE3 may recognize that a DRS is transmitted at a time of SF # N+1 and SF # N+2 through common DCI on SF # N+1 and SF # N+2. In this case, UE1 and UE2 may assume that rate matching is performed on a DRS and DL data and may receive the DL data.

However, UE3 may not assume rate matching and may receive DL data. However, when UE3 drops DCI, ambiguity is disadvantageously caused with respect to whether a DRS is transmitted, thereby failing in data reception. To avert this problem, an eNB needs to always notify UEs about whether a DRS is transmitted, through common DCI in a DMTC period. In consideration of Alt. 1 and Alt. 2, the eNB may notify UE3 about an actual DRS start time point aside from whether a DRS is transmitted in a corresponding SF.

Considering transmission overhead of common DCI and that a UE that is supposed to actually perform rate matching is UE(s) that is supposed to receive DL data in a corresponding SF, the eNB may notify the UE about whether a DRS is transmitted, through a USS instead of a CSS. However, in considerate of Alt. 1, Alt. 2, and Alt. 4, the eNB may notify each UE about an actual DRS start time point aside from whether a DRS is transmitted during transmission of DRS transmission information on a USS. For example, in the case of Alt. 1, Alt. 2, and Alt. 4, although SF # N+2 and SF # K+2 are a second SF in all DMTCs, DRS start time points may be different and, thus, DRS configurations may be different. Accordingly, when UE2 scheduled in SF # N+2 needs to know that a corresponding DRS corresponds to a second DRS SF and UE1 scheduled in SF # K+2 needs to know that a corresponding DRS corresponds to a first DRS SF, appropriate rate matching may be performed.

4.1.2 Rate Matching Method 2

When a UE is capable of knowing start and length information of a DL TX burst through a preamble or DCI information, the UE may assume rate matching in consideration of DRS transmission only in a foremost SF(s) of a DMTC period that overlaps with a DL TX burst period and may receive DL data.

Referring to FIG. 29, a UE may be assumed to know that a DL TX burst is from SF # N to SF # N+3 through a preamble and/or DCI information of a start time point of a DL TX burst in SF # N. The UE may know that an SF, a DMTC period of which overlaps with a Tx burst, is from SF # N+1 to SF # N+3 and may easily know that a DRS and a PDSCH are capable of being multiplexed in foremost SFs, SF # N+1 and SF # N+2 thereamong. Accordingly, UE1 and UE2 may assume that data rate matching is performed on a DRS and a Tx burst and may receive corresponding SFs. UE3 may not assume that rate matching is performed on a DRS and a TX burst.

However, DMTC configuration of an LTE-A system may be changed for each UE and, in this regard, Rate Matching Method 2 may not be effective in the case of UE4 in which a DMTC is configured at a different time point from UE1 to UE3. That is, even if UE4 is capable of know presence of a DL TX burst through a preamble or DCI information, UE4 does not know a DMTC period configured for UE1 to UE3 and, thus, UE4 may not know that rate matching in consideration of a DRS is performed in SF # N+1 and SF # N+2. Accordingly, there may be a limit in that UE4 that does not know a DMTC period is not scheduled in a corresponding DMTC period. On the other hand, when Rate Matching Method 1 is used, UE4 may know whether a DRS is present through DCI information and, thus, may also advantageously assume rate matching.

4.1.3 Rate Matching Method 3

In the case of a UE to which other SF(s) as well as an SF(s) including a DRS are allocated in a DMTC period, the corresponding UE may determine whether rate matching is performed on a Tx burst and a DRS without separate signaling.

Figure 30:
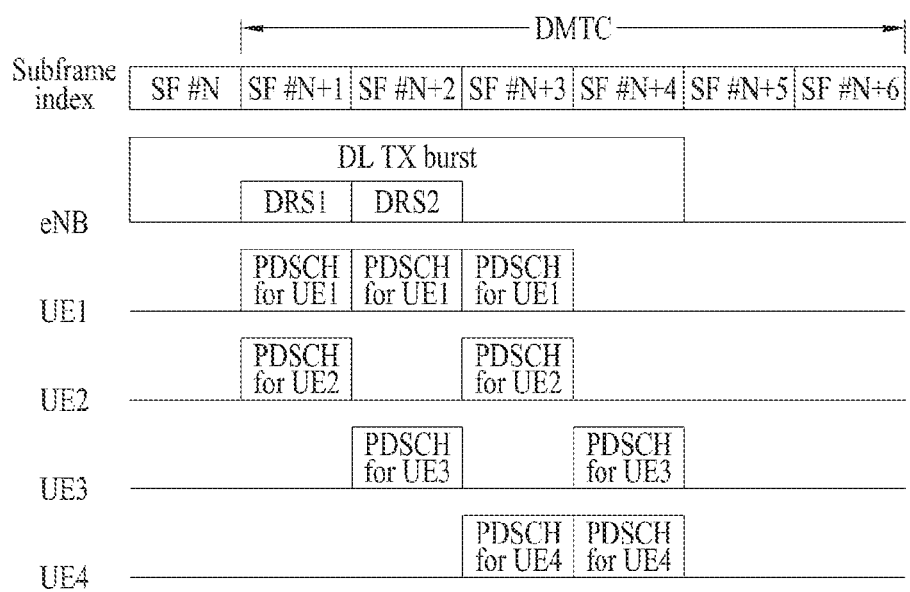
FIG. 30 is a diagram for explanation of a rate matching method of a DRS and a TX burst in an LAA system.

FIG. 30 is a diagram for explanation of a rate matching method of a DRS and a TX burst in an LAA system.

Referring to FIG. 30, UE1 may assume that DL data is continuously allocated to three SFs, SF # N+1 to SF # N+3. In SF # N+1 and SF # N+2, UE1 may perform rate matching on a DL TX burst in consideration of a DRS to receive DL data and, in SF # N+3, UE1 may receive DL data without rate matching in consideration of a DRS. Similarly, in SF # N+1, UE2 may perform rate matching in consideration of a DRS to receive DL data and, in SF # N+3, UE2 may receive DL data without rate matching in consideration of a DRS. A UE may advantageously and autonomously determine whether rate matching is performed without separate signaling, in particular, when a DRS is configured in one SF or less.

On the other hand, Rate Matching Method 3 may have disadvantages in the following situation. UE3 may be certain that rate matching is not performed on DL data of SF # N+4. However, when UE3 receives DL data on SF # N+2, ambiguity may be caused with respect to how rate matching is performed. According to Alt. 1 and Alt. 2, a rate matching pattern may be changed according to whether a DRS is started in SF # N+1 or SF # N+2 and, thus, there may be a problem in terms of DL data reception on SF # N+2 of UE3 that is not actually capable of knowing an actual DRS start time point. In addition, UE4 that is allocated DL data in SF # N+3 and SF # N+4 is not capable of knowing a DRS start time point and, thus, needs to assume that a DRS is always present and to perform rate matching.

As described with regard to Rate Matching Method 2 above, a problem may arise when a DMTC configuration is different for each UE and, thus, there is a limit in that a UE that does not know a DMTC period is not capable of being scheduled.

Rate Matching Method 3 may be combined with Rate Matching Method 1 and may be used. For example, when a UE is notified about only whether a DRS is transmitted, through common DCI, UE1 may omit common DCI information at a time point of SF # N+1 and/or SF # N+2. However, the UE is capable of knowing that a DRS is not transmitted at a time point of SF # N+3 and, thus, may not perform rate matching in consideration of a the DRS during reception of DL data in a corresponding SF.

4.1.4 Rate Matching Method 4

According to the following embodiments, a UE may determine whether a DRS is transmitted based on a start time or an end time of a scheduled TTI (e.g., 1 SF).

Figure 31:
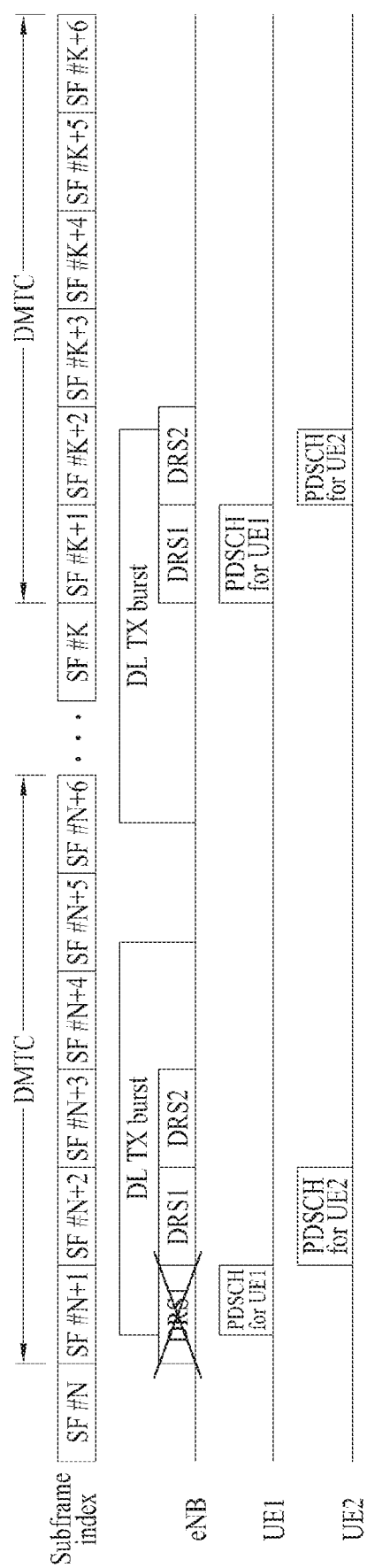
FIG. 31 is a diagram for explanation of one of data rate matching method that is applicable to an LAA system.

FIG. 31 is a diagram for explanation of one of data rate matching method that is applicable to an LAA system.

Referring to FIG. 31, when a TTI start time of UE1 that is allocated DL data in SF # N+1 is not an SF boundary and a TTI start time is not an SF boundary only in a first SF on a DL TX burst, UE1 may assume that a DRS to be started from an SF # N+1 boundary is not transmitted. That is, UE1 may not perform rate matching in consideration of a DRS on DL data received in SF # N+1.

Similarly, when a TTI end time is not an SF boundary only in a last SF on a DL TX burst, UE2 that is scheduled in such a way that the TTI end time is SF # K+2 but not an SF boundary and may assume that a DRS to be transmitted to a SF boundary of SF # K+2 is not transmitted. That is, UE1 may not perform rate matching in consideration of a DRS on DL data received in SF # K+2.

On the other hand, even if PDSCH transmission (i.e., a TX burst) is terminated prior to an SF boundary at a time point of SF # K+2 in consideration of importance of DRS transmission, DRS transmission may be allowed to an SF boundary at which SF # K+2 is ended. In this case, even if UE2 is scheduled in SF # K+2, UE2 may perform rate matching in consideration of DRS reception.

As shown in FIG. 31, a DL TX burst is not started or ended at an SF boundary, the present embodiment (Rate Matching Method 4) may also be applied to a frame configuration that does not assume a partial TTI less than 1 ms. For example, a super TTI greater than 1 ms may be allowed and may be allocated only to start and end of a DL TX burst.

In this case, a UE that is allocated a supper TTI including SF # N+1 or SF # K+2 may not assume rate matching during reception of DL data on SF # N+1 or SF # K+2.

As another example, a floating TTI that is a TTI in units of 1 ms but start and end of a PDSCH of which does not correspond to an SF boundary may not be allowed. However, it may be necessary to further transmit, to a UE, information indicating that the floating TTI is a first or last SF included in a DL TX burst.

According to another aspect of the present embodiment, even if a DRS start time point of the second DRS transmission method is not an SF boundary, Rate Matching Method 4 may be applied. For example, when a DRS is started at a slot boundary, UE1 may assume that a DRS started in a second slot is transmitted and may perform rate matching, in FIG. 31.

In this case, as described in Rate Matching Method 2 above, a problem may arise when a DMTC configuration is different for each UE and, thus, there is a limit in that a UE that does not know a DMTC period is not capable of being scheduled.

According to another aspect of the present embodiment, Rate Matching Method 4 may be applied to the first DRS transmission method as well as the second DRS transmission method.

4.1.5 Rate Matching Method 5

A UE may receive signaling indicating that CSI-RS/CSI-IM is valid in an SF or a plurality of SFs that are allocated to the UE. In this case, when an SF(s) indicating the corresponding signaling overlaps with a DMTC period configured in the UE, the UE may assume that a DRS is present on the overlapping SF(s) and may receive the corresponding SF(s). For example, in FIG. 30, UEs that receive signaling indicating that CSI-RS/CSI-IM present between SF # N and SF # N+4 is valid may assume that a DRS is transmitted in SF # N+1 and SF # N+2 and may perform rate matching.

The present embodiment may be applied in the same way to the first DRS transmission method as well as the second DRS transmissions method. However, as described with regard to Rate Matching Method 2 above, there is a problem in that a DMTC configured is different for each UE and, thus, there is a limit in that a UE that does not know a DMTC period is not capable of being scheduled.

4.1.6 Rate Matching Method 6

In the case of a PDSCH transmitted in a PRB(s) to which a PSS/SSS is not allocated, a UE may receive a corresponding SF without ambiguity even if separate signaling about whether rate matching is performed is not performed.

For example, when a DRS is transmitted in an SF(s) in a DMTC period, it may be assumed that the PSS/SSS is always transmitted through center 6 PRBs of a bandwidth and a CRS is transmitted in the formed of SFs outside the DMTC period. In this case, the UE may receive a PDSCH scheduled in a PRB(s) that does not overlap with the center 6 PRBs without additional data rate matching due to a DRS.

As another example, it is assumed that a PSS and/or an SSS are transmitted in an SF that is not SF #0 or #5 and is transmitted through other PRBs that are not center 6 PRBs. In this case, a UE may be configured to receive a PDSCH scheduled in a PRB(s) that does not overlap with PRBs in which the corresponding PSS/SSS is transmitted without additional data rate matching due to a DRS.

4.2 Method of Supporting Frequency Reuse

Figure 32:
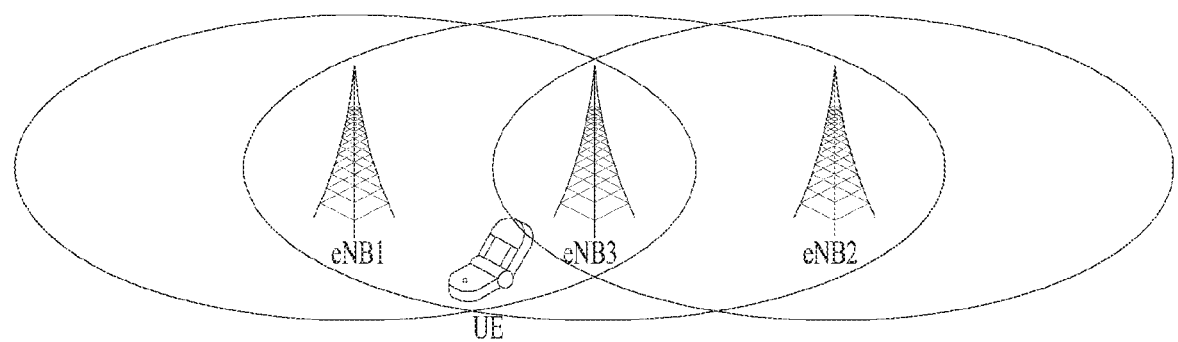
FIG. 32 is a diagram for explanation of frequency reuse methods that are applicable to an LAA system.

FIG. 32 is a diagram for explanation of frequency reuse methods that are applicable to an LAA system.

In FIG. 32, it is assumed that eNB1, eNB2, and eNB3 are each an eNB that operates in the LAA system and an UE is a UE for supporting LAA.

As shown in FIG. 32, it is assumed that eNB3 is positioned in a sensing range of eNB 1 and eNB2 and eNB 1 and eNB2 are positioned outside the sensing range. In this case, positioning in the sensing range may mean that a channel is determined to be occupied when eNB3 performs LBT (or CCA) while eNB 1 transmits a signal.

Hereinafter, a case (the first DRS transmission method) in which three eNBs are time-synchronized with each other, simultaneously configure a DMTC period for a UE, and transmit a DRS in a first SF in a DMTC period will be described.

Figure 33:
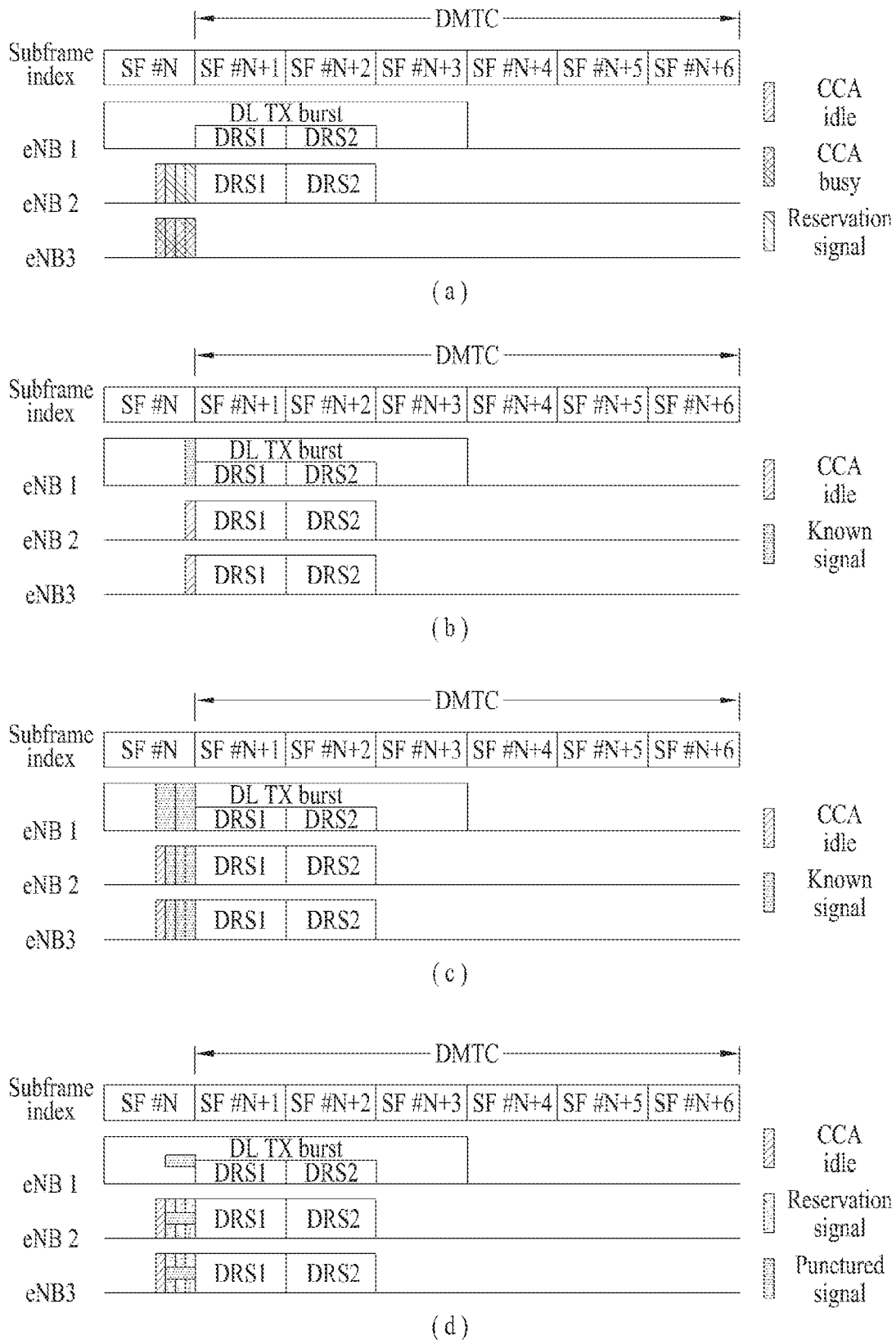
FIG. 33 is a diagram for explanation of frequency reuse methods that are applicable to an LAA system.

FIG. 33 is a diagram for explanation of frequency reuse methods that are applicable to an LAA system.

In embodiment of the present disclosure, it is assumed that a DMTC period is configured from SF # N+1 to SF # N+6, eNB 1 is capable of transmitting a DRS during two SFs (e.g., SFs # N+1 and # N+2), and eNB2 and eNB3 are capable of transmitting a DRS only from a first SF in a DMTC period according to whether LBT is successfully performed (i.e., the first DRS transmission). In addition, eNBs are assumed to be arranged as described with reference to FIG. 32. For convenience of description, DRS transmission is assumed to be started at an SF boundary but DRS transmission may also be started at a time point that is not an SF boundary (e.g., a slot boundary or OFDM symbols in which CRS port 0 is transmitted).

Referring to FIG. 33(a), eNB1 may transmit a DL TX burst from SF # N and may transmit a DRS from SF # N+1. In addition, eNB2 may detect that a corresponding channel is an idle state from a first sensing interval, may transmit a reservation signal and, then, may transmit a DRS from SF # N+1. However, eNB3 may determine a channel to be continuously in a busy state due to transmission in SF # N of eNB1 and, thus, may not transmit a DRS. In addition, eNB3 may determine a channel to be continuously in a busy state due to a reservation signal transmitted by eNB2 and, thus, may not transmit a DRS.

In consideration of a DRS transmission operation between eNBs (in particular, between intra-operator eNBs) that are operatively synchronized with each other, frequency reuse may be maximized to enhance DRS transmission possibility. However, as long as a separate operation is not further performed, it may not be easy to maximize frequency reuse due to a reservation signal transmitted just before transmission of a DL TX burst including a PDSCH and DRS transmission, as shown in FIG. 33(a).

Accordingly, hereinafter, DRS transmission methods of supporting frequency reuse will be described. A method of transmitting a DRS may include two methods including (1) a method of transmitting a DRS alone and (2) a method of transmitting together a DL TX burst including a DRS and other signals/channels aside from the DRS. With regard to each of the two cases, frequency reuse may be supported. For reference, the following embodiments may be applied to both the aforementioned first DRS transmission method and second DRS transmission method.

4.2.1 DRS Alone Transmission 4.2.1.1 Method 1

When an eNB does not transmit a reservation signal, another eNB may support reuse of a corresponding frequency. For example, when a total sensing period is configured with only one sensing interval, if an eNB checks CCA using only one sensing interval and, then, determines a current state as an idle state, the eNB may directly transmit a DRS or when the current state is a busy state, the eNB may drop DRS transmission at a corresponding time point. Referring to FIG. 33(a), when eNB2 does not transmit a reservation signal, eNB3 may not determine that a channel is in a busy state due to signal received from eNB2 at least just before DRS transmission.

4.2.1.2 Method 2

Even if transmission of a reservation signal is allowed, a predetermined known signal between eNBs may be used as a reservation signal to support frequency reuse. In detail, eNBs may be configured to attempt to detect the corresponding predetermined signal during one sensing interval or a plurality of sensing intervals during an LBT operation for DRS transmission and to perform CCA except for energy of the discovered signal upon discovering the corresponding predetermined signal.

For example, in FIG. 33(a), when a reservation signal transmitted by eNB2 is a predetermined signal between eNBs, eNB3 that detects the signal may not determine a channel to be in a busy state and may determine the channel to be in an idle state due to the reservation signal transmitted from at least eNB2. That is, eNB3 may use an empty frequency until eNB2 transmits a DRS.

4.2.1.3 Method 3

Similarly to Method 2, transmission of a reservation signal is allowed but (e.g., when a detailed waveform of a predetermined known signal is not defined), the reservation signal may be transmitted with a specific band or specific subcarrier(s) being empty to support frequency reuse. For example, when reservation signals are configured to be transmitted with center 6 PRB periods being empty, eNB3 of FIG. 33(a) may measure an energy amount only in the center 6 PRB frequency period (or a narrower frequency period than the same) and, thus, may not determine that a channel is in a busy state due to a reservation signal transmitted from eNB2.

4.2.2 Simultaneous Transmission of DRS and DL TX Burst Including Signal/Channel 4.2.2.1 Method 1

A start time point of a DRS and a DL TX burst including a signal that is not a DRS (from which a reservation signal is excluded) DL TX may be configured to correspond to a DRS start time point in a DMTC period to support frequency reuse.

For example, a limitation in that a DL TX burst is not capable of being started during some SFs just before SF # N+1 as a time point at which DRS transmission is supposed to be transmitted in FIG. 33(a) may be configured. That is, even if eNB1 completes an LBT operation just before SF # N is started, eNB1 may drop starting of transmission and may restart the LBT operation before SF # N+1 is started (to start DL TX burst transmission at a start time point of SF # N+1).

As another example, in FIG. 33(a), eNBs may unconditionally terminate DL TX burst transmission just before SF # N+1 as a time point when a DRS is supposed to be transmitted and may start an LBT operation for new DL TX burst transmission just before SF # N+1 is started. That is, even if an eNB starts DL TX burst transmission in SF # N, the eNB may terminate the corresponding DL TX burst transmission before SF # N+1 is started, may re-perform an LBT operation, and may attempt to transmit a DL TX burst from a start time point of SF # N+1. In this case, when the LBT operation is completed before a boundary of SF # N+1, transmission of a reservation signal may be allowed to an SF boundary and eNBs may be configured to transmit the reservation signal using the methods described in Sections 4.2.1.2 and 4.2.1.3.

However, the method may limit a time point of starting and completing a DL TX burst and, thus, may disadvantageously and inefficiently use a radio resource and, in particular, may be inefficient when a DMTC period is frequently configured or a DRS is transmitted using the second DRS transmission method.

4.2.2.2 Method 2

At least predetermined known signal may be transmitted during a total sensing period configured for DRS transmission to support frequency reuse. For example, in FIG. 33(a), eNB1 may transmit a known signal during a total sensing period configured for DRS transmission. When the total sensing period is greater than one OFDM symbol length and is less than two OFDM symbols, eNB1 may be configured to transmit a known signal during two OFDM symbols.

An eNB may be configured to multiplex and transmit a PDSCH and other channels/signals during two OFDM symbols configured to transmit a known signal and may be configured to transmit only a known signal during two OFDM symbols. Irrespective of whether multiplexing is allowed or not, data rate matching or puncturing may be performed on a PDSCH transmitted on a corresponding SF # N. A UE that is scheduled with a resource on a corresponding SF # N needs to know that data rate matching or puncturing is performed on a received PDSCH due to transmission of a known signal to successfully receive the PDSCH on corresponding SFs.

In this case, the UE may be configured to assume data rate matching or puncturing during all of configured total sensing periods and to receive a PDSCH or may use the methods described in Sections 4.1.1 to 4.1.5 above. For example, as proposed in Section 4.1.1 above, when a UE is notified about that rate matching or puncturing is performed through DCI on a USS, the corresponding UE may receive a corresponding PDSCH in consideration of data rate matching or puncturing according to a predefined rule. In FIG. 33(a), when eNB1 transmits a predetermined known signal during a total sensing period set in SF # N, eNB3 that detects the transmission may not determine that a channel is in a busy state due to the known signal transmitted from at least eNB1.

4.2.2.3 Method 3

During a total sensing period set for DRS transmission, an eNB may transmit a PDSCH and other signals while a radio resource corresponding at least a specific band or a specific subcarrier(s) is empty to support frequency reuse.

For example, in FIG. 33(a), eNB1 may transmit signals while center 6 PRB resources are empty during a total sensing period set for DRS transmission. When a total sensing period is greater than one OFDM symbol length and is less than two OFDM symbols, eNB1 may be configured to transmit signals while center 6 PRB resources are empty during two OFDM symbols.

As described in Section 4.2.2.2 above, when rate matching or puncturing is performed on a PDSCH during center 6 PRBs, information thereof needs to be indicated to a UE. In this case, the UE may be configured to assume data rate matching or puncturing on an empty specific band or specific subcarrier(s) resource during all of configured total sensing periods and to receive a PDSCH or may use the methods described in Sections 4.1.1 to 4.1.5 above.

In FIG. 33(a), when eNB1 is configured to transmit a DL TX burst with center 6 PRB period being empty during a total sensing period configured in SF # N, eNB3 may measure an energy amount only in the center 6 PRB frequency period or a narrower frequency period than the same and, thus, may not determine that a channel is in a busy state due to a DL TX burst transmitted from eNB1.

4.2.3 Frequency Reuse Method 1

The embodiments of Sections 4.2.1.1 to 4.2.1.3 and the embodiments of Sections 4.2.2.1 to 4.2.2.3 may be combined and applied. This is because, in FIGS. 32 and 33(a), when both of eNB2 corresponding to Section 4.2.1 and eNBcorresponding to Section 4.2.2 apply methods of supporting frequency reuse, eNB3 present in a sensing range of eNB1 and eNB2 is capable of wholly transmitting a DRS. According to this combination, there may be nine cases and some of these will now be described in more detail.

FIG. 33(b) is a diagram showing frequency reuse methods that are applicable to an LAA system for explanation of a case in which the embodiment of Section 4.2.1.1 above and the embodiment of Section 4.2.2.2 or 4.2.2.3 are combined.

Referring to FIG. 33(b), in the case of DRS alone transmission, an eNB may perform CCA during only one sensing interval and may not transmit a reservation signal and, in the case of DL TX burst transmission including a DRS, the eNB may transmit a known signal during an OFDM symbol(s) including a sensing interval or may transmit a DL TX burst with a specific band or a specific subcarrier(s) being empty. In FIG. 33(b), eNB3 may detect a known signal transmitted from eNB1 or may measure energy only in an empty resource period to determine that a channel is in an idle state and to transmit a DRS.

FIG. 33(c) is a diagram showing frequency reuse methods that are applicable to an LAA system for explanation of a case in which the embodiment of Section 4.2.1.2 above and the embodiment of Section 4.2.2.2 are combined.

In the case of DRS alone transmission, an eNB may transmit a reservation signal as a predetermined known signal and, in the case of DL TX burst transmission including a DRS, the eNB may transmit a known signal during an OFDM symbol(s) including a total sensing period. In FIG. 33(c), eNB3 may subtract a known signal transmitted from eNB1 and eNB2 and then measure energy and, upon determining that a channel is in an idle state, eNB3 may transmit a DRS.

FIG. 33(d) is a diagram showing frequency reuse methods that are applicable to an LAA system for explanation of a case in which the embodiment of Section 4.2.1.3 above and the embodiment of Section 4.2.2.3 are combined.

In the case of DRS alone transmission, an eNB may transmit a reservation signal with a specific band or a specific subcarrier(s) being empty and, in the case of DL TX burst transmission including a DRS, the eNB may transmit a signal with a specific band or a specific subcarrier resource being empty during OFDM symbols including a total sensing period. In FIG. 33(d), eNB3 may measure energy only in an empty resource period to determine that a channel is in an idle state and to transmit a DRS.

4.3 TDM-Based DRS Transmission Method

In an LTE-A system, a DRS may be used for cell detection and RRM measurement and may also be used for cell detection and RRM measurement in an unlicensed band.

However, when eNBs are synchronized with each other and frequency reuse is maximized and a DRS is transmitted as in the aforementioned embodiments, cell detection performance of a UE may be degraded. This is because a serving cell or an adjacent cell simultaneously transmit PSS/SSS and, thus, may interfere with each other.

With regard to RRM measurement (in particular, RSSI and RSRQ), an interfered amount may be overestimated. This is because, when a UE is assumed to perform RRM measurement during a period of transmission of a serving eNB, RRM measurement is performed through DRSs that are simultaneously transmitted from a plurality of eNBs.

To avert this problem, a DRS may be configured to be transmitted at different time points based on a TDM in the same DMTC period through coordination between eNBs. In detail, there may be different configurations as in the following embodiments.

4.3.1 First Method

It may be assumed that only one time point of transmitting a DRS is present in a DMTC period and an eNB may be configured to drop DRS transmission when the eNB is not capable of be transmitting a DRS due to LBT failure or the like.

FIG. 34 is a diagram for explanation of methods of transmitting a DRS based on a TDM in an LAA system.

A time point of transmitting a DRS may be differently configured for each eNB (or cell). For example, as shown in FIG. 34(a), eNB1 may be configured to start DRS transmission from SF # N+1, eNB2 may be configured to start DRS transmission from SF # N+3, and eNB3 may be configured to start DRS transmission from SF # N+5. For convenience of description, DRS transmission is assumed to be started at an SF boundary but DRS transmission may also be started at a time point (e.g., a slot boundary or OFDM symbols transmitted in CRS port 0) but not an SF boundary.

In this case, a DRS transmission start position set for each eNB (or a DRS transmission start position set for some eNBs) may be indicated to a UE via high layer signaling. Alternatively, DRS transmission start positions of a serving cell and adjacent cells may be determined according to a predetermined rule. For example, a DRS transmission start position may be calculated using a method of (DMTC start SF index+{ID of each cell}%6). To support frequency reuse all SFs at a time point when each eNB transmits a DRS (e.g., SF # N+1, SF # N+3, and SF # N+5) or in a DMTC period, the above embodiments described in Sections 4.2.1.1 to 4.2.1.3 and 4.2.2.1 to 4.2.2.3 may be applied in the same way.

4.3.2 Second Method

A plurality of time points (e.g., every SF boundary) of transmitting a DRS in a DMTC period may be configured to be present. In this case, even if an eNB fails in LBT in a specific time point, the eNB may re-perform LBT at one of a plurality of time points to transmit a DRS.

A time point of transmitting a DRS may be differently configured for each eNB (or cell). For example, like in FIG. 34(b), when a DRS is assumed to be transmitted through one SF, eNB1 may attempt DRS transmission from one of SF # N+1 or SF # N+4, eNB2 may attempt DRS transmission from one of SF # N+2 or SF # N+5, and eNB3 may attempt DRS transmission from one of SF # N+3 or SF # N+6.

For convenience of description, DRS transmission is assumed to be started at an SF boundary but DRS transmission may also be started at a time point (e.g., a slot boundary or OFDM symbols transmitted in CRS port 0) but not an SF boundary. In this case, a DRS transmission start position set for each eNB (or a DRS transmission start position set for some eNBs) may be indicated to a UE via high layer signaling. Alternatively, DRS transmission start positions of a serving cell and adjacent cells may be determined according to a predetermined rule. For example, a DRS transmission start position may be calculated using a method of (DMTC start SF index+{ID of each cell}%3) or (DMTC start SF index+3+{ID of each cell}%3).

To support frequency reuse all SFs at a time point when each eNB transmits a DRS (e.g., SF # N+1, SF # N+2, SF # N+3, SF # N+4, SF # N+5, and SF # N+6) or in a DMTC period, the above embodiments proposed in Sections 4.2.1.1 to 4.2.1.3 and 4.2.2.1 to 4.2.2.3 may be applied in the same way.

4.4 FDM-Based DRS Transmission Method

When a frequency reuse method is maximized and a DRS is transmitted, a DRS may be configured to be transmitted at different time points for respective eNBs to reduce interference between cells as in the aforementioned embodiments. However, hereinafter, as another approach method, methods of configuring a DRS to be transmitted using different frequency resources for respective eNBs will be described.

Figure 35:
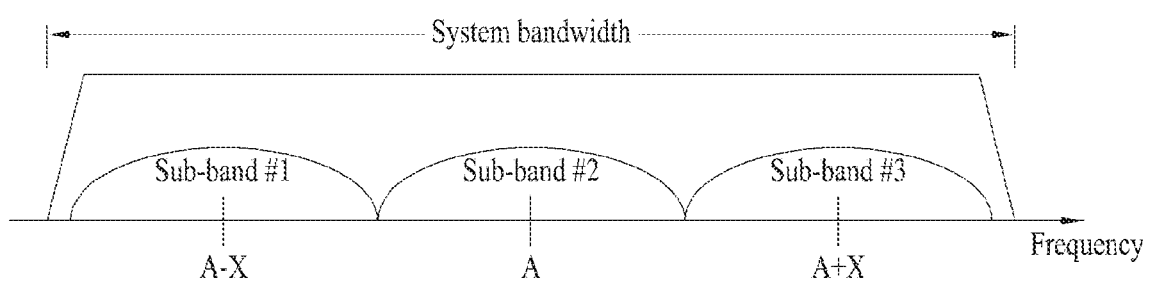
FIG. 35 is a diagram showing a case in which a system band used in an LAA system is divided into three sub-bands.

FIG. 35 is a diagram showing a case in which a system band used in an LAA system is divided into three sub-bands.

Referring to FIG. 35, it may be assumed that an entire system band of an LAA cell is divided into three sub-bands. Each sub-band may be configured to have a bandwidth of X (or X or less) using A−X, A, and A+X as a center frequency. In this case, A may be a center frequency of an entire system band. eNB1 may be configured to transmit a DRS through sub-band #1, eNB2 may be configured to transmit a DRS through sub-band #2, and eNB3 may be configured to transmit a DRS through sub-band #3.

eNB1 may transmit a PSS/SSS included in a DRS based on A−X, eNB2 may transmit the PSS/SSS based on A, and eNB3 may transmit the PSS/SSS based on A+X, through center 6 PRBs. However, according to another aspect of the present embodiment, a PSS and/or an SSS may be limited to be transmitted based on a center frequency A (e.g., through center 6 PRBs) of an entire system band, commonly to all eNBs.

In the case of a measurement RS of a CRS/CSI-RS included in a DRS, eNB1 may transmit the measurement RS only on sub-band #1, eNB2 may transmit the measurement RS only on sub-band #2, and eNB3 may transmit the measurement RS only on sub-band #3. In this case, some RSs of the CRS/CSI-RS included in a DRS may be configured to be transmitted over an entire band or a CRS/CSI-RS may be transmitted over an entire band in some OFDM symbols and may be transmitted over a sub-band in the other OFDM symbols.

When an eNB multiplexes and transmits data during DRS transmission, even if DRS transmission is limited to some sub-bands, the data may be transmitted over an entire band. Alternatively, the eNB may transmit data using a frequency resource aside from a sub-band configured to transmit a DRS (or its portion).

Referring to FIG. 35, when eNB1 configured to transmit a DRS on sub-band #1 simultaneously transmits a DRS and data (or in an SF in which a DRS is capable of being transmitted), eNB1 may transmit the data through sub-band #2 and sub-band #3.

In this case, during LBT for DRS transmission, CCA may be performed only on sub-band #1 and, during LBT for data transmission, CCA may be performed only on sub-band #2 and sub-band #3.

In the second DRS transmission method, data may be configured to be transmitted through sub-band #2 and sub-band #3 with respect to all SFs in a DMTC period.

When a DRS and a Tx burst are transmitted using different frequency resources for respective eNBs, an eNB may be configured to use a sub-band fixed for each eNB. However, a sub-band used at a specific time point (e.g., a SF unit, a DMTC unit, or a predetermined time) may be differently configured. For example, when eNB1 is configured to transmit an SSS through sub-band #1 in a current DMTC period, eNB1 may be configured to transmit an SSS through sub-band #2 in a next DMTC period.

An eNB may notify a UE about used sub-band information via a high layer or physical layer signaling whenever different frequency resources are used. Alternatively, a period at which information indicating a frequency resource used by each eNB may be predetermined or the corresponding period may be signaled via a high layer or frequency use information depending on a period may be signaled via a high layer or a physical layer. Alternatively, the period may be pre-defined to be guided from information such as a cell ID.

4.5 DL TX Burst Configuring Method for Supporting Frequency Reuse

Hereinafter, a DL TX configuring method for DRS transmission for maximizing frequency reuse will be described.

FIG. 36 is a diagram for explanation of methods of configuring a DL TX burst for supporting frequency reuse.

To transmit a DRS using the second DRS transmission method or a TDM configuration, there may also be a plurality of time points of starting DRS transmission in a configured DMTC period (when only a specific serving cell is considered or all adjacent cells as well as the specific serving sell are considered). When DL TX burst transmission is transmitted at one of the plurality of DRS transmission time points, an eNB may be configured to complete DL TX burst transmission prior to a next DRS transmission start time point to maximize frequency reuse.

For example, in consideration of the second DRS transmission method in which DRS transmission is started every SF boundary, it may be assumed that backoff for a PDSCH or an LBT procedure is completed and DL TX burst transmission is started just before a boundary of SF # N+1, like in FIG. 36(a).

Even if a DL TX burst is started in SF # N+1, eNB1 may terminate transmission of the DL TX burst prior to SF # N+2 in consideration of adjacent eNBs that are capable of attempting DRS transmission in SF # N+2. In this case, the DL TX burst may be configured to be transmitted in consecutive SFs or DL TX burst transmission may be terminated before SF # N+2 is started at a predetermined gap in consideration of a sensing period required for DRS transmission.

For example, when backoff or an LBT procedure for a PDSCH is completed just before SF # N+4 is started, eNB1 may start DL TX burst transmission and may terminate DL TX burst transmission before SF # N+5 is started at a predetermined gap. In addition, when backoff or an LBT procedure for a PDSCH is completed just before SF # N+5 is started, eNB1 may start DL TX burst transmission and may terminate DL TX burst transmission before SF # N+6 is started at a predetermined gap.

In this case, a DL TX burst transmitted in SF # N+1 is multiplexed with a DRS and may be transmitted, and a DL TX burst transmitted in SF # N+4 and SF # N+5 may be transmitted without a DRS because the DRS is already transmitted in SF # N+1. In this case, whether rate matching is performed on each SF may be indicated using the method described in Sections 4.1.1 to 4.1.5 above. When backoff or an LBT procedure for a PDSCH is completed before a start boundary of SF # N+1, SF # N+4, or SF # N+5, an eNB may apply the embodiments described in Sections 4.2.1.1 to 4.2.1.3 above to transmit a reservation signal.

Referring to FIG. 36(b), even if next LBT performed just before SF # N+1 is started fails, when LBT for a PDSCH is successfully performed, an eNB (e.g., eNB1) may start DL TX burst transmission at one of predetermined start time points of a DL TX burst.

In addition, a DL TX burst may be transmitted in consecutive SFs or DL TX burst transmission may be terminated before SF # N+2 is started at a predetermined gap in consideration of a sensing period required for DRS transmission. When backoff or an LBT procedure for PDSCH is completed just before SF # N+4 is started, a DRS and DL TX burst transmission may be started and DL TX burst transmission may be terminated before SF # N+5 is started at a predetermined gap.

When LBT for a PDSCH is successfully performed after a boundary of start of SF # N+5, an eNB may start DL TX burst transmission at one of predetermined DL TX burst start time points. In this case, a UE may be notified of whether rate matching is performed on each SF using the above methods described in Sections 4.1.1 to 4.1.5 above.

4.6 DRS Transmission Method when MBSFN Configuration is Applied

The technical features described in Sections 1 to 3 and 4.1 to 4.5 may be applied to the following embodiments of the present disclosure.

In an LTE-A system, an SF in which a multimedia broadcast multicast service (MBMS) signal is transmitted is defined as a multimedia broadcast multicast service single frequency network (MBSFN) SF. Each MBSFN SF may include a non-MBSFN region and an MBSFN region. The non-MBSFN region may include first one or two OFDM symbols and the MBSFN region may include a part that is not the non-MBSFN region in the MBSFN SF.

In the MBSFN SF, an eNB may transmit a CRS only in first some OFDM symbols (e.g., the none-MBSFN region). However, to receive a DL signal from an eNB or to serve only a DM-RS-based transmission mode UE by a relay (even if an MBMS signal is not transmitted), a MBSFN SF configuration may be employed.

A U cell supported in an LAA system may also use the MBSFN SF configuration irrespective of whether an MBMS is actually transmitted. For example, an eNB may transmit a CRS only in first some OFDM symbols (e.g., one or two OFDM symbols) of an SF configured as an MBSFN SF.

4.6.1 MBSFN Configuration in DMTC Period or SF in which DRS is Transmitted

When an MBSFN SF configuration is applied to an SF in which a DRS is transmitted, if only a CRS transmitted in the corresponding MBSFN SF is used, demand for a RRM measurement and a cell identification for an LAA S cell (i.e., U cell) may not be satisfied. Accordingly, it may be preferable to configure an MBSFN SF configuration not to be applied to at least a DRS occasion.

For example, the MBSFN SF configuration may not be configured only to SFs configured as a DMTC period. That is, a UE may not expect that an MBSFN SF is configured for SFs configured as a DMTC period.

The same method may also be applied to adjacent cells that are not a serving cell. For example, a UE may receive and decode corresponding SF under an assumption that a SF(s) in a DMTC period in which adjacent cell measurement and/or cell identification are performed or an SF including a DRS is not an MBSFN SF.

According to another aspect of the present embodiment, even if a SF (e.g., a first SF) included in a DMTC period is configured as an MBSFN SF, when a DRS is transmitted in the corresponding SF (i.e., a first SF), a UE may determine that the corresponding SF is not an MBSFN SF. In other words, in a DL SF including an OFDM symbol in which a DRS is transmitted, an MBSFN configuration may not be applied. For example, a CRS may also be transmitted in OFDM symbols aside from a first or second OFDM symbol.

In this case, a method of knowing whether a UE transmits a DRS may discover a DRS in a corresponding SF (a first SF) or may use the above proposed methods described in Sections 4.1.1 to 4.1.5 above.

On the other hand, when an SF (e.g., a second SF) included in a DMTC period is configured as an MBSFN SF, a UE that is scheduled with a PDSCH without a DRS in a corresponding SF may still consider the corresponding SF (i.e., a second SF) as an MBSFN SF. In this case, a method of knowing whether a UE transmits a PDSCH without a DRS in a DMTC period may use the above methods described in Sections 4.1.1 to 4.1.6 above.

Figure 37:
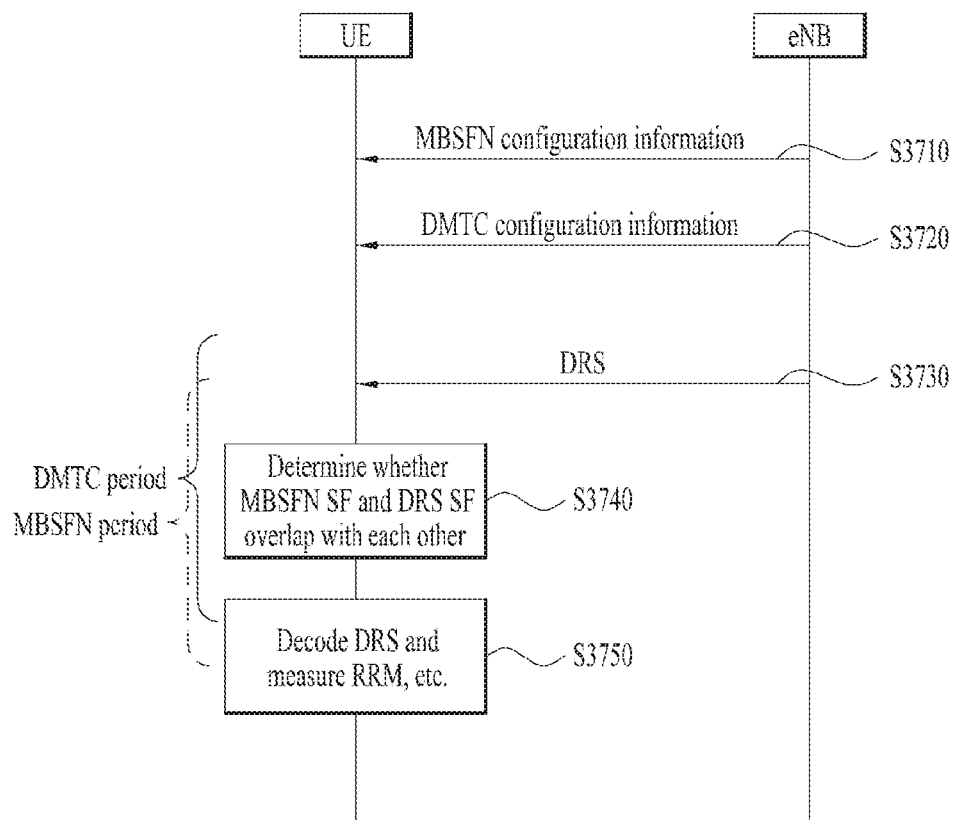
FIG. 37 is a diagram for explanation of a method of transmitting and receiving a DRS in an MBSFN period.

FIG. 37 is a diagram for explanation of a method of transmitting and receiving a DRS in an MBSFN period.

Referring to FIG. 37, an eNB may transmit MBSFN configuration information and DMTC configuration information to a UE through a high layer signal in a P cell of a licensed band or a U cell of an unlicensed band (S3710 and S3720).

The MBSFN configuration information may include a laa-SCellSubframeConfig or mbsfn-subframeconfiglist parameter and the laa-SCellSubframeConfig or mbsfn-subframeconfiglist parameter indicate SFs which are allocated as an MBSFN SF in an LAA S cell. In this case, the MBSFN configuration information may be transmitted through a high layer signal (e.g., an RRC signal and a system information block).

The MBSFN configuration information and the DMTC configuration information may be transmitted through different high layer signals (e.g., an RRC signal). However, the MBSFN configuration information and the DMTC configuration information may be transmitted through the same high layer signal according to a channel environment or the like.

Upon receiving the MBSFN configuration information, a UE may recognize MBSFN SFs to which the MBSFN configuration is applied. Accordingly, the UE may receive MBMS control information and/or MBMS data in MBSFN SFs.

In addition, upon receiving the DMTC configuration information, a UE may recognize a DMTC period including SFs in which a DRS is capable of being transmitted. Accordingly, the UE may monitor whether a DRS is transmitted in a DMTC period. However, whether a DRS is transmitted or not may be applied with reference to the above embodiments described in Sections 4.1.1 to 4.1.6 above.

Referring back to FIG. 37, a UE may receive a DRS in a first SF configured on a U cell. In this case, the SF may be an MBSFN SF. However, even if the first SF is an MBSFN SF, a DRS is transmitted, the DRS may be received without application of an MBSFN configuration to the first SF. Accordingly, the UE may determine whether an MBSFN SF and an SF in which a DRS is transmitted overlap with each other (S3740) and when the SFs overlap with each other, the UE may decode the received DRS without application of the MBSFN configuration in the first SF (S3750).

The UE may perform RRM measurement, cell identification, or the like based on the received DRS.

Although not shown in FIG. 37, the MBSFN configuration may be applied to an SF (e.g., a second SF) in which a DRS is not transmitted among SFs configured as an MBSFN SF. Accordingly, the UE may receive a CRS in the non-MBSFN region in the corresponding MBSFN SF and may receive MBMS control information or data in the MBSFN region.

According to another aspect of the present embodiment, a DRS transmitted in an SF configured as an MBSFN SF and a DRS transmitted in a normal SF may be differently defined. For example, CRSs included in the DRS on the MBSFN SF may be configured to be less than CRSs included in the DRS on the normal SF. For example, when the CRSs included in the DRS on the normal SF are transmitted in $0^{th}$, $4^{th}$, $7^{th}$, and/or $11^{th}$ OFDM symbols, the CRSs included in the DRS on the MBSFN SF may be configured to be transmitted only in a $4^{th}$ and/or $7^{th}$ OFDM symbol.

In the embodiments of the present disclosure, a DRS may be referred to as a discovery signal.

4.6.2 MBSFN Configuration of Partial SF

Referring to FIG. 36($b$), a size of an SF included in a DL TX burst may be less than 1 ms. For convenience, such SFs may be defined as a partial SF (pSF). Hereinafter, MBSFN configuring methods of a pSF will be described.

In general, the pSF may be extensively applied when the pSF is present outside a DMTC as well as inside the DMTC. In this case, the pSF may be classified into a pSF with first some OFDM symbols being empty and a pSF with last some OFDM symbols being empty. Each case will be described as follows.

4.6.2.1 pSF with First Some OFDM Symbols being Empty

Hereinafter, a pSF (e.g., when a first SF on a DL TX burst is a pSF) which is transmitted with first some OFDM symbols being empty among SFs included in a DL TX burst will be described.

(1) A UE may consider that an MBSFN SF configuration for a pSF is invalid.

(2) Even if a pSF is configured as a MBSFN SF, a CRS may be transmitted only in first some OFDM symbol(s) (e.g., a non-MBSFN region) included in the corresponding pSF.

(3) Even if a pSF is configured as a MBSFN SF, a CRS may be transmitted only in first some OFDM symbol(s) (e.g., one or two OFDM symbols) of a second slot included in the corresponding pSF. For example, in the case of a pSF transmitted in a length of 10 OFDM symbols, a CRS may be transmitted only in a $7^{th}$ (or $7^{th}$ and $8^{th}$) OFDM symbol(s).

(4) Depending on a length of a pSF, validity of the MBSFN SF configuration may be determined. For example, when a length of a pSF is equal to or less than nine OFDM symbols, the MBSFN SF configuration may not be valid and, when the length of the pSF is equal to or greater than ten OFDM symbols, the MBSFN SF configuration may be valid. When the MBSFN SF configuration is valid, a position of a CRS may be first some OFDM symbols (e.g., one or two OFDM symbols) of the pSF or $7^{th}$ (or $7^{th}$ and $8^{th}$) OFDM symbol(s).

4.6.2.2 pSF with Last Some OFDM Symbols being Empty

Among SFs included in a DL TX burst, a pSF (e.g., when a last SF on a DL TX burst is a pSF) with last some OFDM symbols being empty will be described below.

A MBSFN SF configuration of the corresponding pSF may be considered to be always valid.

4.6.2.3 pSF with First and Last Some OFDM Symbols being Empty

Among SFs included in a DL TX burst, a pSF (e.g., a pSF on a DL TX burst less than 1 ms) that is transmitted with first and last some OFDM symbols being empty will be described below.

The same method as the aforementioned method of "a pSF that is transmitted being first some OFDM symbols being empty among SFs included in a DL TX burst" may be applied. That is, the embodiments of Section 4.5.2.1 may be applied.

4.6.3 MBSFN Configuration in LAA S Cell

Hereinafter, an MBSFN SF configuration in an LAA S cell to be used in embodiments of the present disclosure will be described.

A CRS belonging to a control channel region of an MBSFN SF may be transmitted in first some OFDM symbol(s) (e.g., one or two OFDM symbols) of the MBSFN SF using the same antenna port(s) as a normal SF but not the MBSFN SF.

A CRS may not be transmitted in a data region (i.e., an MBSFN region) of an MBSFN SF of an LTE-A system but CRS transmission may also be allowed in a data region of the MBSFN SF to ensure synchronization performance in an LAA cell and to determine whether a TX burst of a UE is present.

In this case, CRS transmission may be allowed using one of the following alternatives.

4.6.3.1 Transmission Using CRS Port 0

Irrespective of whether an eNB transmits a CRS using any antenna port(s) in a normal SF in a corresponding LAA cell, a UE may assume that a CRS is transmitted through at least CRS port 0 in all MBSFN SFs. In other words, despite an MBSFN SF, transmission of CRS port 0 may be allowed in $0^{th}$, $4^{th}$, $7^{th}$, and/or $11^{th}$ OFDM symbols.

4.6.3.2 Transmission of CRS Port 0 Only in First Slot

Transmission of CRS port 0 may be allowed only in a first slot of an MBSFN SF. For example, transmission of CRS port 0 may be allowed in $0^{th}$ and $4^{th}$ OFDM symbols.

In consideration of intermittent transmission of an LAA cell, it may be difficult to assume demodulation of a PDCCH using a CRS present in a plurality of SFs. Accordingly, despite an MBSFN SF, CRS port 0 present in a $4^{th}$ OFDM symbol may be additionally used to enhance PDCCH demodulation performance.

4.6.3.3 CRS Transmission in First Slot is the Same as Normal SF

The same CRS as a normal SF may be transmitted only in a first slot of an MBSFN SF. For example, when CRS ports 0 and 1 are transmitted in the normal SF, a CRS in both CRS ports 0 and 1 may also be transmitted in the first slot of the MBSFN SF and a CRS may not be transmitted in a second slot of the MBSFN SF.

Alternatively, a CRS in both CRS ports 0 and 1 may be transmitted in the first slot of the MBSFN SF and CRS transmission may be allowed only via CRS port 0 in the second slot of the MBSFN SF.

The above CRS transmission methods described in Sections 4.6.3.1 to 4.6.3.3 above may be extensively applied to other normal SFs as well as an MBSFN SF. For example, when a new form of configuration but not an MBSFN SF configuration is introduced in an LAA system, a CRS may be transmitted in SFs determined by the corresponding new configuration like in the methods described in Sections 4.6.3.1 to 4.6.3.3 above.

According to another embodiment of the present disclosure, in the case of an SF indicated by common DCI on a P cell or a PCFICH, a CRS may be transmitted like in the methods described in Sections 4.6.3.1 to 4.6.3.3 above.

According to another embodiment of the present disclosure, in the case of an SF with first some OFDM symbols being empty or last some OFDM symbols being empty, a CRS may be transmitted like in the methods described in Sections 4.6.3.1 to 4.6.3.3 above.

According to another embodiment of the present disclosure, a CRS transmission method may be assumed to be changed depending on a transmission mode (TM) used for each UE.

For example, a UE may assume that a CRS is transmitted in all SFs and may receive an SF for tracking irrespective of a TM like in at least the methods described in Sections 4.6.3.1 to 4.6.3.3 above. When Section 4.6.3.1 above is applied, all UEs may use CRS port 0 (which is always transmitted in an SF on a TX burst) for tracking.

In this case, a UE using a CRS-based TM may assume that all CRS are transmitted only in a scheduled SF and may assume that only a CRS for tracking is present in the scheduled SF.

In addition, a UE using a DM-RS-based TM may assume that only a CRS for tracking is transmitted in all SFs and may receive a PDSCH.

4.7 Broadcast Information Transmitted in DRS Occasion

Assuming DRS transmission configured with only a PSS, an SSS, a CRS, and/or a CSI-RS (if configured) without DL data, symbols that do not include any signal may be present.

In consideration of a contention-based unlicensed band operation, an SF including a DRS may be continuously transmitted without an empty OFDM symbol to keep a transmission occasion from switching to another transmission node and a simplest method is to transmit a dummy signal to an empty OFDM symbol.

However, when a dummy signal is simply transmitted, a radio resource may be wasted. Accordingly, it may be important to configure a DRS SF using a method as efficient as possible. To this end, when an eNB transmits a DRS including only a PSS, an SSS, a CRS, and/or a CSI-RS without DL data, an adjacent LAA eNB and LAA UE, and so on may receive the DRS and may transmit the DRS with helpful broadcast information. In this case, the information may be configured to include at least one of the following information items.

(1) The number of CCA slots included in a defer period for each LBT priority class when the number of CCA slots included in the defer period for each DL (and/or UL) LBT priority class is configured to be different.

(2) A maximum value and minimum value of a contention window size, and/or a current contention window size value for each DL (and/or UL) LBT priority class.

(3) Whether a starting pSF is supported in a corresponding U cell and/or starting OFDM symbol position candidates of a supported pSF.

(4) Whether an ending pSF is supported in a corresponding U cell and/or ending OFDM symbol position candidates of a supported pSF.

(5) Whether category 4 LBT is performed during DL (and/or UL) multi-carrier LBT.

(6) A maximum length of DL (and/or UL) TX burst.

(7) Whether RSSI is measured: For example, a UE that receives corresponding information when RSSI measurement is triggered in DRS occasions in a corresponding DMTC may perform RSSI measurement i) during a configured DMTC period (e.g., 40 ms, 80 ms, or 160 ms), ii) until a request for stop of RSSI measurement is received, or iii) during a predetermined timer period. In this case, information on a carrier on which RSSI measurement needs to be performed may be additionally broadcast.

(8) MBSFN configuration information: MBSFN configuration information on an MBSFN SF (i.e., MBSFN SF configuration information) which is to be applied during a predetermined DMTC period (e.g., 40 ms, 80 ms, or 160 ms) or a predetermined period may be broadcast. For example, when a DMTC period is 40 ms, whether a corresponding SF is an MBSFN SF may be indicated during 40 ms. As another example, basically, all SFs may be an MBSFN SF and (when a DMTC period is 40 ms) whether a corresponding SF during 40 ms is a normal SF may be indicated. As another example, when a DMTC period is 40 ms, whether all SFs during 40 ms are an MBSFN SF or a normal SF may be indicated.

The aforementioned rate matching methods (Section 4.1), the frequency reuse methods (Section 4.2), the TDM or FDM-based DRS transmission methods (Sections 4.3 and 4.4), and so on may also be extensively applied to a DRS applied outside a configured DMTC period.

A rule may be defined in such a way that an eNB notifies a UE about information on whether the aforementioned embodiments of the present disclosure are applied (or information on rules of the aforementioned methods) via a predetermined signal (e.g., a physical layer signal or a high layer signal).

5. Apparatuses

Figure 38:
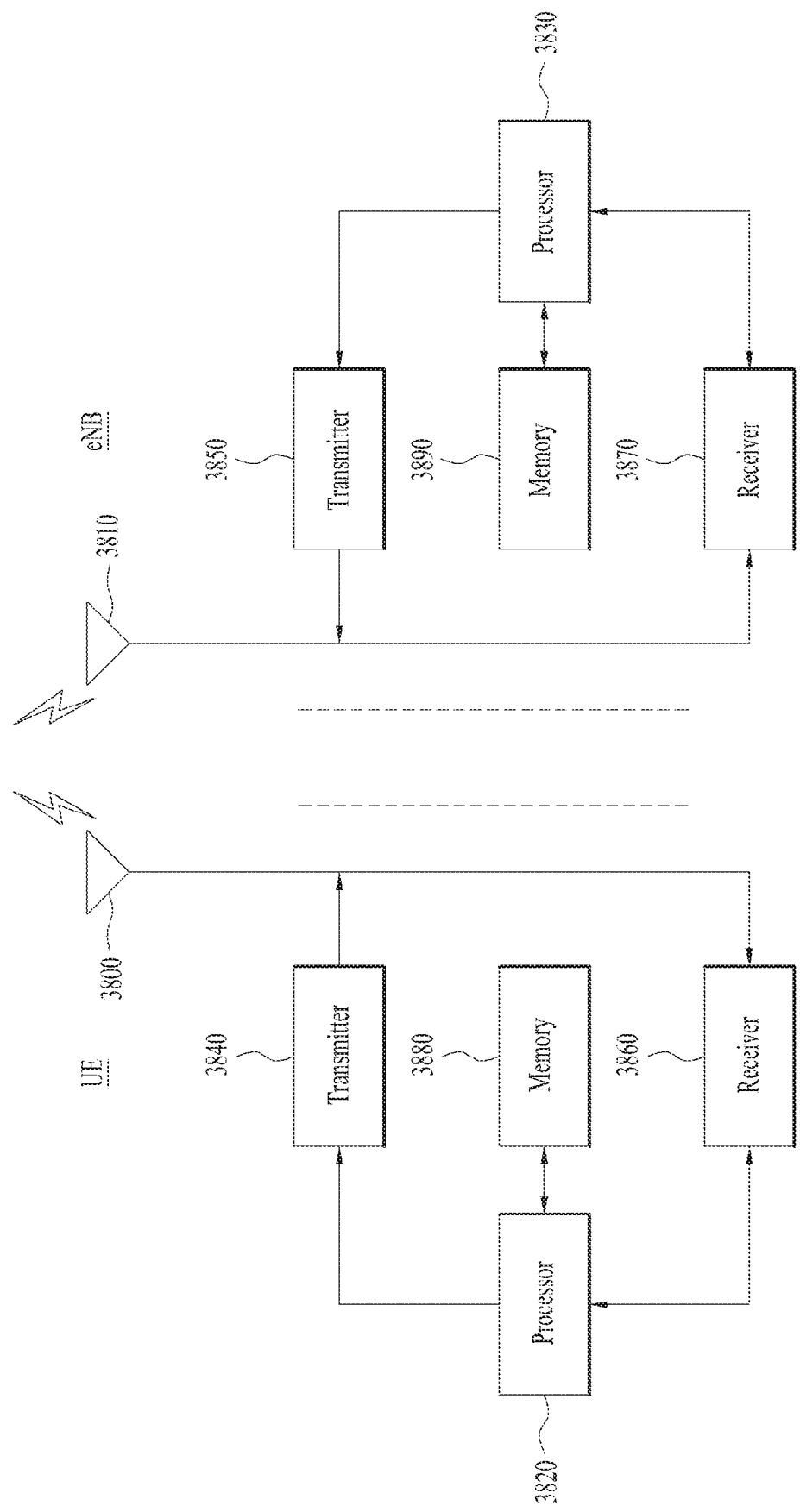
FIG. 38 shows apparatuses which are means that can implement the methods described before with reference to FIGS. 1 to 37.

Apparatuses illustrated in FIG. 38 are means that can implement the methods described before with reference to FIGS. 1 to 37.

A UE may act as a transmission end on a UL and as a reception end on a DL. An eNB may act as a reception end on a UL and as a transmission end on a DL.

That is, each of the UE and the eNB may include a Transmitter (Tx) 3840 or 3850 and a Receiver (Rx) 3860 or 3870, for controlling transmission and reception of information, data, and/or messages, and an antenna 3800 or 3810 for transmitting and receiving information, data, and/or messages.

Each of the UE and the eNB may further include a processor 3820 or 3830 for implementing the afore-described embodiments of the present disclosure and a memory 3880 or 3890 for temporarily or permanently storing operations of the processor 3820 or 3830.

The embodiments of the present disclosure may be implemented by use of the components and functions of the afore-described UE and eNB. For example, the processor of the eNB may perform CAP (or CS, CAA, or the like) for determining whether an LAA cell is idle by controlling the Tx and Rx. Further, the processor of the eNB may control a transmitter and a receiver to perform a rate matching method of a TX burst, a method of supporting frequency reuse, a TDM or FDM-based DRS transmission method, a DRS transmission method when an MBSFN configuration is applied, and methods of transmitting broadcast information in a DRS occasion. For example, in the method of transmitting a DRS when the MBSF configuration is applied, the processor of the eNB may control the transmitter to transmit MBSFN configuration information, DMTC configuration information, and so on to the UE through a high layer signal. In addition, the processor of the eNB may disregard the MBSFN configuration information and may configure and transmit a DRS when the DRS needs to be transmitted in a DMTC period even if the DRS is configured with an MBSFN SF. The processor of the UE may control a receiver to receive MBSFN configuration information and DMTC configuration information to recognize an MBSFN period and a DMTC period. Accordingly, the processor of the UE may not apply MBSFN configuration information in an SF in which a DRS is transmitted when the DRS is configured with a MBSFN period and may control the receiver to receive the DRS. For details thereof, sections 1 to 4 may be referred to.

The Tx and Rx of the UE and the eNB may perform a packet modulation/demodulation function for data transmission, a high-speed packet channel coding function, OFDM packet scheduling, TDD packet scheduling, and/or channelization. Each of the UE and the eNB of FIG. 38 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 3880 or 3890 and executed by the processor 3820 or 3830. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

The present disclosure is applicable to various wireless access systems including a 3GPP system, a 3GPP2 system, and/or an IEEE 802.xx system. Besides these wireless access systems, the embodiments of the present disclosure are applicable to all technical fields in which the wireless access systems find their applications.

What is claimed is:

1. A method for receiving a discovery reference signal (DRS) by a user equipment (UE) in a wireless communication system for supporting an unlicensed band, the method comprising:
monitoring multiple subframes included in a discovery measurement timing configuration (DMTC) period for receiving the DRS in at least one subframe among any of the multiple subframes;
receiving a multimedia broadcast multicast service single frequency network (MBSFN) configuration;
applying the MBSFN configuration to a subframe not including the DRS among MBSFN subframes configured by the MBSFN configuration; and
not applying the MBSFN configuration to the at least one subframe including the DRS among the MBSFN subframes.

2. The method according to claim 1, wherein the DRS comprises at least one of:
a cell-specific reference signal (CRS),
a primary synchronization signal (PSS),
a secondary synchronization signal (SSS), or
a channel status information reference signal (CSI-RS).

3. The method according to claim 1, further comprising:
receiving a DMTC configuration,
wherein the DMTC period is determined based on the DMTC configuration.

4. The method according to claim 1, further comprising:
performing a radio resource management (RRM) measurement based on the received DRS.

5. The method according to claim 1, wherein a cell-specific reference signal (CRS) is transmitted only in at least one of a first symbol or a second symbol of an MBSFN subframe determined based on the MBSFN configuration.

6. The method according to claim 1, further comprising:
determining that the DRS is transmitted in the at least one subframe based on at least one of a primary synchronization signal (PSS) or a secondary synchronization signal (SSS) detected in the at least one subframe.

7. A user equipment (UE) for receiving a discovery reference signal (DRS) in a wireless communication system for supporting an unlicensed band, the UE comprising:
a receiver; and
a processor,
wherein the processor is configured to:
monitor multiple subframes included in a discovery measurement timing configuration (DMTC) period for receiving the DRS in at least one subframe among any of the multiple subframes;
receive a multimedia broadcast multicast service single frequency network (MBSFN) configuration;
apply the MBSFN configuration to a subframe not including the DRS among MBSFN subframes configured by the MBSFN configuration; and
not apply the MBSFN configuration to the at least one subframe including the DRS among the MBSFN subframes.

8. The UE according to claim 7, wherein the DRS comprises at least one of:
a cell-specific reference signal (CRS),
a primary synchronization signal (PSS),
a secondary synchronization signal (SSS), or
a channel status information reference signal (CSI-RS).

9. The UE according to claim 7, wherein the processor is further configured to receive a DMTC configuration, and
wherein the DMTC period is determined based on the DMTC configuration.

10. The UE according to claim 7, wherein the processor is further configured to perform a radio resource management (RRM) measurement based on the received DRS.

11. The UE according to claim 7, wherein a cell-specific reference signal (CRS) is transmitted only in at least one of a first symbol or a second symbol of an MBSFN subframe determined based on the MBSFN configuration.

12. The UE according to claim 7, wherein the processor is further configured to determine that the DRS is transmitted in the at least one subframe based on at least one of a primary synchronization signal (PSS) or a secondary synchronization signal (SSS) detected in the at least one subframe.

* * * * *